US011899465B2

(12) United States Patent
Johnson et al.

(10) Patent No.: US 11,899,465 B2
(45) Date of Patent: Feb. 13, 2024

(54) AUTONOMOUS AND ASSISTED DOCKING SYSTEMS AND METHODS

(71) Applicant: FLIR Belgium BVBA, Meer (BE)

(72) Inventors: Mark Johnson, Vannes (FR); Oliver Hawker, Southampton (GB); Richard Jales, Eastleigh (GB); Christopher Yeomans, Fareham (GB); Marcelo Rull, Encinitas, CA (US); Mark Rivers, Winchester (GB)

(73) Assignee: FLIR Belgium BVBA, Meer (BE)

( * ) Notice: Subject to any disclaimer, the term of this patent is extended or adjusted under 35 U.S.C. 154(b) by 138 days.

(21) Appl. No.: 16/533,572

(22) Filed: Aug. 6, 2019

(65) Prior Publication Data

US 2019/0361457 A1 Nov. 28, 2019

Related U.S. Application Data

(63) Continuation of application No. PCT/US2018/037953, filed on Jun. 15, 2018, and a
(Continued)

(51) Int. Cl.
*G05D 1/02* (2020.01)

(52) U.S. Cl.
CPC ......... *G05D 1/0225* (2013.01); *G05D 1/0206* (2013.01)

(58) Field of Classification Search
None
See application file for complete search history.

(56) References Cited

U.S. PATENT DOCUMENTS

| 2,968,957 A | 1/1961 | Condie et al. |
| 3,140,436 A | 7/1964 | Hatch |
| (Continued) | | |

FOREIGN PATENT DOCUMENTS

| CN | 102692225 | 9/2012 |
| CN | 103149948 | 6/2013 |
| (Continued) | | |

OTHER PUBLICATIONS

Gorovyi et al., "A Novel Trajectory Restoration Algorithm for High-Resolution SAR Imaging", 2014 15th International Radar Symposium, Jun. 16, 2014, 4 pages, IEEE, Piscataway, NJ.
(Continued)

*Primary Examiner* — Jelani A Smith
*Assistant Examiner* — Davin Seol
(74) *Attorney, Agent, or Firm* — Haynes and Boone, LLP

(57) ABSTRACT

Techniques are disclosed for systems and methods to provide docking assist for mobile structures. A docking assist system includes a logic device, one or more sensors, one or more actuators/controllers, and modules to interface with users, sensors, actuators, and/or other modules of a mobile structure. The logic device is adapted to receive docking assist parameters from a user interface for the mobile structure and perimeter sensor data from a perimeter ranging system mounted to the mobile structure. The logic device determines docking assist control signals based, at least in part, on the docking assist parameters and perimeter sensor data, and it then provides the docking assist control signals to a navigation control system for the mobile structure. Control signals may be displayed to a user and/or used to adjust a steering actuator, a propulsion system thrust, and/or other operational systems of the mobile structure.

19 Claims, 47 Drawing Sheets

Related U.S. Application Data continuation-in-part of application No. 15/640,186, filed on Jun. 30, 2017, now Pat. No. 10,996,676, and a continuation-in-part of application No. 15/620,675, filed on Jun. 12, 2017, now Pat. No. 10,747,226, which is a continuation of application No. PCT/US2015/068342, filed on Dec. 31, 2015, said application No. 15/640,186 is a continuation of application No. PCT/US2015/067959, filed on Dec. 29, 2015.

(60) Provisional application No. 62/628,905, filed on Feb. 9, 2018, provisional application No. 62/584,718, filed on Nov. 10, 2017, provisional application No. 62/521,346, filed on Jun. 16, 2017, provisional application No. 62/273,402, filed on Dec. 30, 2015, provisional application No. 62/099,022, filed on Dec. 31, 2014, provisional application No. 62/099,103, filed on Dec. 31, 2014, provisional application No. 62/099,032, filed on Dec. 31, 2014, provisional application No. 62/099,016, filed on Dec. 31, 2014.

(56) References Cited

U.S. PATENT DOCUMENTS

| | | | |
|---|---|---|---|
| 3,301,510 A | 1/1967 | Cook | |
| 3,436,531 A | 4/1969 | Throckmorton | |
| 3,488,954 A | 1/1970 | Thomas et al. | |
| 3,741,474 A | 6/1973 | Kawada et al. | |
| 4,129,087 A | 12/1978 | Dimmick et al. | |
| 5,523,951 A | 6/1996 | Kriesgman et al. | |
| 5,525,081 A | 6/1996 | Mardesich et al. | |
| 6,450,112 B1 | 9/2002 | Deghuee | |
| 7,305,928 B2 | 12/2007 | Bradley et al. | |
| 7,469,168 B1 | 12/2008 | Richey | |
| 7,727,036 B1 | 6/2010 | Poorman et al. | |
| 8,275,544 B1 | 9/2012 | Wells et al. | |
| 10,095,232 B1 | 10/2018 | Arbuckle et al. | |
| 10,324,468 B2 | 6/2019 | Arbuckle et al. | |
| 10,382,539 B1* | 8/2019 | Finsterbusch | H04L 67/01 |
| 10,671,073 B2 | 6/2020 | Arbuckle et al. | |
| 11,154,442 B1* | 10/2021 | Dean | A61G 5/10 |
| 2003/0137443 A1 | 7/2003 | Van Rees et al. | |
| 2003/0149528 A1 | 8/2003 | Lin | |
| 2005/0075016 A1 | 4/2005 | Bertetti et al. | |
| 2007/0089660 A1* | 4/2007 | Bradley | B63H 25/42 114/144 A |
| 2009/0048726 A1* | 2/2009 | Lofall | G07C 5/085 701/21 |
| 2009/0076717 A1 | 3/2009 | Goutelard et al. | |
| 2009/0171520 A1 | 7/2009 | Kaji | |
| 2009/0222154 A1 | 9/2009 | Lopriore | |
| 2010/0094491 A1 | 4/2010 | Oehlgrien et al. | |
| 2010/0138083 A1 | 6/2010 | Kaji | |
| 2010/0228420 A1 | 9/2010 | Lee | |
| 2010/0235129 A1 | 9/2010 | Sharma et al. | |
| 2011/0046843 A1 | 2/2011 | Caveney | |
| 2011/0172858 A1* | 7/2011 | Gustin | B63H 21/213 701/21 |
| 2011/0307128 A1 | 12/2011 | Igarashi et al. | |
| 2012/0130570 A1 | 5/2012 | Pease | |
| 2012/0132120 A1 | 5/2012 | Gai et al. | |
| 2012/0290175 A1 | 11/2012 | Hisanaga | |
| 2013/0063599 A1* | 3/2013 | Imai | G06K 9/00798 348/148 |
| 2013/0173096 A1 | 7/2013 | Chalhoub et al. | |
| 2013/0297104 A1* | 11/2013 | Tyers | B63B 79/10 701/21 |
| 2014/0106631 A1* | 4/2014 | Ito | B63H 25/42 440/1 |
| 2014/0316657 A1 | 10/2014 | Johnson et al. | |
| 2014/0330480 A1 | 11/2014 | Kopper et al. | |
| 2015/0089427 A1 | 3/2015 | Akuzawa | |
| 2016/0125746 A1* | 5/2016 | Kunzi | G01S 7/003 701/11 |
| 2016/0187883 A1 | 6/2016 | Tyers et al. | |
| 2016/0214534 A1 | 7/2016 | Richards et al. | |
| 2017/0365175 A1 | 12/2017 | Harnett | |
| 2018/0015994 A1* | 1/2018 | Kishimoto | B63H 25/46 |
| 2018/0050772 A1 | 2/2018 | Koyano et al. | |
| 2019/0359300 A1* | 11/2019 | Johnson | B63B 49/00 |
| 2020/0202719 A1* | 6/2020 | Derginer | B63H 25/42 |
| 2021/0166568 A1* | 6/2021 | Kersulec | B63B 49/00 |
| 2021/0206460 A1* | 7/2021 | Hawker | G05D 1/0206 |

FOREIGN PATENT DOCUMENTS

| | | | |
|---|---|---|---|
| DE | 19803078 | 7/1999 | |
| DE | 19807525 | 9/1999 | |
| EP | 1873052 | 1/2008 | |
| EP | 2096018 | 9/2009 | |
| GB | 1223986 | 3/1971 | |
| GB | 1419244 | 12/1975 | |
| GB | 2429541 | 2/2007 | |
| JP | 2013086745 | 5/2013 | |
| JP | 2017052297 A | 3/2017 | |
| KR | 2008-0071269 A * | 8/2008 | B63B 49/00 |
| WO | WO-02097763 A1 * | 12/2002 | B63B 49/00 |
| WO | WO2013/172845 A1 | 11/2013 | |
| WO | WO 2014/168674 | 10/2014 | |
| WO | WO2016/163559 A1 | 10/2016 | |

OTHER PUBLICATIONS

Gierusz et al., "Multivariable Robust Steering of the Ship with Feedforward Controller", IFAC Proceedings Volumes, 2007, pp. 310-314, vol. 40, Issue 17, Elsevier, Amsterdam, Netherlands.

European Examination Report for European Patent Application 18742875.0 dated Nov. 19, 2021, 12 pages.

* cited by examiner 100D-1
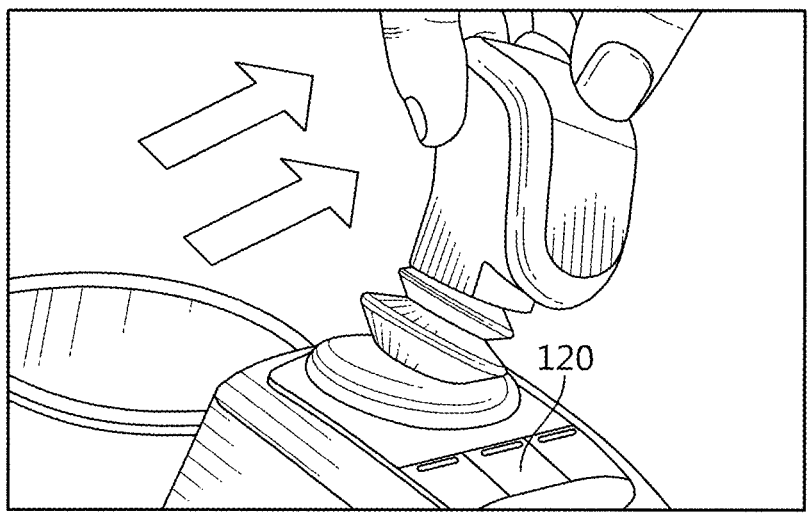
120
100D-2
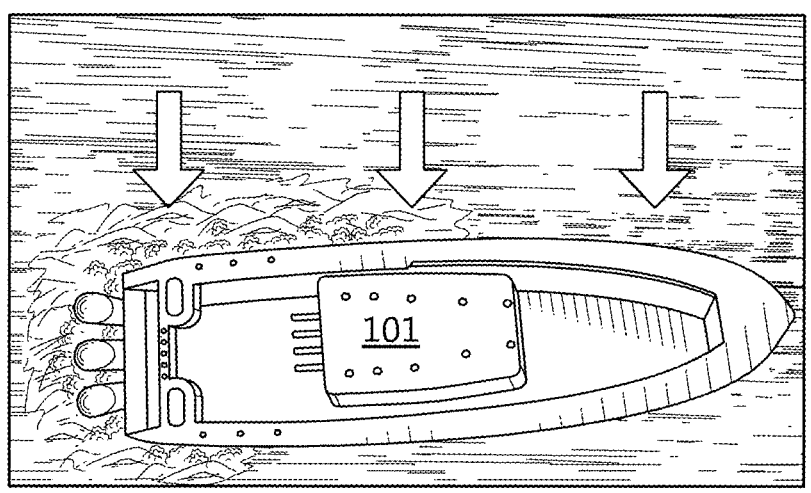
101
FIG. 1D

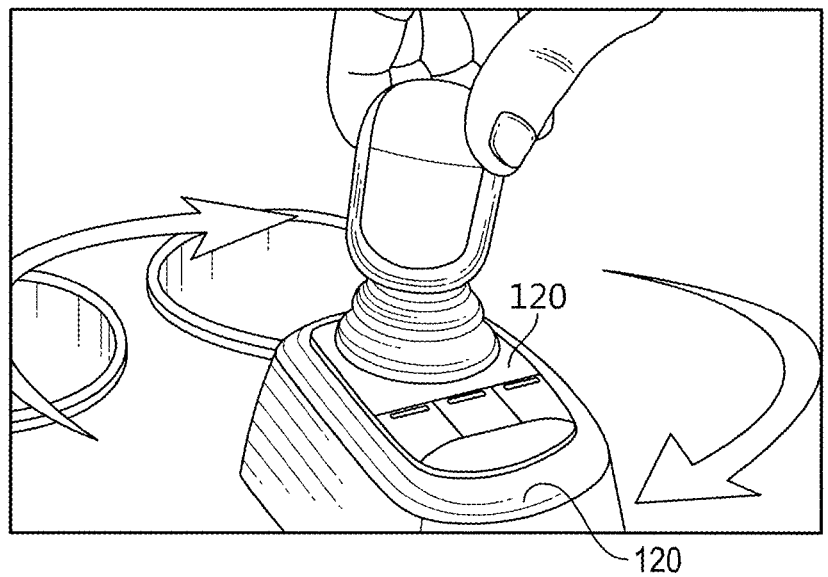
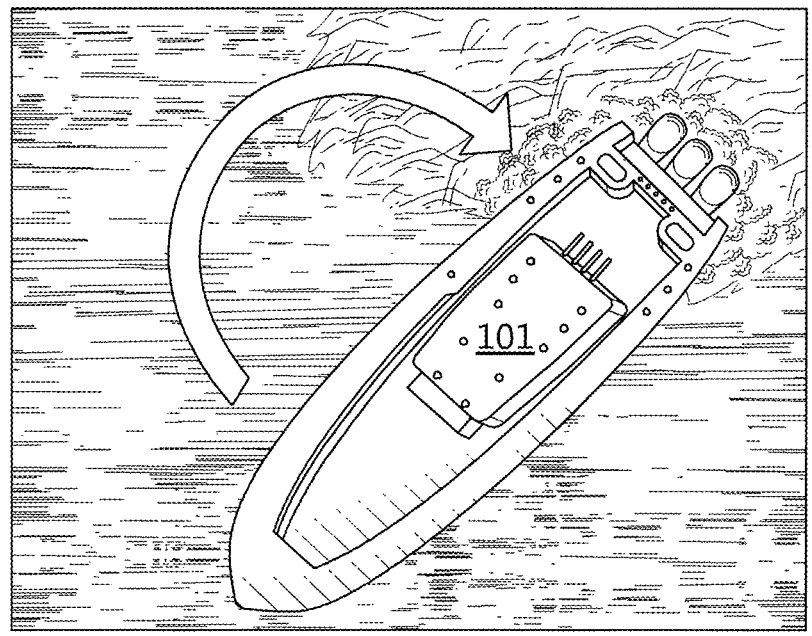
FIG. 1E

1410

```
function [PosErr, Spd2Target, HeadingError] = fcn(SetupData4plot,Time,TargetManeuver, PosEstNth, Hdg, SpdStbFwd)
coder.extrinsic('legend'); coder.extrinsic('quiver'); coder.extrinsic('num2str'); coder.extrinsic('patch');
coder.extrinsic('sprintf'); % codegen
PositionErrors = TargetManeuver(:,1:2) - repmat(PosEstNth',size(TargetManeuver,1),1);
[~, Idx] = min(sqrt(PositionErrors(:,1).^2 + PositionErrors(:,2).^2));
c = cosd(Hdg);  s = sind(Hdg);  PosErr = [c -s ; s c]*PositionErrors(Idx,:)';
HeadingError = TargetManeuver(Idx,3)-Hdg;
if Idx==1  TargetApproachDelta = TargetManeuver(Idx+1,1:2)-TargetManeuver(Idx,1:2);
else  TargetApproachDelta = TargetManeuver(Idx,1:2)-TargetManeuver(Idx-1,1:2); end
TargetApproachVel = TargetManeuver(Idx,4) * TargetApproachDelta'/norm(TargetApproachDelta);
TargetApproachVelStbFwd = [c -s ; s c] * TargetApproachVel;
Spd2Target = SpdStbFwd-TargetApproachVelStbFwd;
% Update the plot
UpdatePeriod_s = 0.25;
if mod(Time,UpdatePeriod_s) == 0
  figure(1);
  hold off
  kts2ms = 0.5;
  x = SetupData4plot(2)*sind(SetupData4plot(1))*kts2ms; y = SetupData4plot(2)*cosd(SetupData4plot(1))*kts2ms;
  quiver(x,y,-x,-y,'k','MaxHeadSize',3);
  x = SetupData4plot(4)*sind(SetupData4plot(3))*3; y = SetupData4plot(4)*cosd(SetupData4plot(3))*3;  %scale to
make visible
  hold on
  quiver(0,0,x,y,'m','MaxHeadSize',6);
  boatwidth_m = 4; boatlength_m = 12;
  boatX = [0 3 3 2 -2 -3 -3 0]*boatwidth_m/6; boatY = [8 3 -1 -4 -4 -1 3 8]*boatlength_m/12;
  boat = [c s ; -s c]*[boatX ; boatY];
  plot(TargetManeuver(:,1),TargetManeuver(:,2),'g');
  n = 8; Step = floor(size(TargetManeuver,1)/n);
  for i = 1:n
    idx = Step*i;
    c = TargetManeuver(idx,4) * cosd(TargetManeuver(idx,3));
    s = TargetManeuver(idx,4) * sind(TargetManeuver(idx,3));
    x = TargetManeuver(idx,1); y = TargetManeuver(idx,2);
    plot([s -s]+x,[c -c]+y,'r'); plot(s+x,c+y,'r.'); end
  plot(boat(1,:)+PosEstNth(1),boat(2,:)+PosEstNth(2),'b');
  plot(PosEstNth(1),PosEstNth(2),'ob');
  xlim([min(TargetManeuver(:,1))-8 max(TargetManeuver(:,1))+8]);
  ylim([min(TargetManeuver(:,2))-8 max(TargetManeuver(:,2))+8]);
  TimeStr = sprintf('%2.1f',Time);
  title(['Autonomous docking demonstration, time: ',TimeStr,'s']); xlabel('Distance (m)');ylabel('Distance (m)');
  legend(['Wind ',num2str(SetupData4plot(2)),'kts'], ['Current ',num2str(SetupData4plot(4)),'kts'],...
    ['SensorDelay ',num2str(SetupData4plot(5)),'s'])
  dockwidth= 1.5; docklength = 20; fenderwidth = 0.5; dock = zeros(2,4);
  endpoint = [TargetManeuver(end,1); TargetManeuver(end,2)];
  c = cosd(TargetManeuver(end,3)); s = sind(TargetManeuver(end,3));
  dock(:,1) = [-dockwidth ; -docklength]/2; dock(:,2) = [dockwidth ; -docklength]/2;
  dock(:,3) = [dockwidth ; docklength]/2; dock(:,4) = [-dockwidth ; docklength]/2;
  dock = [c s ; -s c]*dock;
  offset = (boatwidth_m/2+dockwidth/2+fenderwidth)*[-c ; s];
  docking_configuration = atan2d(offset(1),offset(2)) - atan2d(endpoint(1),endpoint(2));
  if abs(docking_configuration)>90 offset = - offset; end
  patch(dock(1,:)+endpoint(1)+offset(1),dock(2,:)+endpoint(2)+offset(2),[0.4 0.2 0.1]);
  axis equal
end
```

```
TargetManeuver = [0 0 0 1 ; -1 -10 50 1 ; -13 -15 80 0.5 ; -14 -20 110 0];
WindDir_deg = 245;WindSpd_kts = 15;CurrentSet_deg = 180;CurrentDrift_kts = 0.5; Mass_kg = 5000;
I_kgm2 = Mass_kg*2^2;
ThrusterLatMax_N = 4000;
ThrusterLonMax_N = 8000;
ThrusterYawMax_Nm = 2000;
Dist4FullJoystickLat_m = 5;
Dist4FullJoystickLon_m = 5;
Angl4FullJoystickYaw_deg = 40;
FullSpeedLat_ms = 1.5;
FullSpeedLon_ms = 3;
FullSpeedYaw_degs = 10;
DampLat = ThrusterLatMax_N/Mass_kg/FullSpeedLat_ms
DampLon = ThrusterLonMax_N/Mass_kg/FullSpeedLon_ms
DampYaw = ThrusterYawMax_Nm/I_kgm2/(FullSpeedYaw_degs*pi/180)
FilterLatTimeConst = 1; %seconds
FilterLonTimeConst = 1; %seconds
FilterYawTimeConst = 1; %seconds
NomLatGain = ThrusterLatMax_N/Mass_kg/DampLat;
NomLonGain = ThrusterLonMax_N/Mass_kg/DampLon;
NomYawGain = (180/pi)*ThrusterYawMax_Nm/I_kgm2/DampYaw;
ErrorGainLon = 1/Dist4FullJoystickLon_m;
ErrorGainLat = 1/Dist4FullJoystickLat_m;
ErrorGainYaw = 1/Angl4FullJoystickYaw_deg;
NomLatTimeConst = 1/DampLat %seconds
NomLonTimeConst = 1/DampLon %seconds
NomYawTimeConst = 1/DampYaw %seconds
Ts = 1/50;
MeasurementDelay_s = 0.2;

% Resize TargetManeuver so it has many more points, giving it fine
% granularity to avoid sudden jumps in output
PointsIn = size(TargetManeuver,1);
PointsOut = 1000;
TargManFineRes = zeros(PointsOut,size(TargetManeuver,2));
for j = 1 : PointsOut % new scale index
    i = (j-1)*(PointsIn-1)/(PointsOut-1); % old scale index with decimal to represent progress between points
    r = mod(i,1);
    TargManFineRes(j,:) = (1-r)*TargetManeuver(floor(i)+1,:) + r*TargetManeuver(ceil(i)+1,:);
end
TargetManeuver = TargManFineRes;
```

FIG. 23

AUTONOMOUS AND ASSISTED DOCKING SYSTEMS AND METHODS

CROSS-REFERENCE TO RELATED APPLICATIONS

This application is a continuation of International Patent Application No. PCT/US2018/037953 filed Jun. 15, 2018 and entitled "AUTONOMOUS AND ASSISTED DOCKETING SYSTEMS AND METHODS," which is hereby incorporated by reference in its entirety.

International Patent Application No. PCT/US2018/037953 filed Jun. 15, 2018 claims priority to and the benefit of U.S. Provisional Patent Application No. 62/628,905 filed Feb. 9, 2018 and entitled "AUTONOMOUS AND ASSISTED DOCKING SYSTEMS AND METHODS," which is hereby incorporated by reference in its entirety.

International Patent Application No. PCT/US2018/037953 filed Jun. 15, 2018 claims priority to and the benefit of U.S. Provisional Patent Application No. 62/584,718 filed Nov. 10, 2017 and entitled "AUTONOMOUS AND ASSISTED DOCKING SYSTEMS AND METHODS," which is hereby incorporated by reference in its entirety.

International Patent Application No. PCT/US2018/037953 filed Jun. 15, 2018 also claims priority to and the benefit of U.S. Provisional Patent Application No. 62/521,346 filed Jun. 16, 2017 and entitled "AUTONOMOUS AND ASSISTED DOCKING SYSTEMS AND METHODS," which is hereby incorporated by reference in its entirety.

This application is a continuation-in-part of U.S. patent application Ser. No. 15/620,675 filed Jun. 12, 2017 and entitled "ADAPTIVE AUTOPILOT CONTROL SYSTEMS AND METHODS," which is a continuation of International Patent Application No. PCT/US2015/068342 filed Dec. 31, 2015 and entitled "ADAPTIVE AUTOPILOT CONTROL SYSTEMS AND METHODS," which are each hereby incorporated by reference in their entirety.

International Patent Application No. PCT/US2015/068342 claims priority to and the benefit of U.S. Provisional Patent Application No. 62/273,402 filed Dec. 30, 2015 and entitled "ADAPTIVE TRACK KEEPING WITH ENHANCED VELOCITY ESTIMATION SYSTEMS AND METHODS," U.S. Provisional Patent Application No. 62/099,016 filed Dec. 31, 2014 and entitled "ADAPTIVE TRACK KEEPING SYSTEMS AND METHODS," U.S. Provisional Patent Application No. 62/099,103 filed Dec. 31, 2014 and entitled "ADAPTIVE CONTOUR FOLLOWING SYSTEMS AND METHODS," and U.S. Provisional Patent Application No. 62/099,022 filed Dec. 31, 2014 and entitled "STABILIZED DIRECTIONAL CONTROL SYSTEMS AND METHODS," all of which are hereby incorporated by reference in their entirety.

This application is related to U.S. patent application Ser. No. 16/457,739 filed Jun. 28, 2019 and entitled "SENSOR CHANNEL, ISOLATION SYSTEMS AND METHODS," which is a continuation-in-part of U.S. patent application Ser. No. 15/239,770 filed Aug. 17, 2016 and entitled "MODULAR SONAR TRANSDUCER ASSEMBLY SYSTEMS AND METHODS," now U.S. Pat. No. 10,241,200 issued Mar. 6, 2019, which is a continuation of International Patent Application No. PCT/US2015/015279 filed Feb. 10, 2015 and entitled "MODULAR SONAR TRANSDUCER ASSEMBLY SYSTEMS AND METHODS," which claims priority to and the benefit of U.S. Provisional Patent Application No. 61/943,170 filed Feb. 21, 2014 and entitled "MODULAR SONAR TRANSDUCER ASSEMBLY SYSTEMS AND METHODS," which are each hereby incorporated herein by reference in their entirety.

This application is related to U.S. patent application Ser. No. 15/640,186 filed Jun. 30, 2017 and entitled "PROACTIVE DIRECTIONAL CONTROL SYSTEMS AND METHODS," which is a continuation-in-part of U.S. patent application Ser. No. 15/239,760 filed Aug. 17, 2016 and entitled "ACCELERATION CORRECTED ATTITUDE ESTIMATION SYSTEMS AND METHODS," now U.S. Pat. No. 10,337,883 issued Jun. 12, 2019, which is a continuation of International Patent Application No. PCT/US2015/015281 filed Feb. 10, 2015 and entitled "ACCELERATION CORRECTED ATTITUDE ESTIMATION SYSTEMS AND METHODS," which claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS," which are each hereby incorporated herein by reference in their entirety.

This application is related to U.S. patent application Ser. No. 15/391,682 filed Dec. 27, 2016 and entitled "AUTOPILOT AUTORELEASE SYSTEMS AND METHODS," which is a continuation-in-part of U.S. patent application Ser. No. 15/222,905 filed Jul. 28, 2016 and entitled "HYDRAULIC SLIP COMPENSATION SYSTEMS AND METHODS," now U.S. Pat. No. 10,338,593 issued Jun. 12, 2019, which is a continuation of International Patent Application No. PCT/US2015/013141 filed Jan. 27, 2015 and entitled "HYDRAULIC SLIP COMPENSATION SYSTEMS AND METHODS," which claims priority to and the benefit of U.S. Provisional Patent Application No. 61/934,678 filed Jan. 31, 2014 and entitled "HYDRAULIC SLIP COMPENSATION SYSTEMS AND METHODS," which are each hereby incorporated herein by reference in their entirety.

This application is a continuation-in-part of U.S. patent application Ser. No. 15/640,186 filed Jun. 30, 2017 and entitled "PROACTIVE DIRECTIONAL CONTROL SYSTEMS AND METHODS," which is a continuation of International Patent Application No. PCT/US2015/067959 filed Dec. 29, 2015 and entitled "PROACTIVE DIRECTIONAL CONTROL SYSTEMS AND METHODS," which claims priority to and the benefit of U.S. Provisional Patent Application No. 62/099,032 filed Dec. 31, 2014 and entitled "PROACTIVE DIRECTIONAL CONTROL SYSTEMS AND METHODS," which are each hereby incorporated herein by reference in their entirety.

This application is related to U.S. patent application Ser. No. 15/640,186 filed Jun. 30, 2017 and entitled "PROACTIVE DIRECTIONAL CONTROL SYSTEMS AND METHODS," which is a continuation-in-part of U.S. patent application Ser. No. 14/321,646 filed Jul. 1, 2014 and entitled "STABILIZED DIRECTIONAL CONTROL SYSTEMS AND METHODS," now U.S. Pat. No. 9,676,464 issued May 24, 2017, which is a continuation of International Patent Application No. PCT/US2014/013441 filed Jan. 28, 2014 and entitled "STABILIZED DIRECTIONAL CONTROL SYSTEMS AND METHODS," which claims priority to and the benefit of U.S. Provisional Patent Application No. 61/759,238 filed Jan. 31, 2013 and entitled "STABILIZED DIRECTIONAL CONTROL SYSTEMS AND METHODS," which are each hereby incorporated herein by reference in their entirety.

This application is related to U.S. patent application Ser. No. 15/353,579 filed Nov. 16, 2016 and entitled "MULTICHANNEL SONAR SYSTEMS AND METHODS," which is a continuation of International Patent Application No.

PCT/US2015/032304 filed May 22, 2015 and entitled "MULTICHANNEL SONAR SYSTEMS AND METHODS," which claims priority to and the benefit of U.S. Provisional Patent Application No. 62/005,838 filed May 30, 2014 and entitled "MULTICHANNEL SONAR SYSTEMS AND METHODS," which are each hereby incorporated herein by reference in their entirety.

TECHNICAL FIELD

One or more embodiments of the invention relate generally to directional control and more particularly, for example, to systems and methods for assisted and/or fully autonomous docking for watercraft.

BACKGROUND

Directional control systems are used to provide automated and/or supplemented control for planes, watercraft, and, more recently, automobiles. Conventional automated directional control systems typically require a multitude of relatively expensive and purpose-built sensors that are difficult to retrofit into an existing vehicle and produce results that are not accurate enough to be used to provide reliable docking or parking assist for a vehicle, particularly in crowded conditions and/or while navigational control is complicated by external disturbances, such as by wind or water currents. Thus, there is a need for improved docking assist methodologies.

SUMMARY

Techniques are disclosed for systems and methods to provide docking assist for a mobile structure. In accordance with one or more embodiments, a docking assist system may include a logic device, a memory, one or more sensors, one or more actuators/controllers, and modules to interface with users, sensors, actuators, and/or other modules of a mobile structure. The logic device may be adapted to receive docking assist parameters for a mobile structure and perimeter sensor data from a perimeter ranging system. The logic device may be configured to determine docking assist control signals based, at least in part, on the docking assist parameters and perimeter sensor data. The determined docking assist control signals may be provided to a navigation control system for the mobile structure. These and other control signals may be displayed to a user and/or used to adjust a steering actuator, a propulsion system thrust, and/or other operational systems of the mobile structure.

In various embodiments, a docking assist system may include a logic device configured to communicate with a user interface and a perimeter ranging system mounted to a mobile structure and to provide docking assist for the mobile structure. The logic device may be configured to receive docking assist parameters from the user interface and perimeter sensor data from the perimeter ranging system; determine one or more docking assist control signals based, at least in part, on the received docking assist parameters and the received perimeter sensor data; and provide the one or more docking assist control signals to a navigation control system for the mobile structure.

In some embodiments, a method to provide docking assist for a mobile structure may include receiving docking assist parameters from a user interface for the mobile structure and perimeter sensor data from a perimeter ranging system mounted to the mobile structure; determining one or more docking assist control signals based, at least in part, on the received docking assist parameters and the received perimeter sensor data; and providing the one or more docking assist control signals to a navigation control system for the mobile structure.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 1D-E are diagrams illustrating operation of a thrust maneuver system for a docking assist system in accordance with an embodiment of the disclosure.

FIGS. 22-23 illustrate processes to provide docking assist in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, docking assist systems and methods may provide assisted and/or fully automated docking and/or directional control for mobile structures that is substantially more reliable and accurate than conventional systems across a wide variety of types of structures and environmental conditions. Embodiments disclosed herein address deficiencies of conventional methodologies with respect to selection of target docking position and orientation and/or target docking track, perimeter monitoring, navigation hazard avoidance, user control of docking approach, and adaptive navigational control of a mobile structure during assisted and/or autonomous docking.

One or more embodiments of the described docking assist system may advantageously include a controller and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the controller may be adapted to execute one or more control loops to model and/or control navigation of the mobile structure during a docking assist. The system may be configured to receive measured or modeled sensor signals and provide docking assist control signals, as described herein. For example, the sensors may be mounted to or within the mobile structure (e.g., a watercraft, aircraft, motor vehicle, and/or other mobile structure), or may be integrated with the controller. Various embodiments of the present disclosure may be configured to automatically coordinate steering actuator operations with various orientation and/or position measurements to provide relatively high quality and low noise directional control.

Figure 1A:
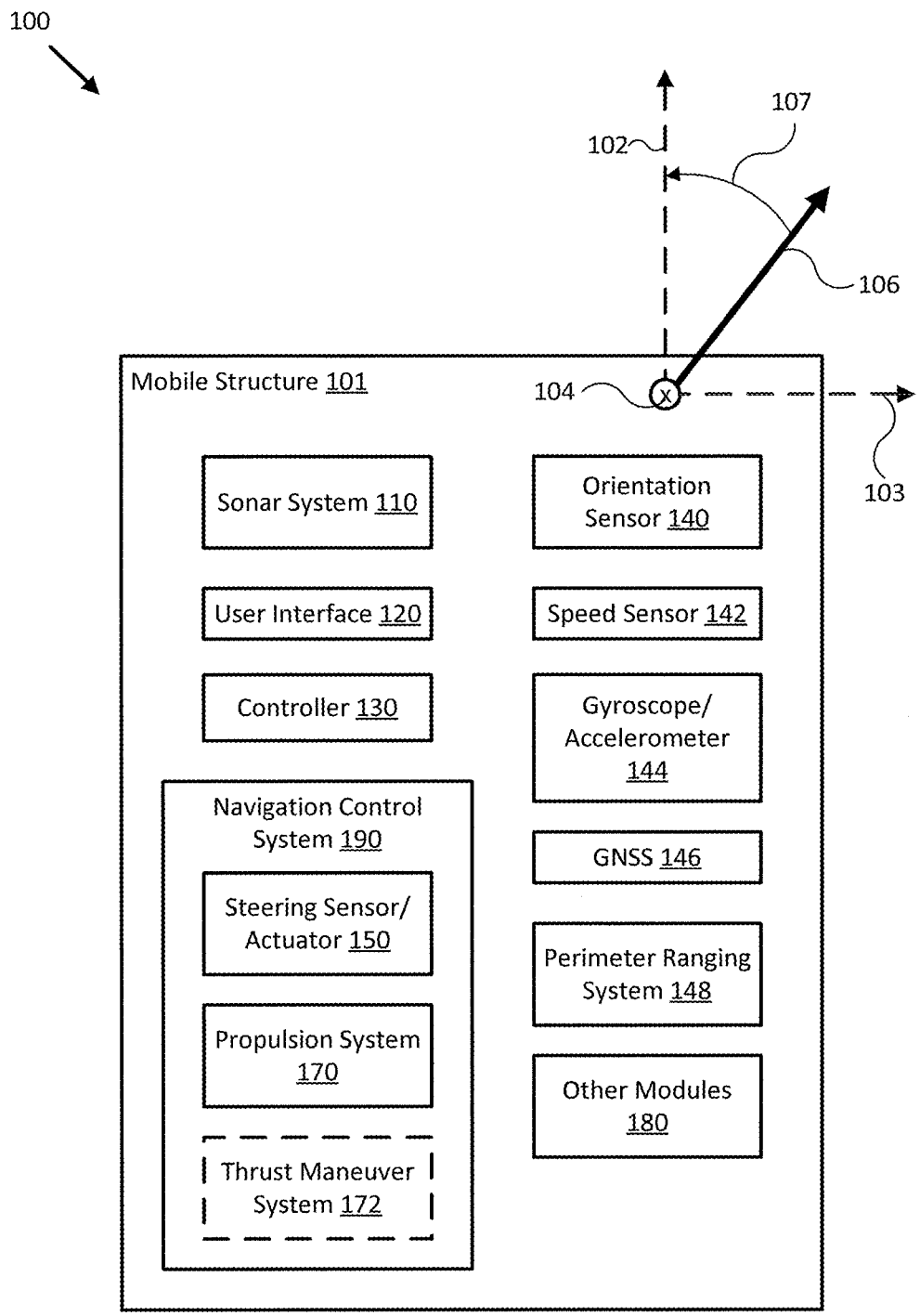
FIG. 1A illustrates a block diagram of a mobile structure including a docking assist system in accordance with an embodiment of the disclosure.

As an example, FIG. 1A illustrates a block diagram of system 100 in accordance with an embodiment of the disclosure. In various embodiments, system 100 may be adapted to provide docking assist for a particular mobile structure 101. Docking assist of a mobile structure may refer to fully automated docking of the mobile structure, for example, or to assisted docking of the mobile structure, where the system compensates for detected navigation hazards (e.g., such as an approaching dock) and/or various environmental disturbances (e.g., such as a cross wind or a water current) while assisting direct user control of mobile structure maneuvers. Such docking assist may include control of yaw, yaw rate, and/or linear velocity of mobile structure 101. In some embodiments, system 100 may be adapted to measure an orientation, a position, and/or a velocity of mobile structure 101, a relative or absolute wind, and/or a water current. System 100 may then use these measurements to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide docking assist for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS," U.S. Provisional Patent Application 61/943,170 filed Feb. 21, 2014 and entitled "MODULAR SONAR TRANSDUCER ASSEMBLY SYSTEMS AND METHODS," and/or U.S. Provisional Patent Application 62/087,189 filed Dec. 3, 2014 and entitled "AUTONOMOUS SONAR SYSTEMS AND METHODS," each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS," which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein. For docking responsiveness, control loop responsiveness may be fast and coupled with relatively low maximum acceleration limits.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water current velocity impacting mobile structure 101. In various embodiments, system 100 may include multiple embodiments of speed sensor 142, such as one wind velocity sensor and one water current velocity sensor.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10 s of meters from a perimeter of mobile structure 101), visible spectrum and/or infrared/thermal imaging modules or cameras, stereo cameras, LIDAR systems, combinations of these, and/or other perimeter ranging systems configured to provide relatively fast and accurate perimeter sensor data (e.g., so as to accommodate suddenly changing navigation conditions due to external disturbances such as tide and wind loadings on mobile structure 101). An embodiment of perimeter ranging system 148 implemented by cameras mounted to watercraft is discussed with reference to FIGS. 2A-I.

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101, and may be adapted to sense and/or physically adjust the control surfaces to a variety of positive and/or negative steering angles/positions.

Figure 1B:
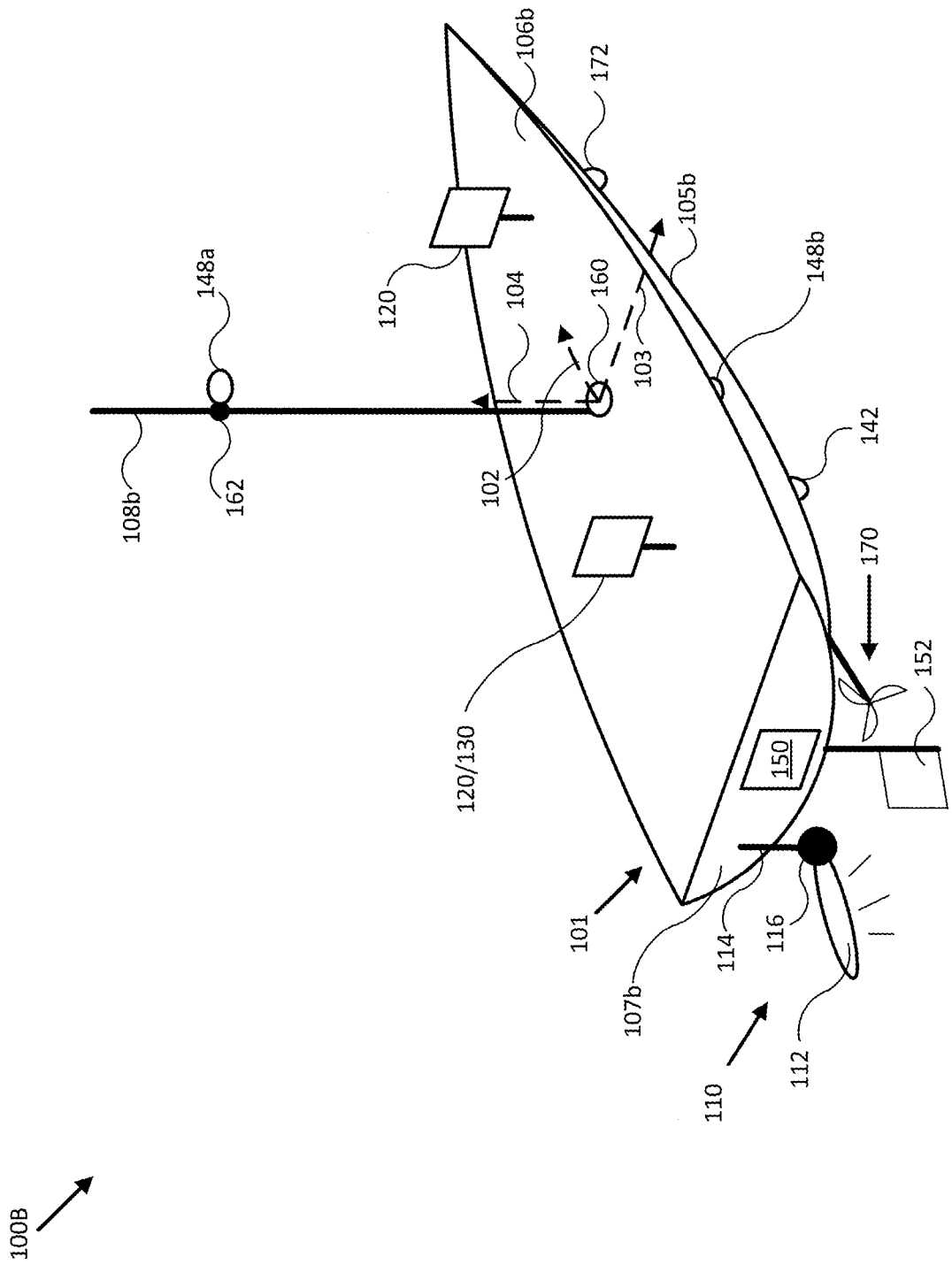
FIG. 1B illustrates a diagram of a watercraft including a docking assist system in accordance with an embodiment of the disclosure.
Figure 1C:
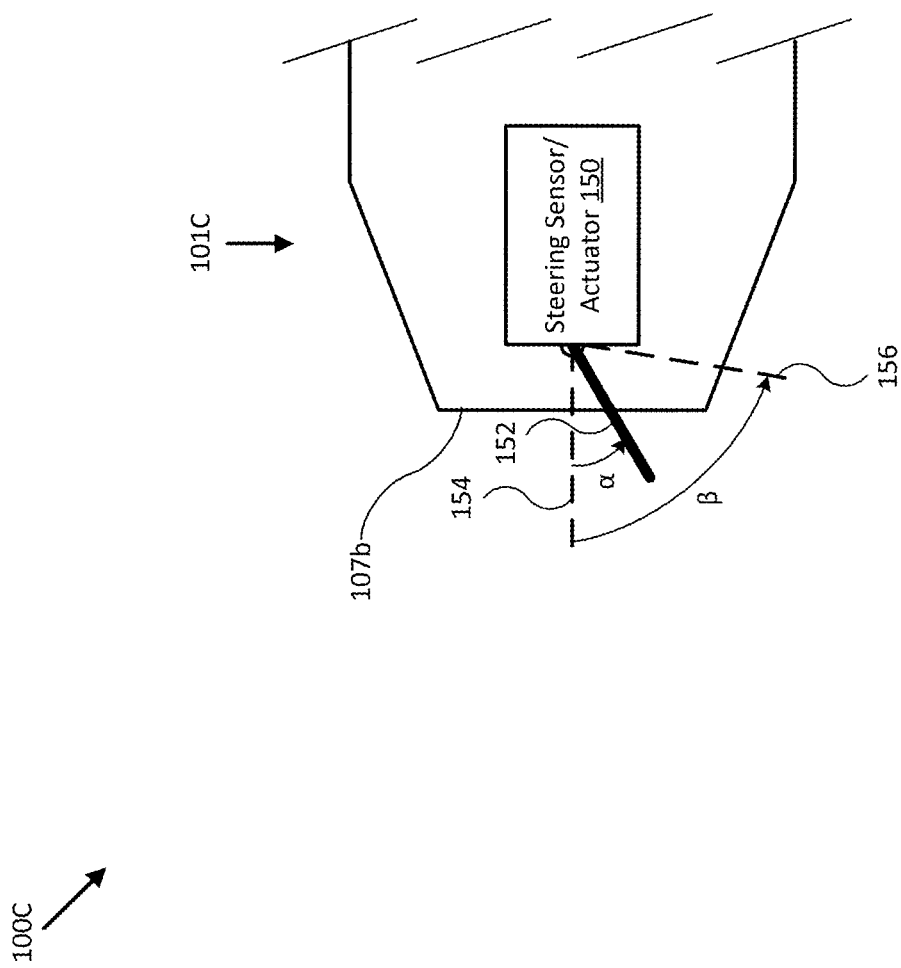
FIG. 1C illustrates a diagram of a steering sensor/actuator for a docking assist system in accordance with an embodiment of the disclosure.

For example, FIG. 1C illustrates a diagram of a steering sensor/actuator for a docking assist system in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (e.g., designated by a dashed line 134). In various embodiments, steering sensor/actuator 150 may be implemented with a steering actuator angle limit (e.g., the positive limit is designated by an angle $\beta$ and a dashed line 136 in FIG. 1), and/or a steering actuator rate limit "R".

As described herein, a steering actuator rate limit may be a limit of how quickly steering sensor/actuator 150 can change a steering angle of a steering mechanism (e.g., rudder 132), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as a number of separate sensors and/or actuators, for example, to sense and/or control a one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular docking assist maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle $\alpha$ may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle $\alpha$ may be determined by controller 130 according to a pre-determined algorithm, for example, or through use of an adaptive algorithm for training various control loop parameters characterizing the relationship of steering angle $\alpha$ to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity. For example, FIGS. 1D-E are diagrams illustrating operation of a thrust maneuver system for a docking assist system in accordance with an embodiment of the disclosure. As shown in diagram 100D-1 of FIG. 1D, joystick user interface 120 may be moved laterally by user input to produce the corresponding lateral velocity for mobile structure 101 shown in diagram 100D-2. Similarly, as shown in diagram 100E-1 of FIG. 1E, joystick user interface 120 may be rotated clockwise by user input to produce the corresponding clockwise angular velocity for mobile structure 101 shown in diagram 100E-2.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide docking assist and/or other operational control of mobile structure 101, similar to system 100 of FIG. 1A. For example, system 100B may include integrated user interface/controller 120/130, secondary user interface 120, perimeter ranging system 148a and 148b, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, and perimeter ranging system 148b (e.g., an ultrasonic sensor array and/or short range radar system) coupled to hull 105b or deck 106b substantially above a water line of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of perimeter ranging system 148a according to control signals and/or an orientation or position of mobile structure 101 provided by user interface/controller 120/130. For example, user interface/controller 120/130 may be adapted to receive an orientation of transducer assembly 112 and/or perimeter ranging system 148a (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In related embodiments, perimeter ranging system 148b may be implemented as a short range radar system including one or more fixed radar antenna array assemblies (e.g., assembly 148b in FIG. 1B) each configured to generate steerable radar beams and mounted along hull 105b, deck 106b, transom 107b, and/or an interface between those, generally above the at-rest waterline associated with mobile structure 101, such as along a gunwale of mobile structure 101. Each antenna array assembly 148b may be configured to generate a relatively narrow radar beam, such as in the vertical direction (e.g., parallel to vertical axis 104) that may be steered to a desired relative roll or pitch (e.g., relative to an orientation of mobile structure 101) that substantially compensates for roll and/or pitch motion of mobile structure 101 about longitudinal axis 102 and/or lateral axis 103, respectively. In general, a monitoring perimeter associated with such embodiments of perimeter ranging system 148b may be selected by a timing constraint, for example, or may be limited by a sensitivity and/or power output of perimeter ranging system 148b.

For example, design of a short-range radar system typically involves an engineering trade off in beam width, favoring narrow beams for higher density and detail, and wider beams in order to sense more area at once. In an environment without a fixed orientation, such as on a mobile structure, a wider beam width is often used to guarantee that an expected target may be in view while experiencing an expected amount of roll and pitch. Embodiments of perimeter ranging system 148b implemented as a short range radar system may control one or more antenna array assemblies 148b to generate relatively narrow and high resolution radar beams that may be focused on a particular target and/or according to a desired elevation (e.g., relative and/or absolute). In general, with respect to perimeter ranging system 148b, an absolute elevation may be defined as the vertical angle between the horizon (e.g., at zero degrees) and, for example, a steered beam generated by antenna array assembly 148b, and a relative elevation may be defined as the vertical angle between the plane defined by longitudinal axis 102 and lateral axis 103 of mobile structure 101, for example, and such steered beam.

In various embodiments, user interface/controller 120/130 may be configured to receive or determine an absolute roll and/or pitch of mobile structure 101 and control perimeter ranging system 148b to generate one or more vertically steered radar beams at desired absolute elevations based, at least in part, on the absolute orientation (e.g., roll and/or pitch) of mobile structure 101, an orientation of each antenna array assembly of perimeter ranging system 148b, a relative position of a target or navigation hazard detected by perimeter ranging system 148b, and/or an absolute or relative orientation and/or position of such target. Perimeter ranging system 148b may be configured to derive perimeter sensor data from such generated radar beams and provide the perimeter sensor data to user interface/controller 120/130, as described herein.

Such beam may be relatively narrow in a single dimension (e.g., 1, 5, or 10 degrees in vertical or elevation width, or within the range of 1 to 10 degrees in vertical width) or relatively narrow in overall angular diameter (e.g., 1, 5, or 10 degrees in angular diameter, or within the range of 1 to 10 degrees in angular diameter. More generally, such beam may be steered both vertically and horizontally (e.g., elevation and azimuth). Each antenna array assembly of perimeter ranging system 148b may include a number of different individual radar antenna elements, which may be arranged in a linear or two dimensional spatial array to facilitate a particular desired beam shape, width, diameter, and/or steering range. In particular embodiments, each antenna array assembly may include a 3, 5, or 9 element vertical linear array of radar antenna elements, for example, or multiples of such linear arrays to form two dimensional arrays.

When used to facilitate docking assist and/or navigational control for mobile structure 101, one or more antenna array assemblies of perimeter ranging system 148b may be used to generate radar beams substantially at a preset or user selected absolute elevation selected to detect approaching docking hazards, such as zero degrees absolute elevation. In embodiments where such antenna array assemblies are themselves mounted to hull 105b with a relative elevation of approximately −10 degrees (e.g., directed at an absolute elevation of −10 degrees when vertical axis 104 is aligned with gravity), and mobile structure 101 is experiencing roll and/or pitch of +−5 degrees, perimeter ranging system 148b may be configured to generate radar beams steered to compensate for such roll and/or pitch with relative elevations ranging between 5 and 15 degrees, thereby maintaining an absolute elevation of zero degrees. Using such techniques to generate radar beams allows embodiments of perimeter ranging system 148b to reliably detect and provide ranges between a perimeter of mobile structure 101 and various navigation hazards occurring during docking assist maneuvers, for example, and/or more general navigation, as described herein. In particular embodiments In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2A:
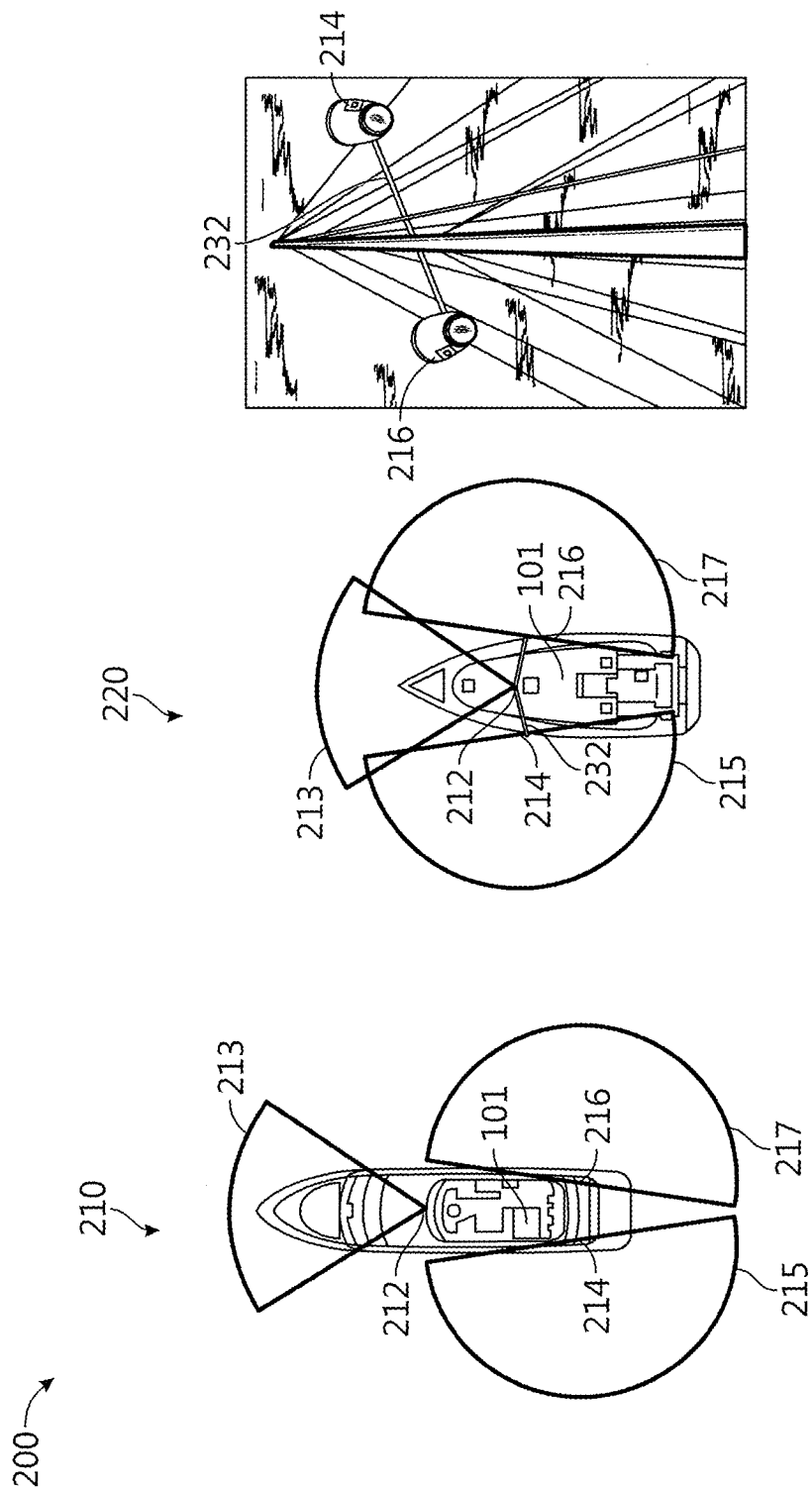
FIGS. 2A-K show diagrams illustrating various aspects of a perimeter ranging system for a docking assist system in accordance with an embodiment of the disclosure.

FIGS. 2A-K show diagrams illustrating various aspects of a perimeter ranging system for a docking assist system in accordance with an embodiment of the disclosure. For example, FIG. 2A shows diagram 200 illustrating mounting positions and corresponding monitoring perimeters for perimeter ranging system components associated with powered yacht arrangement 210 and sailboat arrangement 220.

Each type of perimeter ranging system includes a variety of its own complications when used to implement a docking assist system, and a reliable and accurate perimeter ranging system is necessary for docking assist because GNSS data and cartography data for docks lack sufficient detail and resolution to provide safe docking assist by themselves and because, regardless of improvements in GNSS technology and cartography, there are often many uncharted navigation hazards associated with docking. As an example, conventional radar systems can be relatively easy to retrofit onto a mobile structure, if mounted conventionally high up on mobile structure 101, but they typically suffer from relatively low resolution and so can be unable to detect small objects, such as mooring lines. If mounted conventionally high, a conventional radar system would provide ranging data to controller 130, and controller 130 would be configured to use knowledge of the profile for mobile structure 101 and a measured orientation of mobile structure 101 to determine perimeter sensor data for a detected navigation hazard (e.g., the closest approach distance between a perimeter of mobile structure 101 and the detected navigation hazard). However, by being mounted high, the conventional radar system would typically miss low profile navigation hazards commonly encountered when docking a mobile structure, such as the leading edge of a dock floating minimally above a waterline, particularly as it approaches within a meter of a perimeter of mobile structure 101.

Conventional radar systems may instead be mounted relatively low (e.g., pontoon height) to reliably range such low profile navigation hazards, but this would increase mounting costs and complexity and still result in a system that could miss small but important detail either due to resolution issues or due to conventional beam shapes and corresponding detection areas being too narrow at the point of emission and lacking substantial vertical coverage. Furthermore, if mounted low, a conventional radar system couldn't be used while underway at sea (e.g., due to wave clutter), would be subject to increased risk of damage during docking and/or due to immersion (e.g., sail boat heeled over while underway), would be difficult to mount aesthetically and/or require holes in the hull, and might require extensive cabling routing. As such, conventional radar can be a useful and relatively inexpensive complimentary sensor for a docking assist system, particularly when mounted conventionally to a mast, but would typically require supplemental perimeter sensor data from a separate perimeter ranging system to provide reliable and safe docking assist.

Alternatives include ultrasonic sensor arrays, LIDAR systems, and short range radar systems. Conventional ultrasonic sensor arrays typically do not provide sufficient resolution and range to detect relatively small navigation hazards or to allow a user to specify a docking location, and so, like conventional radar systems, conventional ultrasonic sensor arrays would typically need supplemental perimeter sensor data from a separate perimeter ranging system to provide reliable and safe docking assist, which would increase system cost and complexity.

Newer ultrasonic sensor arrays may include relatively small individual transducer/sensor elements each implemented with its own microcontroller so as not to require relatively expensive shielded sensor wiring to each element (e.g., each element can measure and digitally communicate perimeter ranges and/or range profiles, such as two or three dimensional range profiles, to controller 130). In various embodiments, a series of such range and/or range profile measurements may be used to determine a relative velocity of a navigation hazard within a monitoring perimeter of the sensor element(s). In general, a monitoring perimeter associated with each sensor element and/or array of elements may be selected by a timing constraint, for example, or may be limited by a sensitivity and/or power output of perimeter ranging system 148b.

Unlike automotive solutions, which are relatively large and so have to be recessed into the bumper or other surface of a vehicle, and each requiring their own sensor leads, single chip transducer/sensor elements are small enough that they can be integrated into a self-adhesive strip that may be surface mounted without significantly impacting a watercraft's aesthetics, hydrodynamic efficiency, or hull/fuselage integrity, and without requiring complex wiring. Rather than having to wire each sensor individually, an array or strip of such single chip transducer/sensor elements can be linked together (e.g., daisy chained, bus linked, mesh linked, and/or linked according to other topologies) so that the array includes a single common power line input and/or a single common communication line input/output, from which all chips may draw power and communicate with each other and/or controller 130, for example. Such strip or array may have a single electrical coupling at one end, so a single cable can be routed to neatly enter into the hull through a single hole disposed in the transom, for example, or the deck. In some embodiments, the power line may support both power delivery to the individual sensor elements and communication between the sensor elements and to/from controller 130. In various embodiments, such sensor arrays/strips may be integrated with and/or along a hull or gunwale of a vessel, similar to antenna array assemblies 148b shown in FIG. 1B (e.g., assemblies 148b may alternatively be implemented as ultrasonic sensor elements 148b).

Lidar is improving rapidly and has the advantage of being able to detect navigation hazards without ambient light. Lidar produces a $3d$ point cloud and so is suited to measuring distances to the dock, and analytics to determine dock/obstacle vs water are straightforward since the water is substantially a flat plane and objects more than a predetermined threshold above this plane can be designated as navigation hazards. The LIDAR data can be rendered as an image from an elevated perspective, making it relatively easy and intuitive for a user to designate a target docking position. However, LIDAR is currently expensive, especially if multiple installations are required to get a clear view of the perimeter of mobile structure 101 (e.g., port and starboard installations). Short range radar systems (e.g., including approximate square centimeter sized two and/or three dimensional radar antenna arrays configured to detect and/or range objects between a few centimeters and 10 s of meters away) are also improving rapidly, but such systems could be relatively prone to damage and would be relatively complex to mount and wire along a perimeter of mobile structure 101 in order to provide sufficient coverage for common docking assist maneuvers.

A less expensive alternative, according to embodiments disclosed herein, is one or more cameras (e.g., including visible spectrum and/or infrared/thermal imaging modules) mounted relatively high on mobile structure 101 to provide a sufficient monitoring perimeter around mobile structure 101 and a sufficient vertical perspective of a perimeter of mobile structure 101 to reliably detect and range navigation hazards relatively close to the perimeter of mobile structure 101 (e.g., within a meter of the perimeter of mobile structure 101). Each camera may include a microelectromechanical systems (MEMS) based gyroscope/accelerometer sensor (e.g., similar to gyroscope/accelerometer 144) configured to provide a vertical reference (e.g., corresponding to the gravitational "down" vector) for images captured by the camera, for example, and/or the camera and/or controller 130 may be configured to determine a horizontal reference (e.g. corresponding to a horizon, such as where the sea surface meets the horizon). From these references and a known height of the camera, reliable and precise ranges between a perimeter of mobile structure 101 and a detected navigation hazard can be determined, and without need of supplemental perimeter sensor data and/or perimeter ranging systems, as described herein. Alternatively any of such cameras may be implemented as stereo cameras that are able to determine the height of the camera above a surface based on parallax effects such as the pixel position of a detected structure in a first image captured by a first imaging module of the stereo camera being at a different pixel position in a second image captured by a second imaging module of the stereo camera at approximately the same time the first image is captured.

FIG. 2A shows diagram 200 illustrating mounting positions and corresponding monitoring perimeters for perimeter ranging system components associated with powered yacht arrangement 210 and sailing yacht arrangement 220, in accordance with an embodiment of the disclosure. In powered yacht arrangement 210, perimeter ranging system 148 includes cameras/imaging modules mounted at positions 212, 214, and 216 providing a monitoring perimeter for mobile structure 101 corresponding roughly to the combined fields of view (FOVs) 213, 215, and 217, as shown. As can be seen from FOVs 213, 215, and 217, camera 212 may be implemented by a relatively narrow FOV navigational camera aimed substantially forward with respect to mobile structure 101 so as to detect navigation hazards substantially off the bow of mobile structure 101, both while docking and while underway. Cameras 214 and 216 may be implemented by relatively wide FOV docking cameras (e.g., fisheye lens cameras) aimed down and over respective port and starboard sides of mobile structure 101 so as to detect navigational hazards substantially port, starboard, and/or aft of mobile structure 101. In various embodiments, one or more of cameras 212, 214, and 216 may be mounted to mobile structure 101 at different mounting points and/or using an actuated mount, so as to adjust FOVs 213, 215, and 217 and/or a monitoring perimeter for perimeter ranging system 148 (e.g., according to a speed of mobile structure 101 and/or other operational modes for mobile structure 101 and/or system 100).

In sailing yacht arrangement 210, perimeter ranging system 148 includes cameras mounted at positions 212, 214, and 216 providing a monitoring perimeter for mobile structure 101 corresponding roughly to the combined FOVs 213, 215, and 217, as shown. As can be seen from FOVs 213, 215, and 217, cameras 214 and 216 may be mounted at ends of a spreader 232 to place them as close to the width of the beam of mobile structure 101 as possible so they can view navigation hazards arbitrarily close to a perimeter (e.g., the hull) of mobile structure 101. Furthermore, cameras 214 and 216 may be mounted such that their respective FOVs 215 and 217 each at least partially overlap with FOV 213 of camera 212, so as to provide a seamless monitoring perimeter.

More generally, perimeter ranging system 148 may include any number of articulated and/or non-articulated mono and/or stereo cameras mounted about mobile structure 101 to provide a targeted monitoring perimeter (e.g., a temporally changing monitoring perimeter) and/or seamless monitoring perimeter about mobile structure 101. For example, such monitoring perimeter may increase or decrease in size with a linear and/or angular velocity of mobile structure 101, and/or may be biased towards a linear or angular velocity of mobile structure 101 to provide a larger monitoring perimeter in the direction of motion of mobile structure 101. Controller 130 and/or perimeter ranging system 130 may be configured to receive imagery captured by the cameras as perimeter sensor data, process the imagery to detect navigation hazards within the monitoring perimeter, for example, and determine ranges to the navigation hazards and/or relative velocities of the navigation hazards based on the perimeter sensor data.

If the ranges to the navigation hazards are within a safety perimeter for mobile structure 101, or the relative velocities of the navigation hazards towards mobile structure 101 are greater than a hazard velocity limit, controller 130 may be configured to determine docking assist and/or navigation control signals configured to cause navigation control system 190 to maneuver mobile structure 101 to evade the navigation hazards by maintaining or increasing the range to a navigation hazard or by decreasing the relative velocity of the navigation hazard towards the mobile structure. Such safety perimeter may be a preselected range from a perimeter of mobile structure 101 and/or from an approximate center of mobile structure 101, for example, may be provided by a manufacturer, by regulation, and/or by user input, and may vary according to a velocity of mobile structure 101. The hazard velocity limit may be a preselected velocity limit corresponding to relative velocities of navigation hazards towards mobile structure 101 (e.g., the component of their relative velocities towards a center of mobile structure 101 and/or towards a neared approach to a perimeter of mobile structure 101), for example, may be provided by a manufacturer, by regulation, and/or by user input, and may vary according to a velocity of mobile structure 101.

Because cameras intrinsically measure angle to a high degree of accuracy and precision, and because the camera mounting height above the water surface can be known accurately, it is possible to obtain reliable distance measurements to navigation hazards in view of the cameras. More generally, controller 130 and/or a logic device of perimeter ranging system 148 (e.g., image analyzer 270 of FIG. 2D) may be configured to detect a perimeter of mobile structure 101 and a navigation hazard in captured imagery/perimeter sensor data provided by such cameras/imaging modules, for example, and to determine a range from the perimeter of mobile structure 101 to the detected navigation hazard based, at least in part, on the perimeter sensor data and the mounting heights corresponding to such imaging modules, as described herein.

Figure 2B:
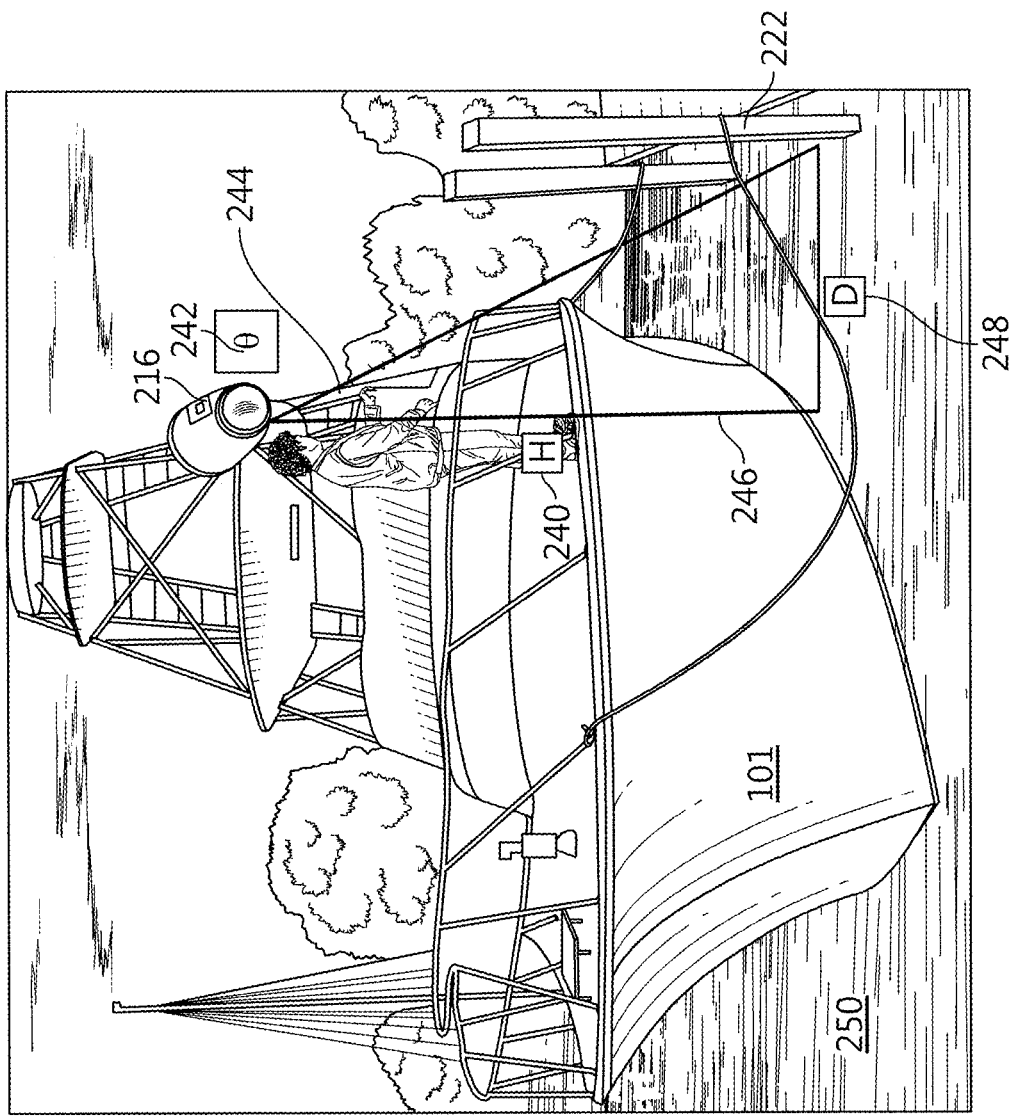

For example, FIG. 2B shows diagram 201 illustrating a range measurement associated with perimeter ranging system 148 including docking camera 216, in accordance with an embodiment of the disclosure. As shown in diagram 201, camera 216 may be mounted to mobile structure 101 at height 240 above water surface 250 and in view of at least a portion of a side of mobile structure 101 and dock 222. In various embodiments, angle 242 between vertical vector 246 and navigation hazard view vector 244 may be used to find the range 248 from mobile structure 101 to dock 222, where range 248=height 240*tan(angle 242). In various embodiments, navigation hazard view vector 244 may correspond to the position within the FOV of camera 216 where dock 222 intersects water surface 250, and angle 242 may be determined based on operating characteristics of camera 216.

Figure 2C:
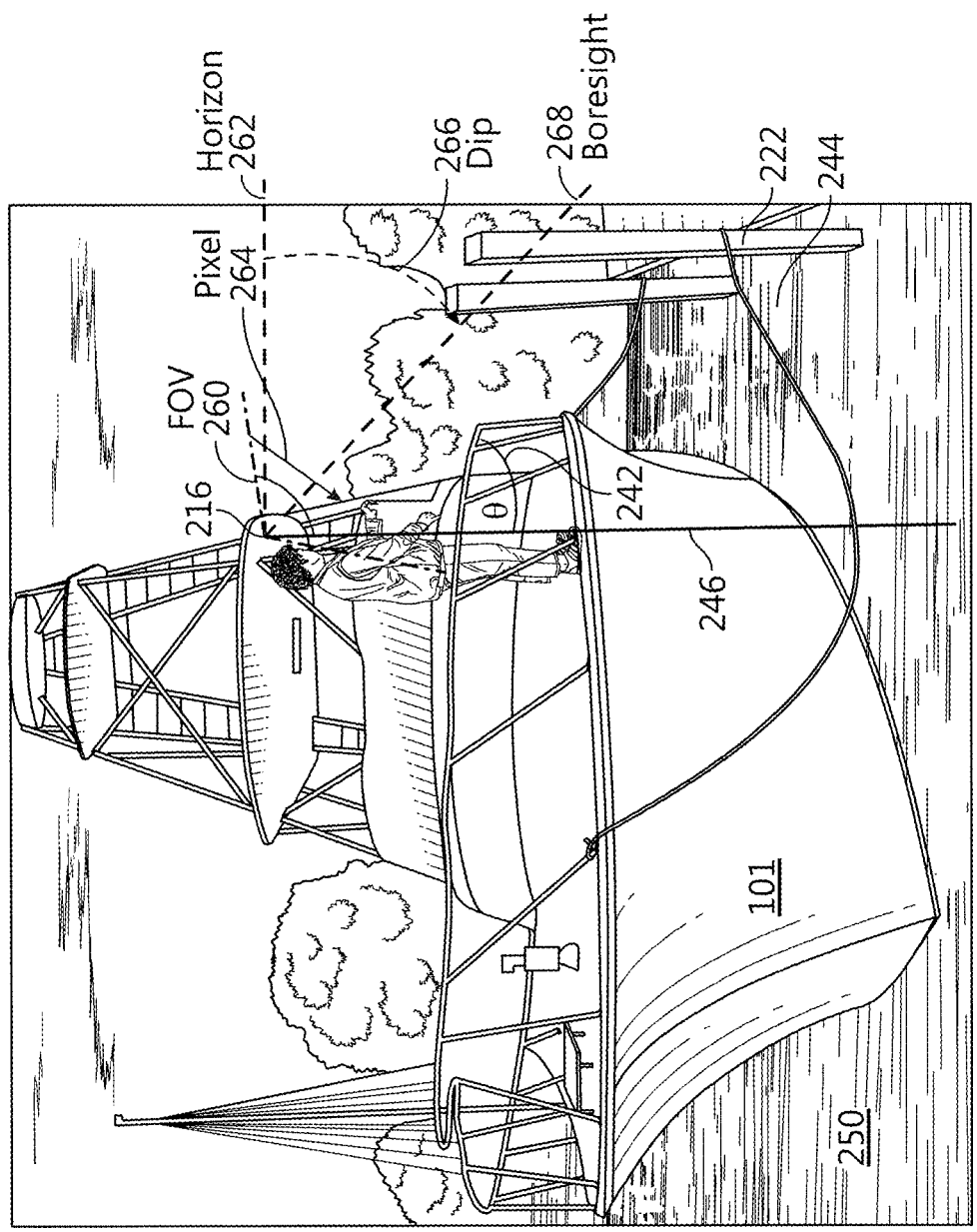

FIG. 2C shows diagram 202 illustrating a range measurement associated with perimeter ranging system 148 including docking camera 216, in accordance with an embodiment of the disclosure. In particular, diagram 202 shows one technique to determine angle 242 of FIG. 2B. As noted herein, water surface 250 is substantially horizontal, which can be used to provide one of two triangle perpendiculars (e.g., the horizontal reference); the other perpendicular is a vertical reference. A vertical reference may be provided by user input indicating mounting offsets, an automatic calibration process configured to detect vertical offsets through image processing (e.g., through horizon detection or similar), and/or by gyroscope/accelerometer sensors integrated with the camera and factory aligned to the FOV of the camera. For example, a 3 axis MEMS accelerometer can be integrated with the camera and factory aligned to its boresight. Furthermore, the MEMS accelerometer may be combined with a MEMS gyroscope to detect and compensate for momentary accelerations of mobile structure 101 to prevent such accelerations from introducing short term errors in the vertical reference.

As such, in various embodiments, angle 242 can be obtained from: angle 242=90−((Pixel 264−NoPixels/2) *CameraFOV 260/NoPixels)−DipAngle 266, where DipAngle 266 is the angle between horizontal reference vector 262 (e.g., which is perpendicular to the vertical reference and parallel to the horizon) and boresight vector 268, CameraFOV 260 is the vertical angular FOV of camera 216, Pixel 264 is the pixel distance between an edge of CameraFOV 260 and navigation hazard view vector 244, and NoPixels is the number of pixels across CameraFOV 260. Other techniques are contemplated, including other techniques relying on physical and/or operating characteristics of camera 216.

Such distance or range measurements require some image analytics to detect where dock 222 intersects water surface 250. In some embodiments, controller 130 may be configured to execute neural networks implemented as software code trained to recognize dock features and other navigation hazards such as mooring warps or other watercraft and to differentiate such navigation hazards from other objects such as seaweed, seagulls. Alternative and complimentary statistical processes can be used. In some embodiments, such analytics architected for minimal latency by performing the analytics before compressing and converting the images for further image processing. For example, a wired communications link may be formed between camera 216 of perimeter ranging system 148 and controller 130 where the communications link enables uncompressed high speed video to be transferred down a single cable with lower speed control and data overlaid bi-directionally.

Figure 2D:
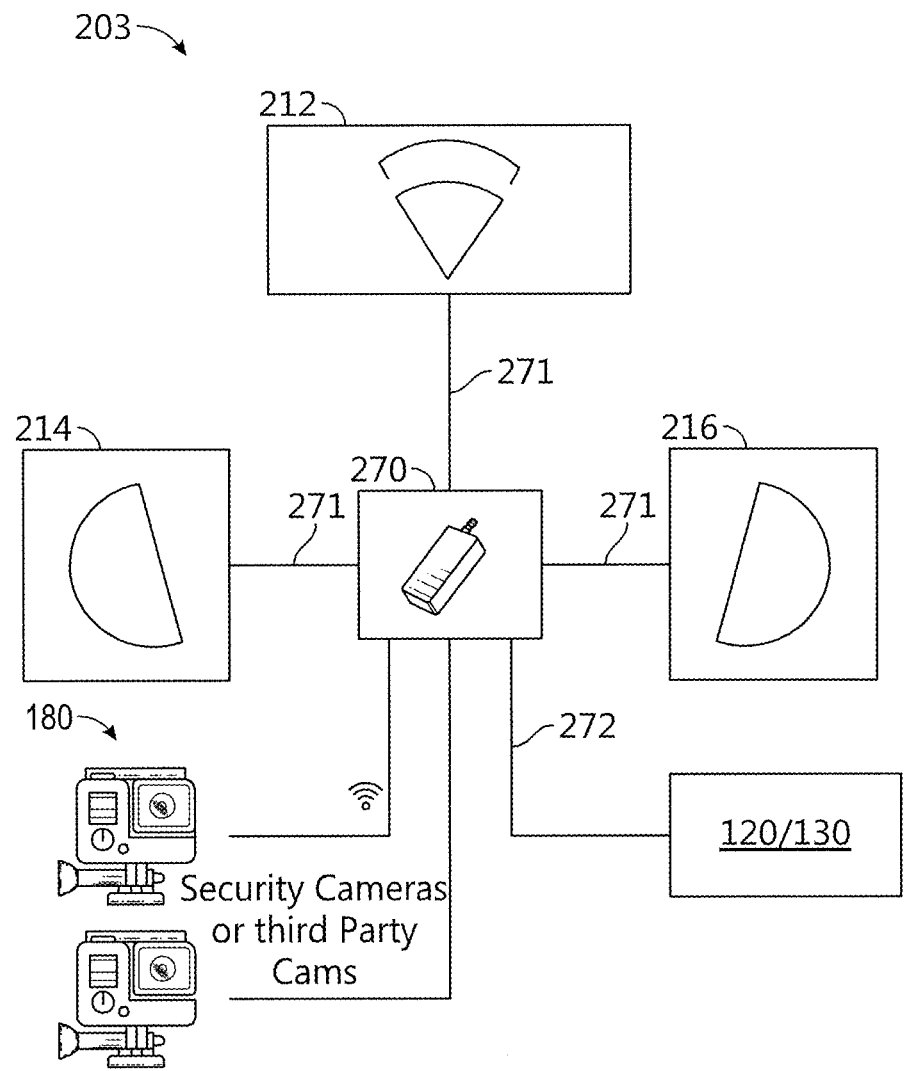

FIG. 2D shows diagram 203 illustrating a system architecture for perimeter ranging system 148 utilizing such communication link, in accordance with an embodiment of the disclosure. As shown in diagram 203, perimeter ranging system 148 may include cameras 212, 214, and 216 coupled to image analyzer 270 over wired communication links 271, which may be configured to provide processed imagery and analytics metadata to user interface/controller 120/130 over communication link 272. Such architecture allows image analyzer 270 to provide analytics substantially in real time with minimal latency at relatively low cost. For example, image analyzer 270 may be implemented with a vector processor (e.g., such as a Myriad 2 or Myriad 3 vector processor) coupled to a video processing integrated circuit (e.g., such as the Ambarella S3L or S5L video processing ICs). In various embodiments, image analyzer 270 may be configured to detect and/or identify navigation hazards and other objects in a maritime scene, such as those shown in display views provided in FIGS. 2F-I. Image analyzer 270 may be configured to precisely stitch images received from cameras 212, 214, and 216 (e.g., by recognizing shoreline feature and using them as a basis for aligning images from different cameras). Also shown in diagram 203 are various other imaging devices 180, which may include security cameras, sports cameras, smart phone cameras, and/or other imaging devices that can be configured to interface with image analyzer 270.

Figure 2E:
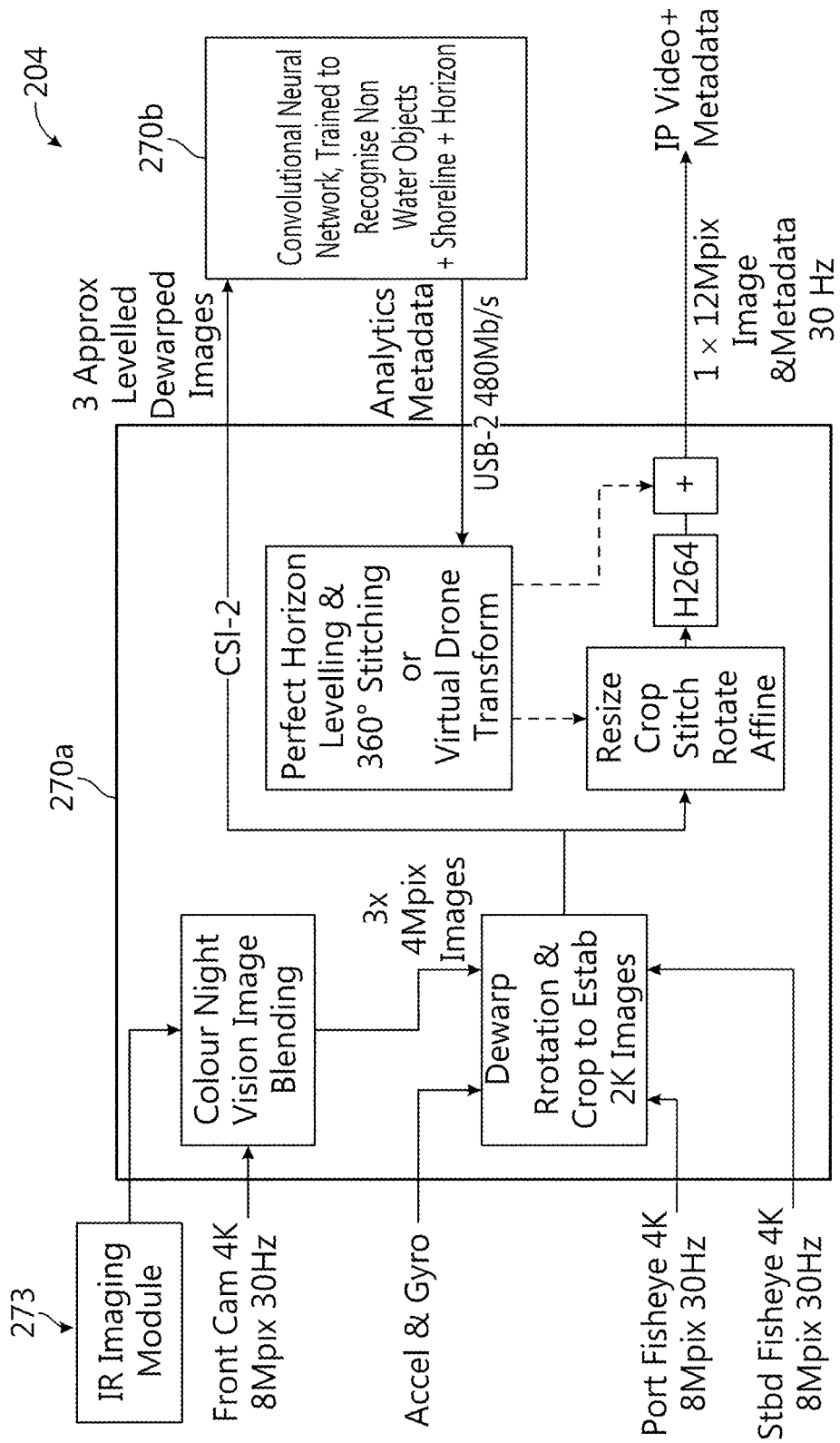

FIG. 2E shows diagram 204 illustrating a system architecture for perimeter ranging system 148 utilizing image analyzer 270, in accordance with an embodiment of the disclosure. As shown in diagram 2E, imaging devices 273 provide images and/or video to video processing integrated circuit 270a of image analyzer 270, which collaborates with co-processor 270b of image analyzer 270 to detect and identify navigation hazards and other objects in the images provided by imaging devices 273. Resulting processed imagery (e.g., stitched imagery, synthetic viewpoint elevation imagery, and/or other processed imagery) and/or analytics metadata (e.g., bounding boxes, extents, type, and/or other characteristics of detected and identified navigation hazards and other objects) may then be provided to other elements of system 100, such as user interface 120 and/or controller 130.

In some embodiments, image analyzer 270 may be configured to stitch images provided by any one or combination of cameras 212, 214, and/or 216, for example, to generate an all-around view while navigating at sea and/or to generate a synthetic elevated view (e.g., a top-down view) while docking. In general, it is topologically impossible to show an all-round de-warped view by simply stitching two fisheye camera outputs together. However, a synthetic elevated view, also referred to as a virtual drone view, may be generated from such images, which changes the viewpoint to something that can be projected onto a flat screen. Unlike conventional automotive systems, which typically create significant distortions with respect to nearby objects, the relatively high mounting point of at least cameras 214 and 216 results in less distortion and thereby facilitates producing accurate distance measurements and more intuitive imagery. In some embodiments, such virtual drone views may be scaled so that distances can be read off directly from the display of user interface 120 by a user.

Figure 2F:
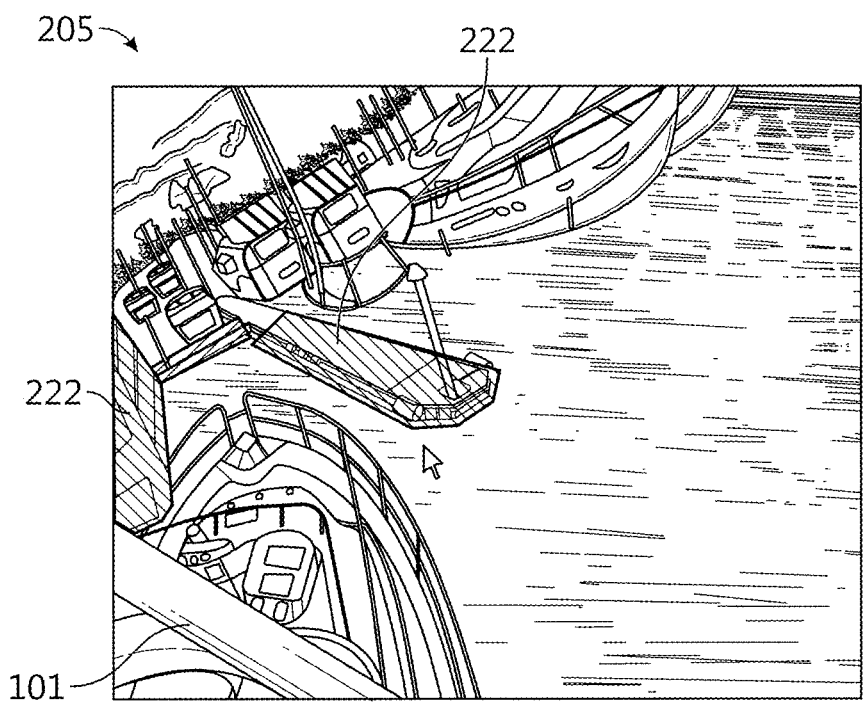
Figure 2G:
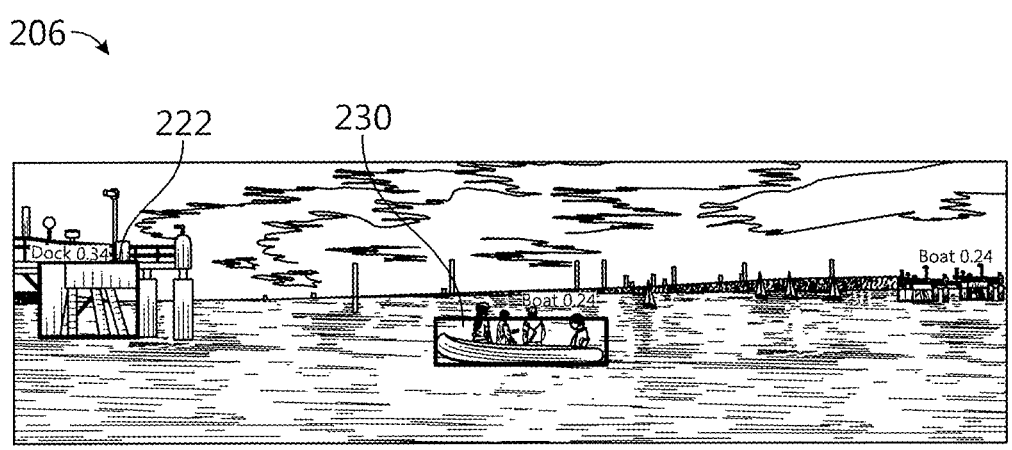
Figure 2H:
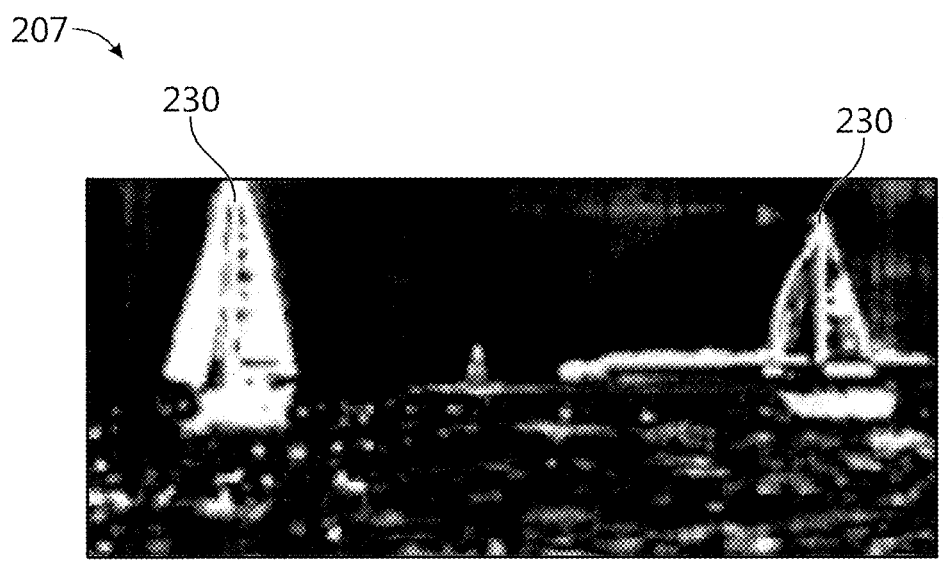
Figure 2I:
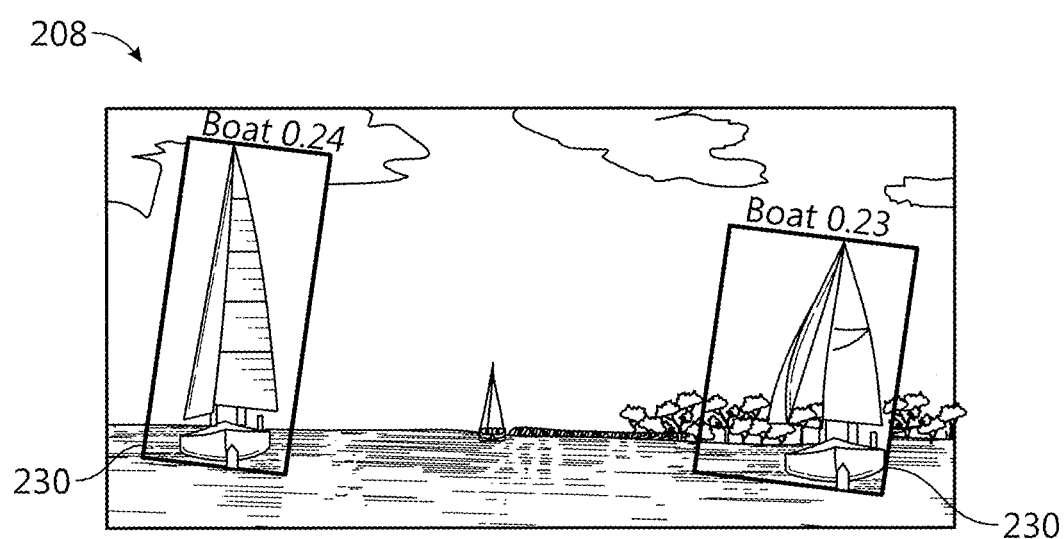

FIGS. 2F-J show display views 205-209B illustrating perimeter sensor data from perimeter ranging system 148, in accordance with an embodiment of the disclosure. For example, display view 205 of FIG. 2F shows an image captured by camera 216 of a docking area including dock 222 after processing by image analyzer 270. As shown in display view 205, dock 222 has been identified (e.g., by co-processor 270b) and highlighted with a green overlay (e.g., provided as analytics metadata by video processing IC 270a) to help a user guide mobile structure 101 into dock 222. Display view 206 of FIG. 2G shows an image captured by camera 212 of a docking area including dock 222 and watercraft 230 after processing by image analyzer 270, which includes bounding boxes and identifiers (e.g., textual names and/or ranges) associated with dock 222 and watercraft 230. Display view 207 of FIG. 2H shows a thermal image captured by camera 212 of two watercraft 230 after processing by image analyzer 270 to increase contrast and/or provide identifiers for watercraft 230. Display view 208 of FIG. 2I shows a visible spectrum image captured by camera 212 of two watercraft 230 after processing by image analyzer 270, which includes bounding boxes and identifiers associated with detected watercraft 230.

Figure 2J:
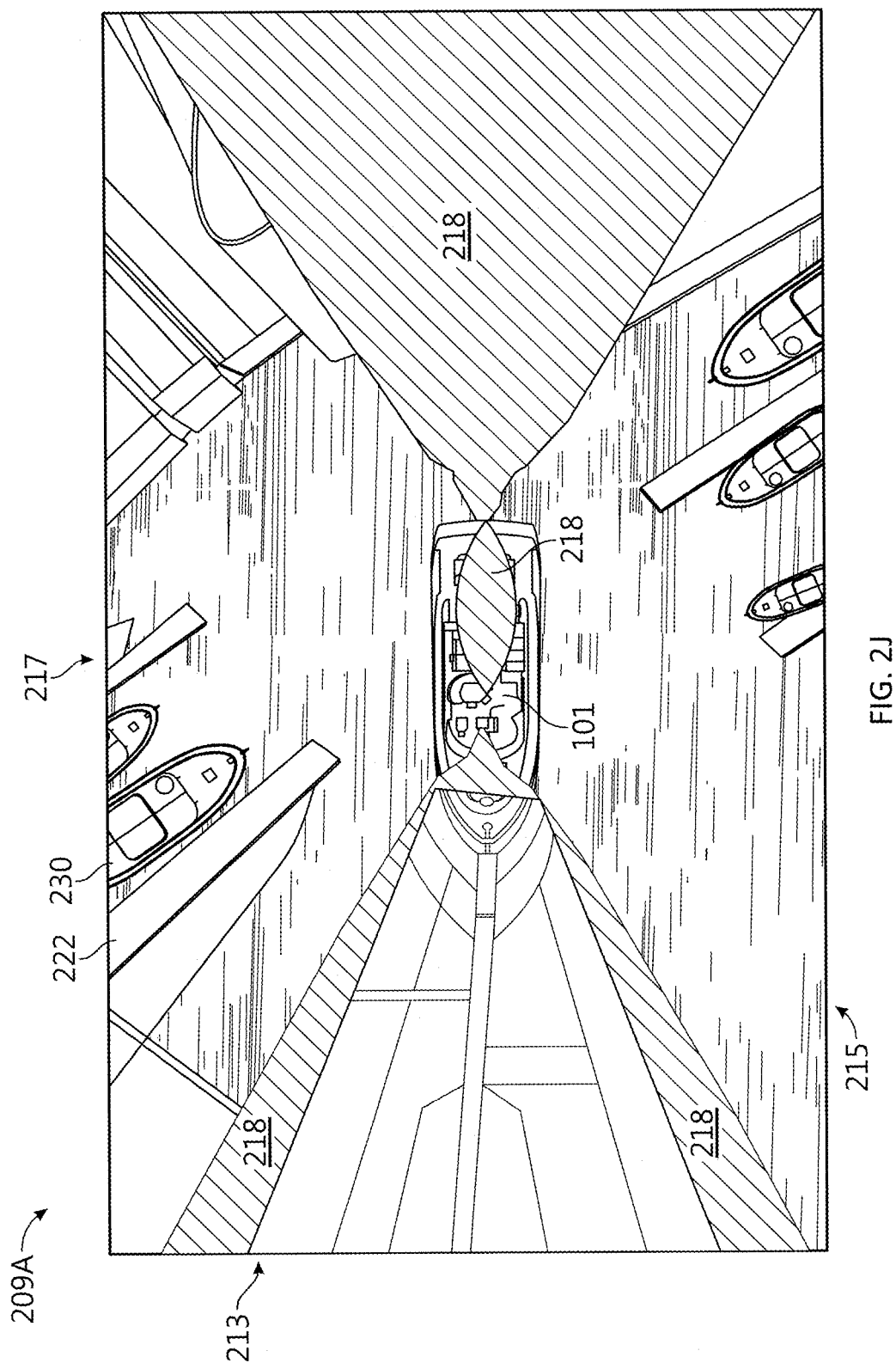

As noted herein, a synthetic elevated view/virtual drone view may be generated from images captured by cameras mounted to various portions of mobile structure 101, such as a gunwale, bridge, mast, and/or other portion of mobile structure 101, and a fused or stitched version of such images may be projected onto a flat surface and rendered in a display of user interface 120. For example, display view 209 of FIG. 2J shows a combination of visible spectrum images captured by cameras 212, 214, and 216 coupled to mobile structure 101 and projected/mapped onto a (virtual) flat surface and rendered for display (e.g., by image analyzer 270 and/or user interface 120). As shown in FIG. 2J, display view 209A shows mobile structure 101 attempting to dock at dock 222 while navigating to avoid collision with other watercraft 230 and/or other structures identified within FOVs 213, 215, and 217. Display view 209A also shows various un-imaged areas 218 (e.g., where the various FOVs fail to overlap), which may in some embodiments be left blank or supplemented with prior-image data (e.g., captured while mobile structure 101 was at a different position or orientated differently) and/or other perimeter ranging system data, such as above or below water sonar data indicating the relative position of an object surface or underwater hazard within un-imaged areas 218.

Figure 2K:
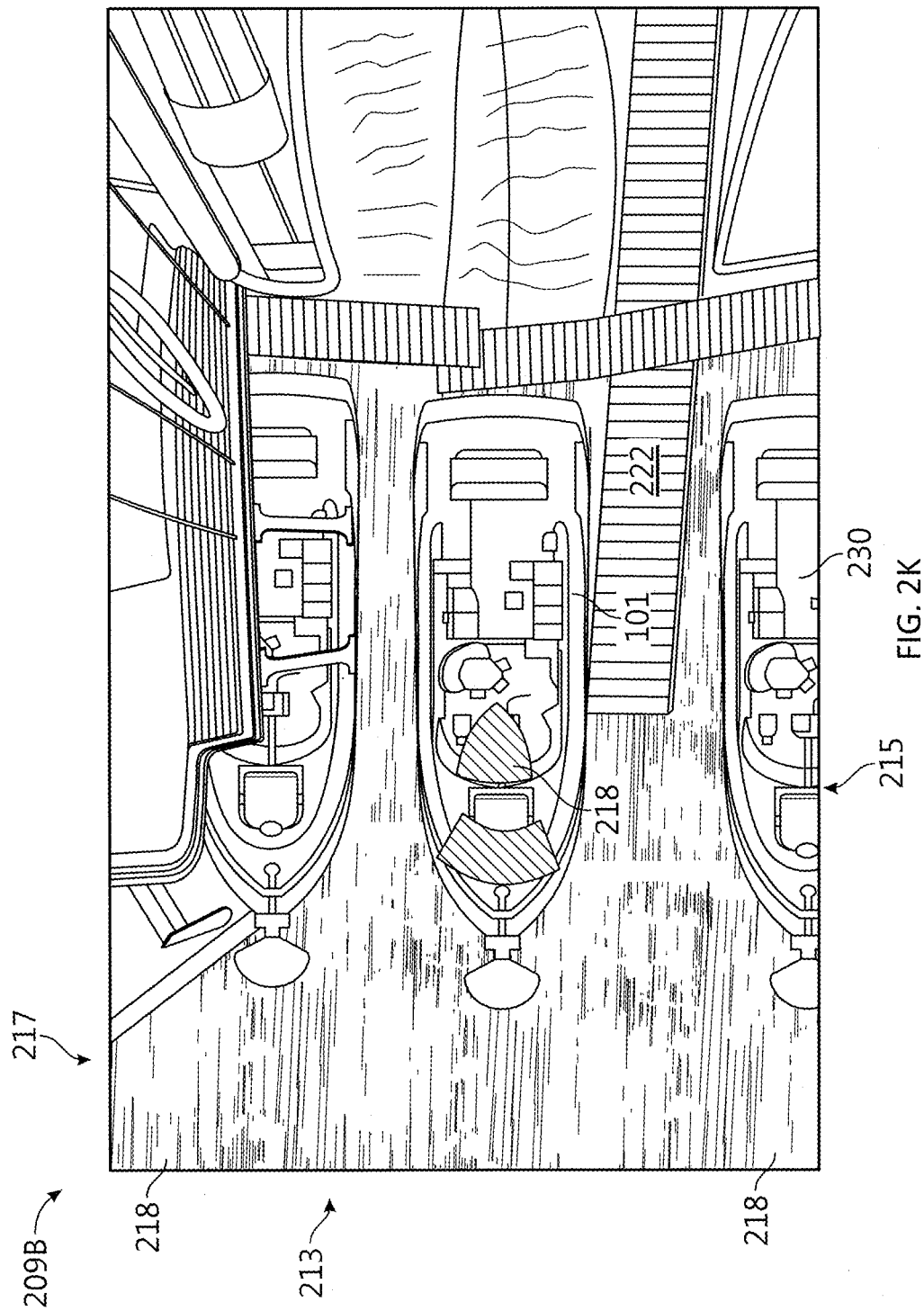

Another example is provided by display view 209B of FIG. 2K, which shows a combination of visible spectrum images captured by cameras 212, 214, and 216 coupled to mobile structure 101 and projected/mapped onto a (virtual) flat surface and rendered for display (e.g., by image analyzer 270 and/or user interface 120), but where FOVs 213, 215, and 217 corresponding to images captured by cameras 212, 214, and 216 are processed to generate a substantially isomorphic representation of at least the perimeter of mobile structure 101. Such processing may include, for example, linear and/or non-linear unwarping/dewarping, scaling, translating, cropping, resampling, image stitching/combining, and/or other image processing techniques configured to generate an isomorphic representation of at least the perimeter of mobile structure 101 from images captured by cameras 212, 214, and 216, for instance, and/or to minimize the size and/or prevalence of un-imaged areas 218.

As shown in FIG. 2K, display view 209B shows mobile structure 101 docked at dock 222 next to other watercraft 230 and/or other structures identified within FOVs 213, 215, and 217. Display view 209B also shows various un-imaged areas 218 (e.g., where the various processed FOVs fail to overlap), which may in some embodiments be left blank or supplemented with prior-image data and/or other perimeter ranging system data and/or other ranging system data.

To simplify installation and setup of perimeter ranging system 148, and generate display views 209A, 209B, and/or other display views described herein, the various camera angles can be automatically calibrated/derived/determined by capturing images while maneuvering mobile structure 101 through 360° while close to dock 222, and the resulting set of images can be used to self-calibrate for camera height, distance from a centerline of mobile structure 101, and/or other operating and/or mounting characteristics of the cameras. For example, the calibration of the cameras may be performed automatically; when the boat executes a 360° turn in a crowded environment such as a marina or port, the images that sweep past the different cameras move out of one field of view and into the next in a manner which is only consistent with the yaw rate data (e.g., from orientation sensor 140) and a single set of calibration parameters for the cameras. In alternative embodiments, range may be measured, calibrated, and/or adjusted using motion of mobile structure 101 and various image analytics applied to images captured by perimeter ranging system 148. While multiple cameras can be used in stereo to determine ranges, such arrangements can undesirably add to system cost and complexity.

In some embodiments, cameras 212, 214, and 216 may be characterized by a manufacturer in a lab prior to use, or may be characterized by a user and a known geometry reference (e.g., a poster of images with known geometries placed a known distance and orientation relative to the camera), and the resulting camera characteristics may be used to determine unwarping parameters for an unwarping process that, for example, removes various types of image distortions introduced by lenses and/or other physical characteristics of cameras 212, 214, and 216. Each camera may include an orientation sensor and/or accelerometer or similar sensor configured to provide an elevation (e.g., downward pointing angle) and/or an azimuth (e.g., relative heading/bearing) corresponding to respective FOVs 213, 215, and 217, or approximate elevations and/or azimuths may be assumed for a typical mounting (e.g., 45 degree negative elevation and +−110 degree relative azimuth for lateral view cameras 214 and 216, 10 degree negative elevation and zero degree relative azimuth for forward view camera 212). Similarly, other installation geometries can be estimated or assumed (e.g., all cameras mounted at an altitude of 3 meters, forward view camera 212 2 meters longitudinally in front of lateral view cameras 214 and 216, lateral view cameras 214 and 216 3 meters laterally apart from each other).

From these measured and/or assumed/estimated installation geometries, an initial or estimated image stitching, unwarping, and/or other processing may be performed to generate the isometric representation of at least a perimeter of mobile structure 101. Such initial or estimated isometric mapping may be modified and/or refined based on isometric registration of structures imaged by spatially overlapping FOVs and/or time-spaced overlapping FOVs (e.g., as mobile structure maneuvers and/or rotates through a scene). The magnitudes of such adjustments to the isometric mapping may be adjusted over time (e.g., by a multiplicative coefficient) and be fairly aggressive initially (e.g., coefficient close or equal to 1) but taper off based on the number of co-registered structures, time of calibration, and/or other calibration parameters (e.g., coefficient trending to a value between 0.1 and zero).

Autonomous docking assist requires techniques for defining target docking positions and/or orientations, for example, and/or target docking tracks (e.g., a waypoint defined path from a current position and orientation of mobile structure 101 to a target docking position and/or orientation, which may include a series of waypoints indicating corresponding series of positions and/or orientations for mobile structure 101). Such target docking tracks may include one or more specified target linear and/or angular velocities along the track, target transit times, target mobile structure orientations, and/or other docking track characteristics, for example, which may be selected by a user and/or specified by various docking safety parameters (e.g., regulations or user-supplied limits on maneuvers within a docking area). Thus, a docking assist user interface should include display views allowing a user to specify target docking positions and/or orientations, and/or target docking tracks, as described herein.

In some embodiments, user interface 120 and/or controller 130 may be configured to render, on a display of user interface 120, a selectable image or icon representing at least the profile of mobile structure 101 over a navigational chart of a docking area and/or a camera image of an area surrounding mobile structure 101 and including the docking area, captured by perimeter ranging system 148. Such icon may be moved across the chart or image by user input (e.g., user touch, joystick input, mouse input, and/or other user input) to indicate a target docking track and/or a target docking position and/or orientation within the generated view of the docking area. Typically, a user would manually steer mobile structure 101 to a point in clear view of a target berth, then stop mobile structure 101, and then engage an autonomous docking mode. The docking assist system may be configured to hold the position and/or orientation of mobile structure 101 while the user defines the target docking track and/or a target docking position and/or orientation, which may in some embodiments be performed using a two finger slide/rotate of the icon/image corresponding to mobile structure 101 through the docking area as presented by the chart and/or image of the docking area. In some embodiments, such movement of the icon/image within the rendered view relative to various navigation hazards may be limited by a predefined minimum safety perimeter, as disclosed herein, which may be set to approximately 20 cm.

Advantageously, embodiments provide a user substantial influence over docking maneuvers; for example, the user may chose when to engage the autonomous docking process (e.g., the user may define both a starting point and an ending point of the docking maneuver). A user wishing to exercise relatively tight control over the starting point can engage the autonomous docking process closer to the target docking position, whereas a user wishing less control over the process could engage earlier, thereby allowing the docking assist system to manage more of the maneuver. In some embodiments, a safety limit may limit how early the process can be engaged, such as no further than 20 boat lengths from the target docking position.

Docking assist system 100 may also be configured to provide various types of convenience-centric target selection techniques when rendering a docking assist user interface, as described herein. For example, a docking assist user interface may include a selection of favorite or pre-memorized 'home' or commonly used target docking positions and orientations. A docking assist user interface may also include a listing of auto-prompted best docking positions corresponding to a selected docking area, a current position of mobile structure 101, a current traffic within the selected docking area, and/or other docking area characteristics and/or operational status of mobile structure 101.

In some embodiments, docking assist system 100 may be configured to detect an optical target positioned and/or held at a target dock and/or slip/berth (e.g., using perimeter ranging system 148) and determine the target docking position and/or orientation based on the position and/or orientation of the optical target. Similarly, docking assist system 100 may be configured to detect a system of fixed optical targets (e.g., provided by a marina) and identify a target docking position, orientation, and/or track indicated by the system of fixed optical targets. In a further embodiment, docking assist system 100 may be configured to identify a target docking position and/or orientation based on a berth reference (e.g., provided by user input) associated with a charted and/or imaged docking area.

In addition to receiving selection of target docking position, orientation, and/or track, docking assist system 100 may be configured to adjust and/or reroute a selected target docking position, orientation, and/or track according to navigation hazards detected along the docking track by perimeter ranging system 148 and/or any external disturbances (e.g., wind and/or water currents affecting navigation of mobile structure 101). For example, docking assist system 100 may be configured to maintain a safety perimeter to navigation hazards and/or other objects, which may be speed dependent. In some embodiments, prevailing wind and water currents may be stronger than the maximum thrust of thrust maneuver system 172, for example, or thrust maneuver system 172 may be absent, and docking assist system 100 may be configured to maintain a relatively high velocity using propulsion system 170 until relatively close to a target docking position, then use a combination of reverse thrust provided by propulsion system 170, steering input provided by steering actuator 150, and/or supplemental vectored thrust provided by optional thrust maneuver system 172 to slow and/or orient mobile structure 101 just before entering the target docking position and/or orientation.

In various embodiments, docking assist system 100 may be configured to compensate for slip dynamics of mobile structure 101 (e.g., unlike road vehicles that follow a prescribed direction of travel, watercraft slip sideways when they turn and this leeway effect can be significant at low speeds and very significant for power boats which have almost no keel) and/or for other operating characteristics of mobile structure 101, such as the effects of prop torque, which tends to turn a watercraft.

In addition, a target track for a powered watercraft will typically be different from the target track for a sailing watercraft: a sailboat can aim at the docking pontoon and turn at the last second because its keel substantially prevents sideslip; a powerboat should turn a few seconds earlier because its sideslip is typically significant and can cause the powerboat to drift sideways at the docking pontoon and potentially cause damage to its hull; a zodiac should tend to aim 45° to the side of a docking pontoon, coasting in during the last 5 or so seconds, and applying a burst of full reverse helm in the last 2 or so seconds, to slow the zodiac and tuck its stern into the docking berth.

The simplest target docking tracks are for mobile structures with thrust maneuver systems providing full control of sideways and rotational thrust. However, in the general case, a docking track generation process is non-linear and cannot be solved simply. As such, embodiments disclosed herein may be configured to execute a control, loop including a non-linear dynamic model of mobile structure 101, including navigation control system 190, sideslip characteristics, and wind and water current disturbances, and computing such model iteratively with respect to a starting state of mobile structure 101, a target docking position and orientation, and known navigation hazards. Such model provides target linear and angular velocities along the target docking track and can anticipate slide-slip. Embodiments disclosed herein may also designate a target docking track according to a set of predefined docking track patterns which are linked mobile structure type. Such patterns may be adjusted to fit a particular docking area and/or circumstance. Such docking track patterns may in some embodiments be learned from a user providing user input during a manual docking process, such as part of a training process; this can be done in real time or offline from a large database of recorded docking maneuvers. More specifically with regard to a docking assist user interface, docking assist system 100 may be configured to receive a target docking track as user input provided to user interface 120 as the user drags the icon/image of mobile structure 101 across a rendered chart or image of a docking area to a target docking position.

Figure 3A:
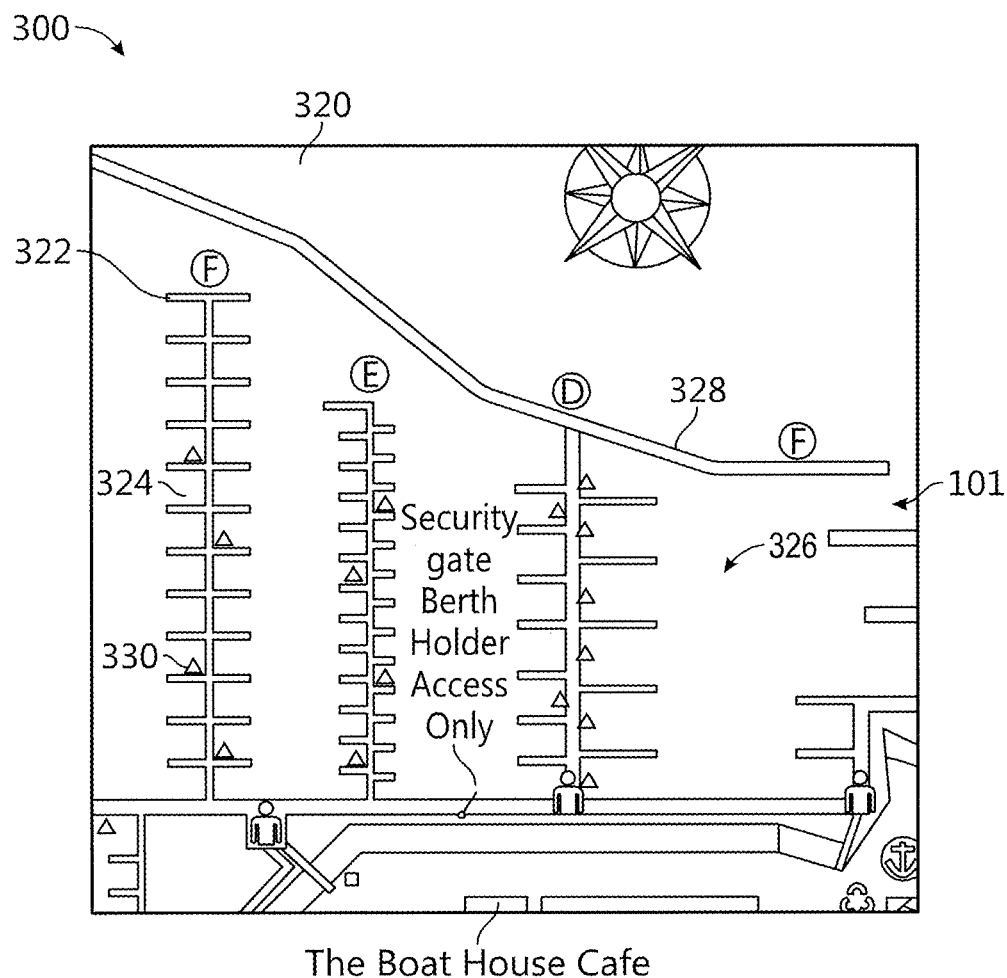
FIGS. 3A-E show display views and target docking tracks for a docking assist system in accordance with an embodiment of the disclosure.

FIGS. 3A-E show display views and selected target docking tracks for a docking assist system in accordance with an embodiment of the disclosure. For example, display view 300 of FIG. 3A shows a chart 320 of a docking area proximate mobile structure 101 and including multiple docks 322, slips or berths 324, docking area channels 326, sea wall 328, and other watercraft 330. In some embodiments, a user may select icon 101 (corresponding to a position of mobile structure 101) and drag it along channel 326 to a target docking position 324. In display view 300, a pop up menu may be provided to select a target docking orientation for mobile structure 101, since icon 101 only indicates position. In other embodiments, a user may select a berth or slip ID and docking assist system 100 may be configured to determine a target docking track to the corresponding berth or slip 324. Docking assist system 100 may be configured to adjust the determined target docking track according to various docking safety parameters and/or charted navigation hazards, for example, and may be configured to evade uncharted navigation hazards while maneuvering along the determined target docking track, as described herein.

Figure 3B:
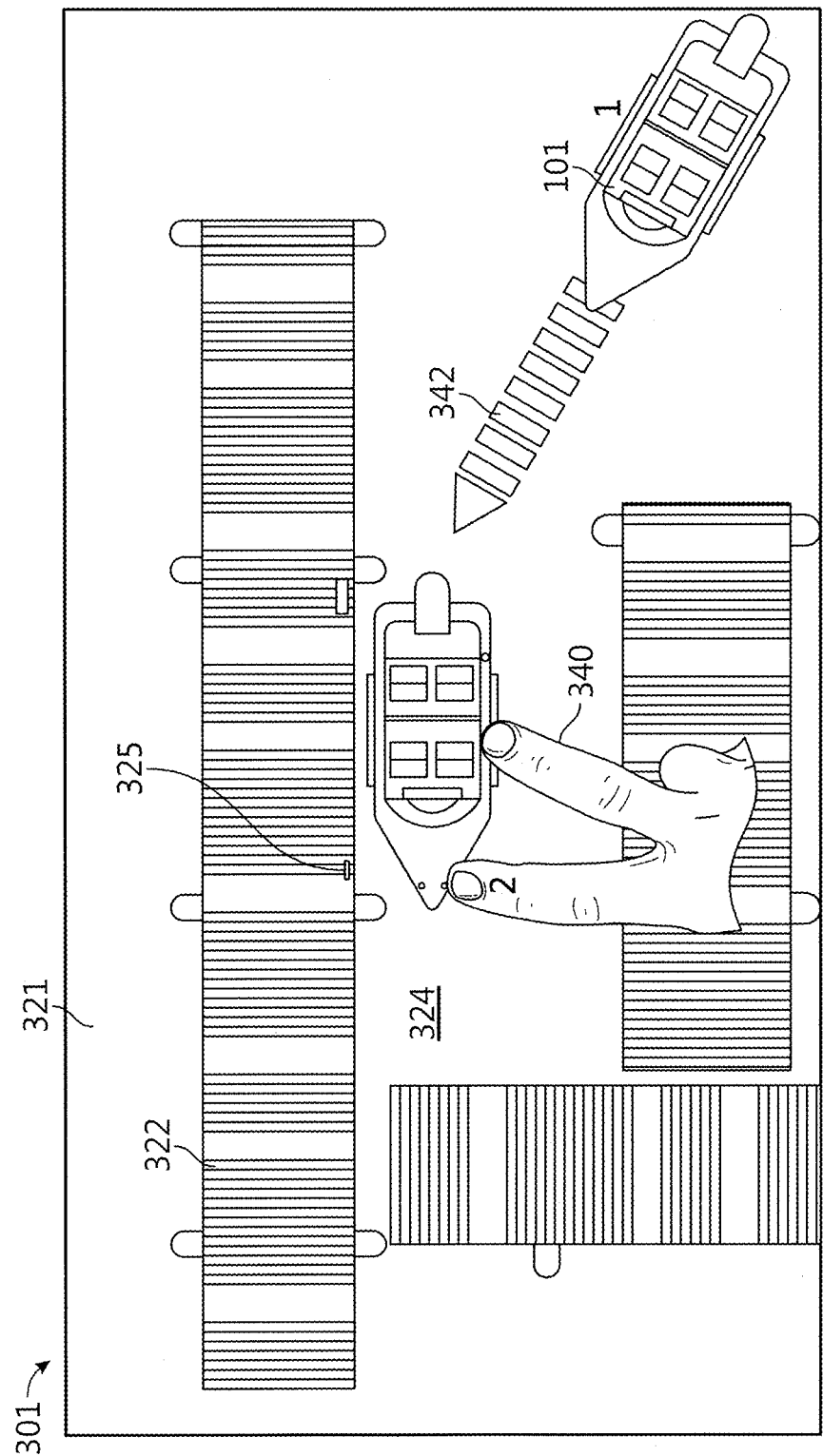
Figure 3C:
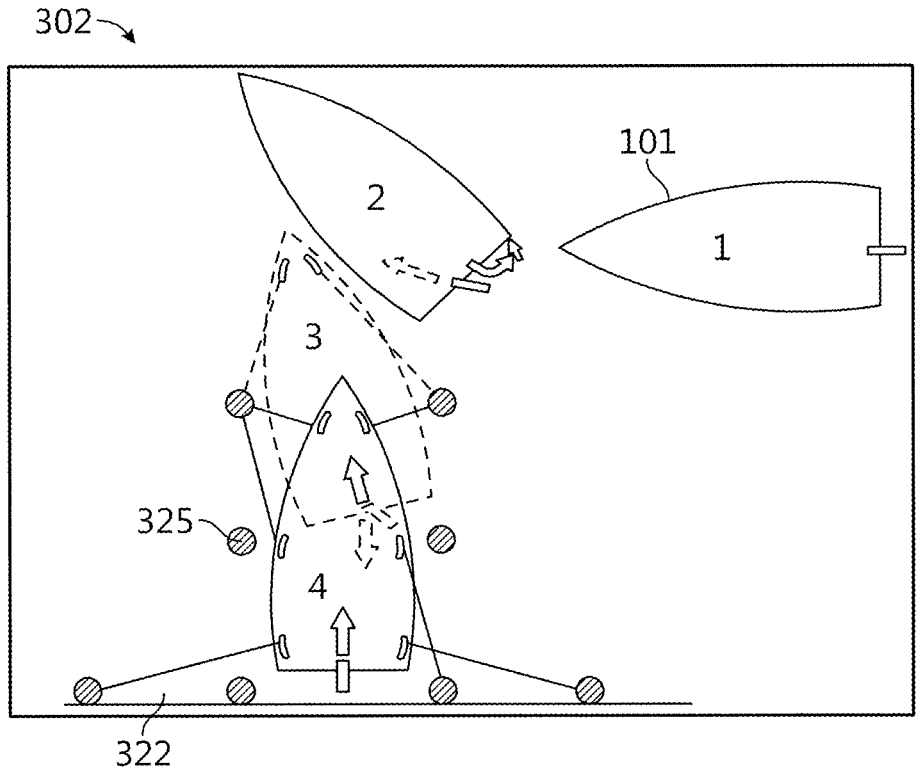

Display view 301 of FIG. 3B shows an image 321 of a docking area proximate mobile structure 101 and including docks 322, slip 324, and mooring lines 325. Also shown in display view 301 is a user providing user selection 340 to drag mobile structure icon 101 from starting position and/or orientation "1" along target docking track 342 and to target docking position and/or orientation "2". In some embodiments, a user may employ a two finger touch to a touchscreen display of user interface 120 to identify target docking track 342 and/or target docking position and/or orientation "2". A user may employ similar techniques to designate the target docking track ("1" through "4" and/or target docking position and/or orientation "4" in display view 302 of FIG. 3C. Display view 302 illustrates it can be nonobvious how a user wishes to dock mobile structure 101, and in the illustrated example, the user has chosen to be stern too, rather than side or bow too. Even when side too, a user may chose port or starboard sides as preferred due to wind direction, proximity to friends next door, facility to refuel, etc. Also shown in display view 302 are posts 325, which may be used to moor mobile structure 101.

Figure 3D:
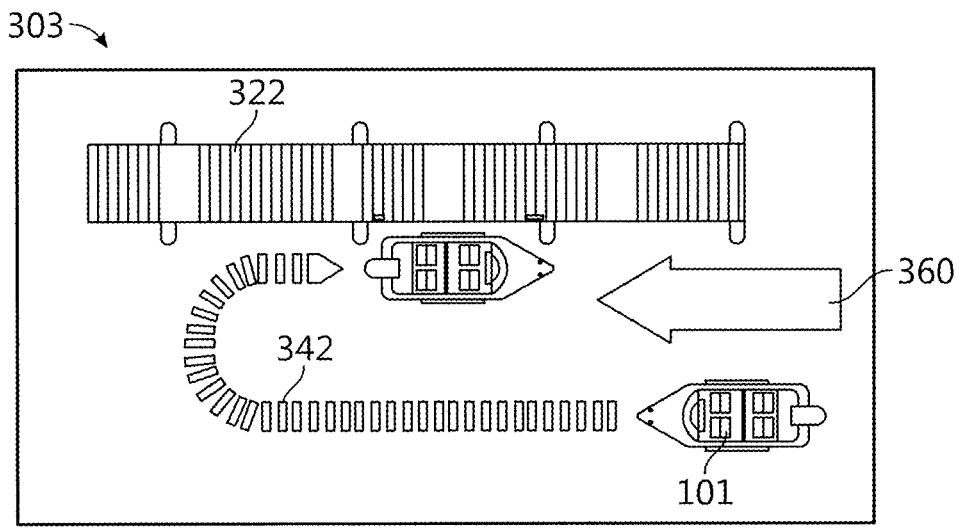
Figure 3E:
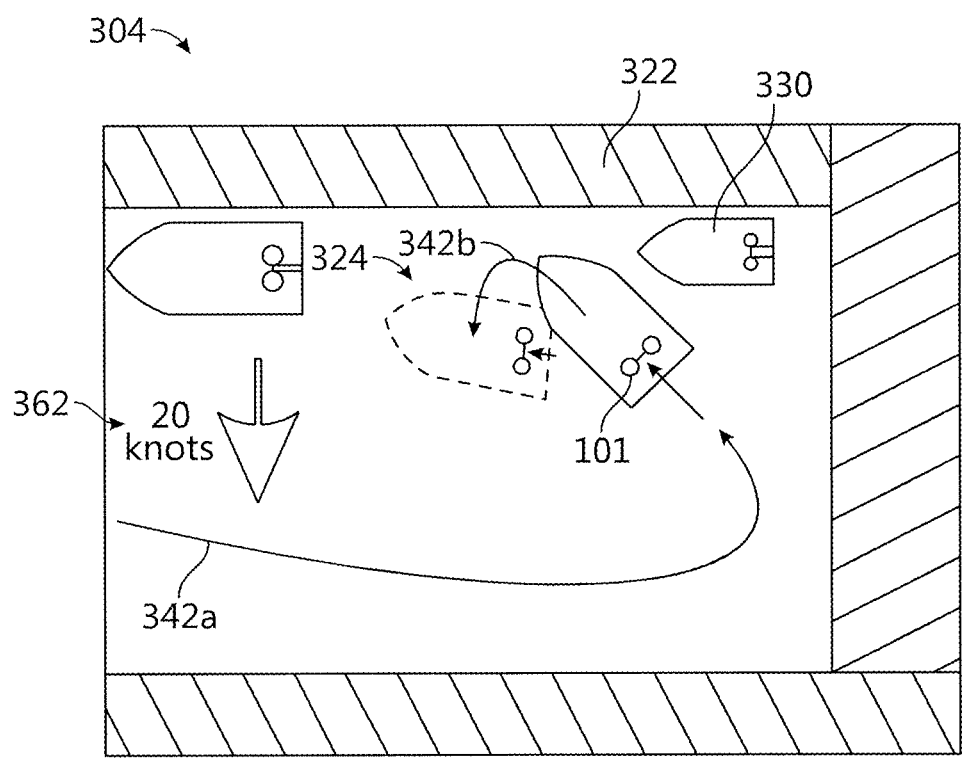

Display view 303 of FIG. 3D shows an image or chart of a docking area proximate mobile structure 101 and including dock 322, target docking path 342, and water current disturbance indicator 360. As shown, docking assist system 100 has determined target docking path 342 so as to compensate for water current disturbance 360 and simplify docking of mobile structure 101 to dock 322. Display view 304 of FIG. 3E shows and image or chart of a docking area proximate mobile structure 101 and including dock 322, slip 324, other docked watercraft 330, initial portion of target docking path 342a, final portion of target docking path 342b, and wind disturbance indicator 362. As shown, docking assist system 100 has determined target docking paths 342a and 342b so as to compensate for wind disturbance 362 and dock mobile structure 101 at slip 324 of dock 322.

A particular selected target docking operation (e.g., a target docking position, orientation, and/or track) may or may not be achievable given the available maneuvering capability of mobile structure 101 and/or a distribution of navigation hazards and/or corresponding docking safety parameters. Docking assist system 100 may be configured to evaluate a selected target docking operation and allow or confirm or engage such selection only if the operation is achievable. To evaluate a selected target docking operation, docking assist system 100 may be configured to simulate the target docking process using a dynamic model of the docking process, including maneuvering characteristics of mobile structure 101 and any navigation hazards and/or external disturbances, as described herein. Such dynamic model (e.g., described more fully with respect to FIGS. 4A-11 and 13-24B) may be used to simulate and thereby evaluate a selected target docking track, for example, and to automatically determine a target docking track (e.g., based, at least in part, on a selected target docking position and/or orientation). Moreover, such dynamic model may be used to evade a navigation hazard and/or to compensate for changing external disturbances.

For assisted docking, as opposed to fully autonomous docking, a user may provide primary control of maneuvering of mobile structure 101 through user interface 120 (e.g., a helm or joystick, for example), and docking assist system 100 may be configured to adjust and/or modify such user input to facilitate docking of mobile structure 101, such as by providing for intuitive control of maneuvering of mobile structure 101 and/or by overriding or modifying user input that would otherwise risk damage caused by impact with navigation hazards.

For example, docking assist system 100 may be configured to convert a standard joystick thrust controller (e.g., providing forward, backward, sideways, and/or rotational thrust in response to user input manipulating the joystick) into a joystick velocity controller (e.g., providing a linear and/or angular velocity in response to user input manipulating the joystick). Such conversion results in a controller that is analogous to cruise control in a road vehicle where the throttle pedal is switched out for a speed demand. Such conversion may be based on known characteristics of mobile structure 101 and navigation system 190, for example, or may be based on system characteristics derived from a calibration process, such as a sea trial, where the control signals are provided to navigation control system 190 and the resulting motion of mobile structure 101 and other effects are measured (e.g., using sensors 140-148), creating calibration parameters linking control signal input and motive reaction.

A sideslip factor for mobile structure 101 may also be determined based on such sea trial calibrations, or may be provided by a manufacturer. Such calibration processes would typically be performed while perimeter ranging system 148 is active and able to operate sufficiently well to estimate velocity based on perimeter sensor data corresponding to nearby navigation hazards, for example, but where mobile structure 101 is not at risk of collision with navigation hazards. Wind and/or water currents, and/or other external disturbances, may be estimated using such systems, such as by placing docking assist system 100 in a hover mode (e.g., by providing user input corresponding to a dead stick input to user interface 120), where the target linear and/or angular velocities are substantially zero, such as prior to engaging autonomous docking, as described herein. Any thrust necessary to keep mobile structure 101 from moving may be attributed to an appropriate external disturbance (e.g., as modulated by other sensors, such as speed sensor 142).

In related embodiments, docking assist system 100 may be configured to provide "brakes" for mobile structure 101 corresponding to such hover mode, where the system uses navigation control system 190 to keep mobile structure substantially still, even while buffeted by various external disturbances. Docking can be frightening, especially so when wind or water currents are strong. Aside from anchors, which are severely limited in application when, attempting to maneuver into a docking area, there are no true brakes for watercraft, and so it often requires continual skillful thrust control to hover a watercraft using conventional navigation controllers. By converting the thrust controller into a velocity controller, as described herein, embodiments allow a user to hover or halt mobile structure 101 simply by letting go of the joystick. In some embodiments, controller 130 may be configured to limit a linear and/or angular velocity generated by docking assist system 100 to a value that can be sufficiently counteracted to hover mobile structure 101 within a predefined period of time (e.g., 2-3 seconds) and/or a predefined linear and/or angular motion of mobile structure 101 (e.g., 0.5 meters and/or 1 degree of rotation). Such control is more intuitive, particularly for novice users, and provides an additional safety measure when utilizing docking assist, where fine navigation control can be critical.

In additional embodiments, docking assist system 100 may be configured to provide collision avoidance while substantially adhering to the provided user input. For example, embodiments of the present disclosure provide full control over the path mobile structure 101 takes and provide the ability to stop at any time. In addition, by monitoring a perimeter about mobile structure 101, embodiments are able to modify and/or override user input to prevent a collision, such as if a user overlooks a detected navigation hazard, tries to approach a dock at too high a speed, or otherwise makes a navigation mistake.

FIGS. 4A-11 illustrate flow diagrams of control loops to provide docking assist (e.g., assisted and/or fully automated docking) in accordance with embodiments of the disclosure. In some embodiments, the operations of FIGS. 4A-11 may be performed by controller 130 processing and/or operating on signals received from one or more of sensors 140-148, navigation control system 190, user interface 120, and/or other modules 180. For example, in various embodiments, control loop 400 (and/or other control loops of FIGS. 4B-11) may be implemented and/or operated according to any one or combination of the systems and methods described in International Patent Application No. PCT/US2014/13441 filed Jan. 28, 2014 and entitled "STABILIZED DIRECTIONAL CONTROL SYSTEMS AND METHODS," and/or U.S. patent application Ser. No. 14/321,646 filed Jul. 1, 2014 and entitled "STABILIZED DIRECTIONAL CONTROL SYSTEMS AND METHODS," each of which are hereby incorporated by reference in their entirety.

In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of in the control loops may be performed in an order or arrangement different from the embodiment illustrated by FIGS. 4A-11. For example, although control loop 400 includes block 440, in other embodiments, block 440 may not be present, for example, and/or may be replaced with one or more sensors providing corresponding measured data.

Figure 4A:
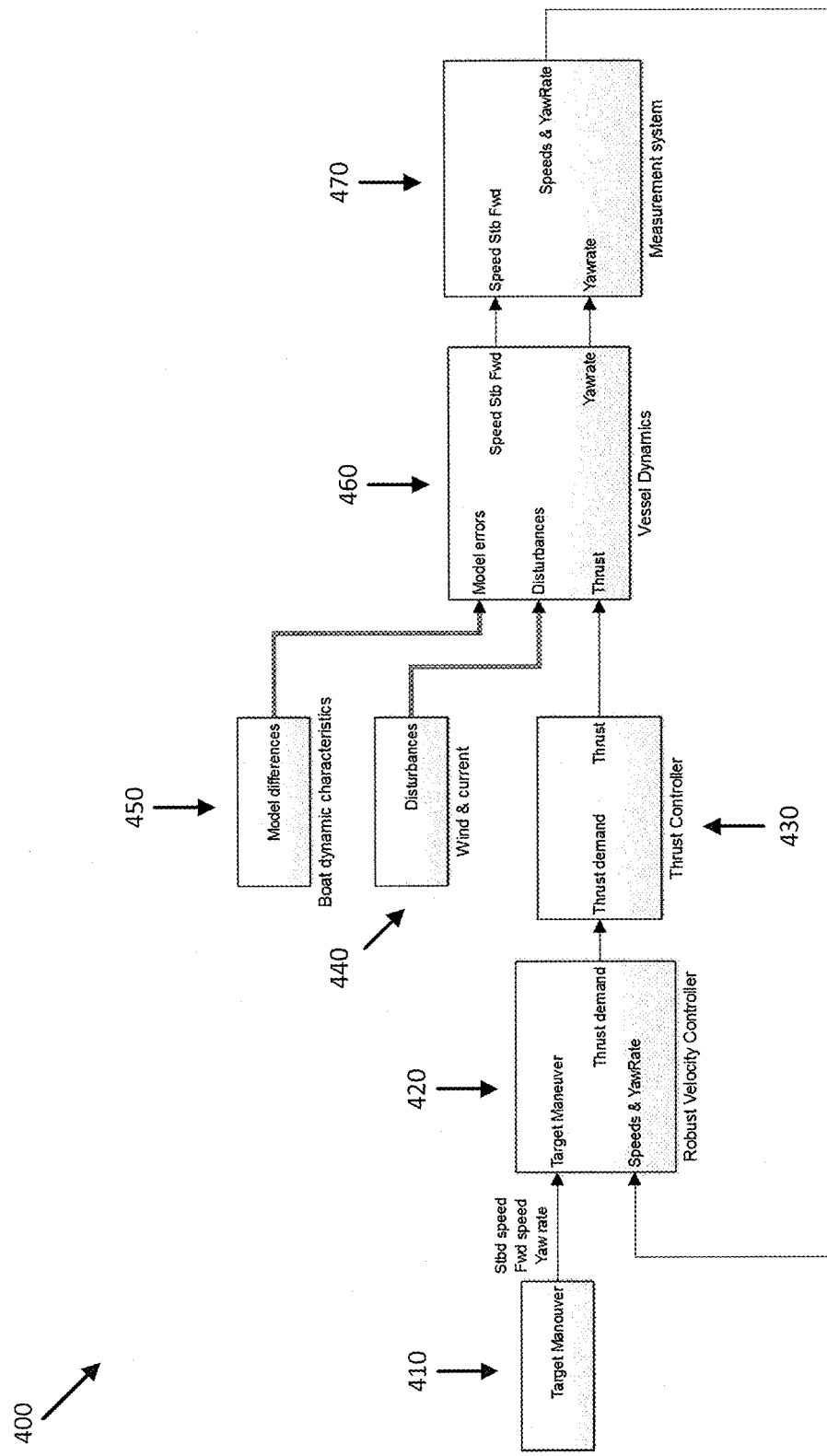
FIGS. 4A-11 illustrate flow diagrams of control loops to provide docking assist in accordance with embodiments of the disclosure.

As shown in FIG. 4A, control loop 400 includes target maneuver block 410 providing a target linear and/or angular velocity for mobile structure 101 to velocity controller block 420. Target maneuver block 410 may be configured to receive a time series of user input from user interface 120, for example, and convert it into a corresponding time series of target linear and/or angular velocities. For example, target maneuver block 410 may be configured to effectively convert a thrust controller into a velocity controller, as described herein. Such conversion may be based, at least in part, on a maximum linear and/or angular thrust for navigation control system 190 and/or thrust maneuver system 172, for example, such that the maximum linear and/or angular velocity output by target maneuver block 410 is limited by the time or distance it would require to hover mobile structure 101 given maximum counteracting linear and/or angular thrust, as described herein. In other embodiments, target maneuver block 410 may be configured to receive a time series of target linear and/or angular velocities corresponding to a target docking track and/or a target docking position and/or orientation, as described herein, which may be adjusted to evade one or more navigation hazards, and forward them on to velocity controller block 420.

Velocity controller block 420 receives the target linear and/or angular velocity from target maneuver block 410 and a current measured linear and/or angular velocity of mobile structure 101 from measurement block 470 and generates a thrust demand (e.g., a linear and/or angular thrust demand) based on the received target and current linear and/or angular velocities and provides it to thrust controller block 430. When control loop 400 is used to model maneuvering of mobile structure 101, thrust controller 430 simply converts the thrust demand into a corresponding thrust force (e.g., a linear and/or angular thrust force) and provides the thrust force to vessel dynamics block 460. When control loop 400 is used to control maneuvering of mobile structure 101, thrust controller 430 may be configured to provide docking assist control signals corresponding to the thrust demand received from velocity controller 420 to navigation control system 190 (e.g., to one or more of steering sensor/actuator 150, propulsion system 170, and/or thrust maneuver system 172) in order to control maneuvering of mobile structure 101.

When control loop 400 is used to model maneuvering of mobile structure 101, vessel dynamics block 460 aggregates the thrust force provided by thrust controller 430, external disturbance velocities provided by disturbances block 440, and/or model errors provided by model error block 450 and converts them into expected linear and angular velocities for mobile structure 101, which are then provided to measurement block 470. While control loop 400 is used to model maneuvering of mobile structure 101, measurement block 470 may be configured to receive the expected linear and angular velocities for mobile structure 101 from vessel dynamics block 460 and generate simulated measurements of the expected linear and angular velocities for mobile structure 101 (e.g., by adding in a measurement delay, for example), which are then provided to velocity controller 420 to update the model.

When control loop 400 is used to control maneuvering of mobile structure 101, measurement block 470 may be configured to receive measured linear and angular velocities for mobile structure 101 (e.g., from sensors 140-148) and provide them to velocity controller 420 to proceed through another iteration of control loop 400. In some embodiments, measurement block 470 may be configured to receive or request such measurements upon receiving expected linear and angular velocities for mobile structure 101 from vessel dynamics block 460, so as to provide timing linking for control loop 400, for example. Other timing linking for control loop 400 may be accomplished by receiving or requesting such measurements upon navigation control system 190 receiving docking assist control signals from thrust controller 430. In alternative embodiments, measurement block 470 may be configured to operate asynchronously with respect to one or more other blocks of control loop 400.

Figure 4B:
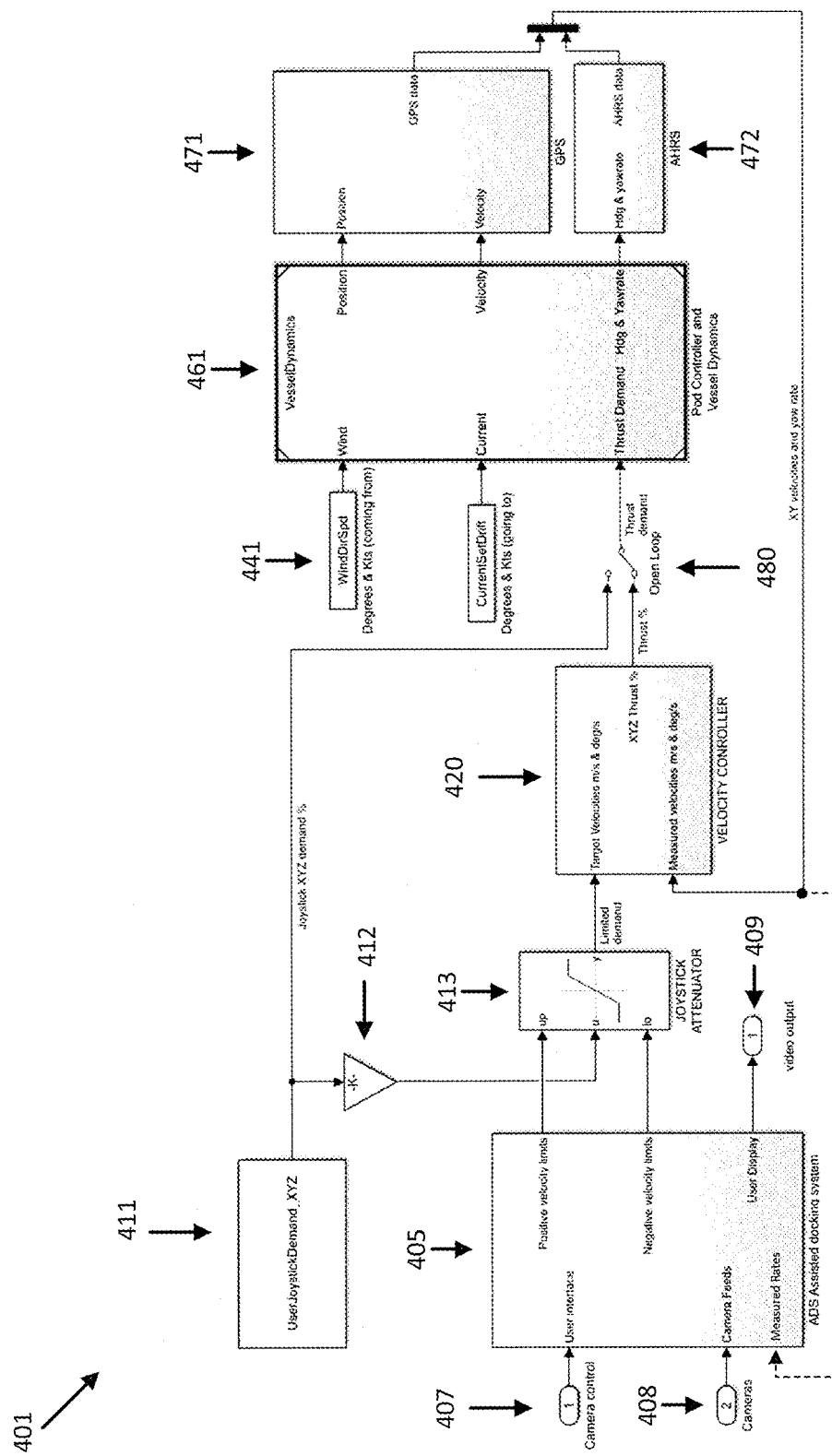

Control loop 401 of FIG. 4B illustrates an embodiment of a control loop to provide docking assist (e.g., assisted docking and/or more general navigation control) for mobile structure 101 that more explicitly incorporates both joystick demand (e.g., generated by manual user input to user interface/joystick 120) and perimeter sensor data to facilitate docking assist. In particular, in control loop 401, target maneuver block 410 of control loop 400 is generally replaced with joystick demand block 411 (e.g., providing joystick demands generated by manual user input provided to user interface/joystick 120), conversion block 412, assisted docking system block 405, and joystick attenuator 413; disturbances block 440 is replaced with disturbance inputs 441 (e.g., representing data corresponding to one or more types of disturbances); thrust controller 430 and vessel dynamics block 460 are combined into vessel dynamics block 461, and measurement block 470 is split into GNSS measurement block 471 (e.g., providing absolute position data) and attitude and heading reference system (AHRS) measurement block 472 (e.g., providing heading and yaw rate data), as shown. Control loop 401 also includes manual override switch 480, which may be used to provide joystick demand generated by joystick demand block 411 directly to vessel dynamics block 461 (e.g., for unassisted operation of mobile structure 101).

In alternative or supplemental embodiments, an embodiments of manual override switch 480 may be implemented as a switch (e.g., a dual throw switch) isolating assisted docking system block 405 from joystick attenuator 413, thereby eliminating perimeter sensor data-based limitation of joystick demand generated by joystick demand 411, but retaining operation of velocity controller 420 to help provide various aspects of velocity control of mobile structure 101, as described herein.

As shown in FIG. 4B, control loop 401 includes assisted docking system block 405 receiving perimeter sensor data 408 (e.g., imagery from cameras, sensor data from ultrasonic sensors and/or vertically steered radar assemblies) and generating positive and negative velocity limits that are passed to joystick attenuator block 413 to limit the joystick demand provided by joystick demand block 411, such as to provide virtual bumpers or spatial safety margins about the perimeter of mobile structure 101, as described herein with regard to attenuation of joystick, velocity, and/or thrust demand to help reduce risk of collision with a navigation hazard or obstacle while performing docking assist and/or other navigation maneuvers (e.g., in accord with the "attenuation principal," as described more fully herein).

For example, assisted docking system block 405 may be configured to receive perimeter sensor data 408 in the form of imagery provided by cameras 212, 214, and/or 216, determine that a navigation hazard is present and within a safety buffer zone of a starboard perimeter of mobile structure 101, and generate and provide positive and/or negative velocity limits (e.g., linear and/or angular velocity limits) to joystick attenuator 413 that are selected to limit and/or zero out joystick or thrust demand (e.g., generated by joystick demand block 411) tending to propel mobile structure 101 such that its perimeter approaches the detected navigation hazard. As shown in control loop 401, assisted docking system block 405 may be configured to generate such velocity limits based, at least in part, on perimeter sensor data 408 and/or (optionally) measured velocities/rates of mobile structure 101 provided by GNSS measurement block 471 and AHRS measurement block 472 (e.g., shown as a dashed line linking assisted docking system block 405 to the outputs of measurement blocks 471 and 472).

In some embodiments, assisted docking system block 405 may be configured to receive user control of perimeter ranging system 148 (e.g., from user interface 120), such as control of actuated cameras and/or power and/or steering direction for ultrasonic or radar sensor assemblies to help determine a distance between the perimeter of mobile structure 101 and a detected navigation hazard, for example, or may be configured to adjust such control parameters itself. In various embodiments, assisted docking system block 405 may be configured to generate and/or pass through perimeter sensor data and/or imagery 409, such as for display to a user via a display of user interface 120. For example, imagery from cameras 212, 214, and/or 216 may be passed through or stitched together by assisted docking system block 405 and provided as perimeter sensor data and/or imagery 409. In other embodiments, assisted docking system block 405 may be configured to generate two and/or three dimensional imagery representative of a detected navigation hazard and a perimeter of mobile structure 101 based on imaging, ultrasonic, and/or radar data provided by corresponding perimeter sensors, as described herein.

Conversion block 412 may be configured to convert joystick demands provided by joystick demand block 411, for example, to corresponding velocity demands (e.g., linear and/or angular velocities, in meters/second and degrees/second) before passing such velocity demands to joystick attenuator 413. Joystick attenuator 413 receives velocity demands generated by conversion block 412 and applies positive and/or negative velocity limits (e.g., in the form of joystick and/or thrust demand limits) to such demands before passing the limited velocity demands to velocity controller block 420, which operates generally similar to velocity controller block 420 of control loop 400 in FIG. 4A to generate a thrust demand based, at least in part, on the velocity demand provided by joystick attenuator 413 and measured velocities/rates of mobile structure 101 provided by GNSS measurement block 471 and AHRS measurement block 472 (e.g., XYZ thrust corresponds to linear lateral and longitudinal velocities/rates and an angular/yaw velocity/rate). Depending on a user selected state of manual override switch 480, such generated thrust demand is provided to vessel dynamics block 461.

Figure 24A:
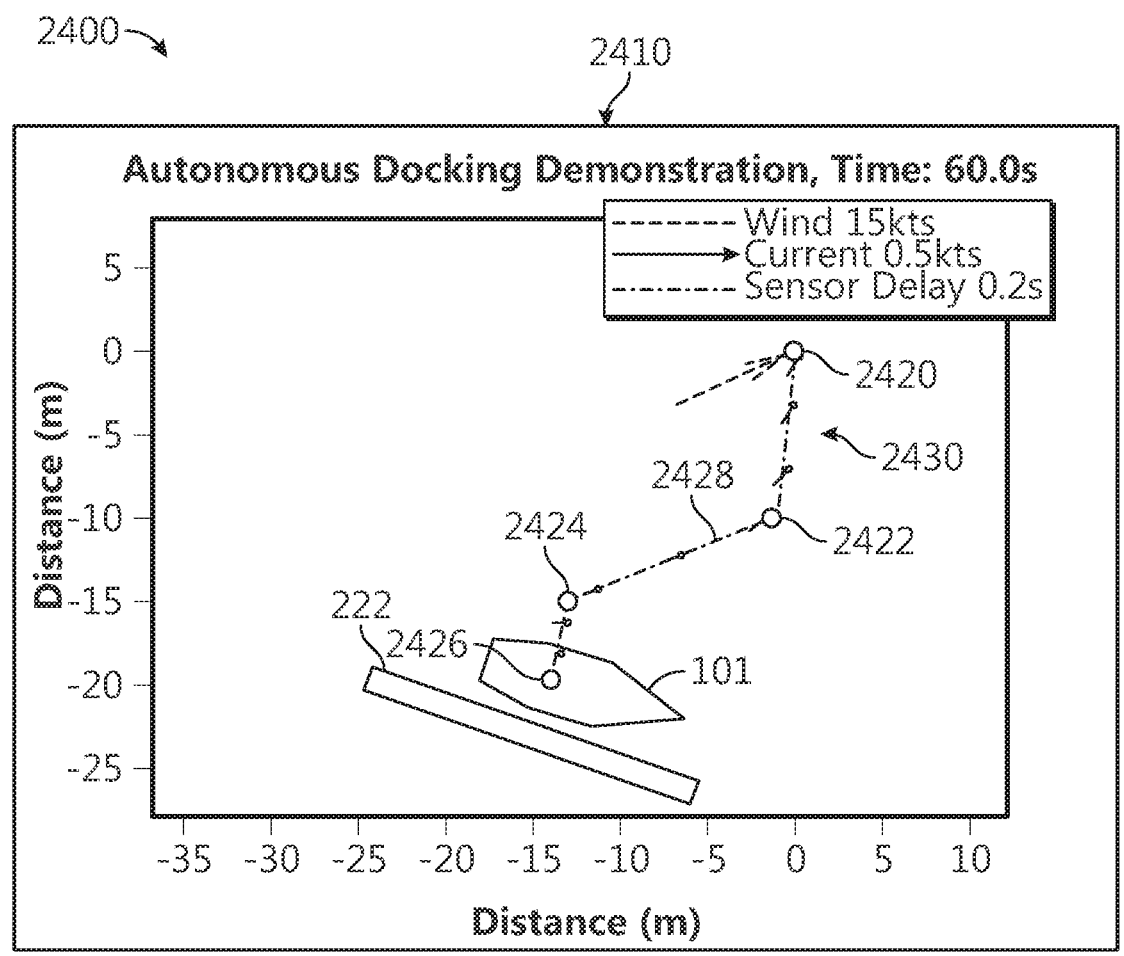
FIGS. 24A, 24B illustrate plots of various simulation parameters and control signals for a docking assist system, in accordance with embodiments of the disclosure.
Figure 24B:
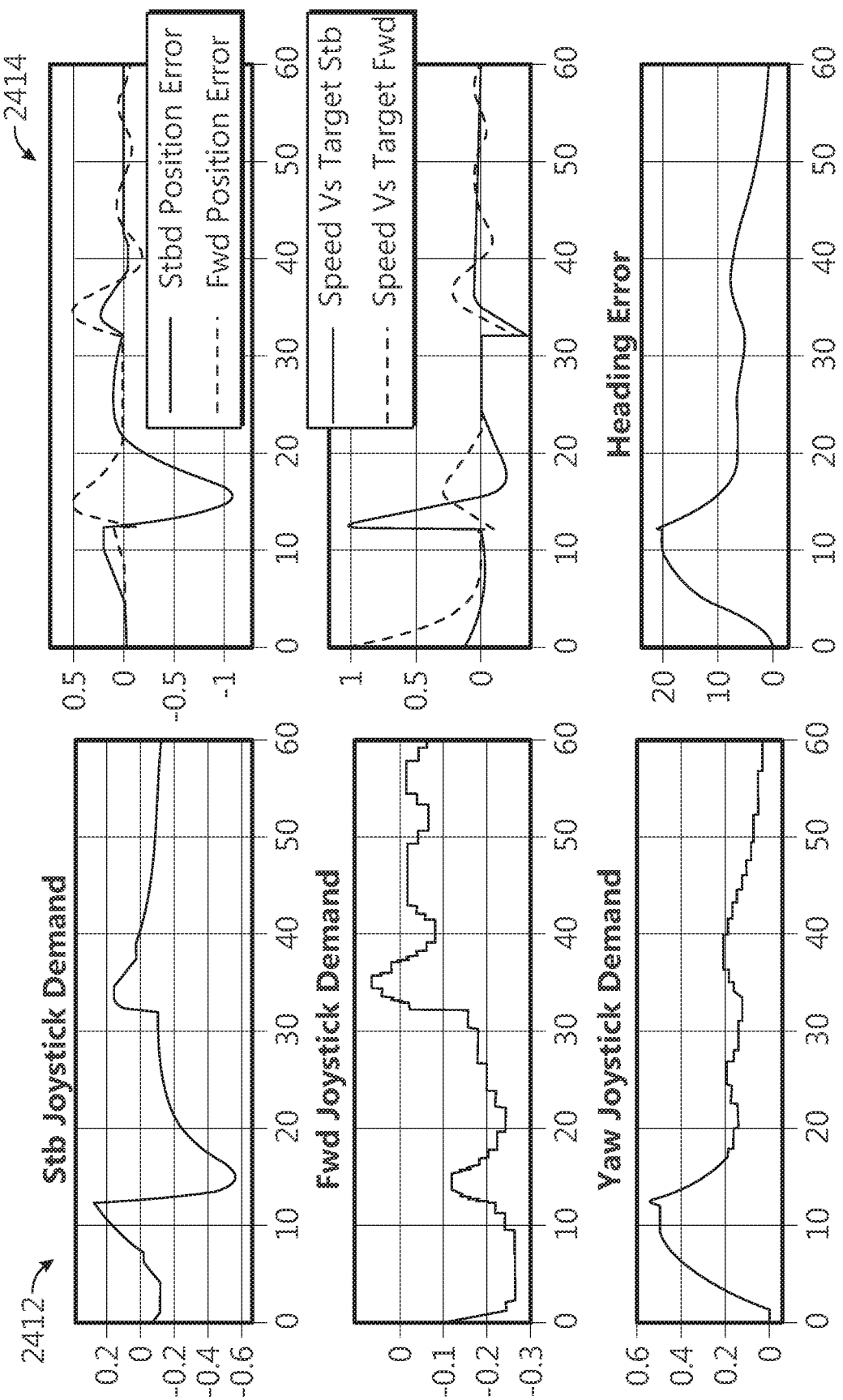

In some embodiments, such generated thrust demand may also be provided to user interface 120 for display to a user. For example, as shown in FIGS. 24A and 24B, thrust demand generated by velocity controller 420 may be used to generate controller demand or thrust demand indicators 2430 to provide visual feedback of the aggregate thrust demand direction and/or magnitude (e.g., scaled such that 100% thrust demand fits within a desired pixel area about a display position of mobile structure 101). Moreover, thrust demand generated by velocity controller 420 may be used to generate other thrust workload indicators, such as one or more vertical and/or horizontal bar graphs indicating an instantaneous thrust magnitude (e.g. lateral, longitudinal, yaw) and that are each colored according to multiple zones of thrust demand (e.g., green=lower third of maximum thrust demand, yellow=middle third of maximum thrust demand, red=upper third of maximum thrust demand), where the maximum thrust demand corresponds to 100% thrust demand, as dictated by the capability of elements of navigation control system 190.

In one embodiment, a single vertical bar graph may be used to indicate an aggregate instantaneous thrust magnitude that corresponds to the single thrust component nearest to its maximum thrust. Such thrust components may correspond to lateral, longitudinal, and rotational (yaw) thrust, for example, or may correspond to individual thrusters (e.g., thruster 1, thruster 2, etc.) and/or propulsion mechanisms of navigation control system 190, as described herein. As such, thrust demand/workload indicators may be used to provide visual feedback (e.g., as indicators rendered on a display of user interface 120) of the capability of navigation control system 190, and in particular, nearing a maximum maneuvering capability of navigation control system 190, so that a user may have warning and/or manually override an assisted or autonomous maneuver (e.g., a virtual braking maneuver) before external disturbance overwhelm the maneuvering capability of navigation control system 190.

Vessel dynamics block 461 may be configured to provide docking assist control signals corresponding to the thrust demand received from velocity controller 420 to navigation control system 190 (e.g., to one or more of steering sensor/actuator 150, propulsion system 170, and/or thrust maneuver system 172) in order to control maneuvering of mobile structure 101. Vessel dynamics block 461 may also be configured to convert the thrust demand into a corresponding thrust force (e.g., a linear and/or angular thrust force) and aggregate the thrust force, external disturbance velocities provided by disturbance inputs 441, and convert them into expected positions and linear and angular velocities for mobile structure 101, which are then provided to measurement blocks 471 and 472.

Measurement blocks 471 and 472 may be configured to receive measured linear and angular velocities for mobile structure 101 (e.g., from sensors 140-148) and provide them to velocity controller 420 to proceed through another iteration of control loop 401. In some embodiments, measurement blocks 471 and 472 may be configured to receive or request such measurements upon receiving expected linear and angular velocities for mobile structure 101 from vessel dynamics block 461, so as to provide timing linking for control loop 401, for example. Other timing linking for control loop 401 may be accomplished by receiving or requesting such measurements upon navigation control system 190 receiving docking assist control signals from vessel dynamics block 461. In alternative embodiments, measurement blocks 471 and/or 472 may be configured to operate asynchronously with respect to one or more other blocks of control loop 401. Alternatively, various blocks of control loop 401 may be configured to model a docking maneuver and/or provide fully autonomous docking assist for mobile structure 101 by supplying autopilot input to joystick demand block 411 and using vessel dynamics block 461 to model behavior of mobile structure 101, similar as described with respect to target maneuver block 410 and vessel dynamics block 460 of control loop 400.

Figure 5:
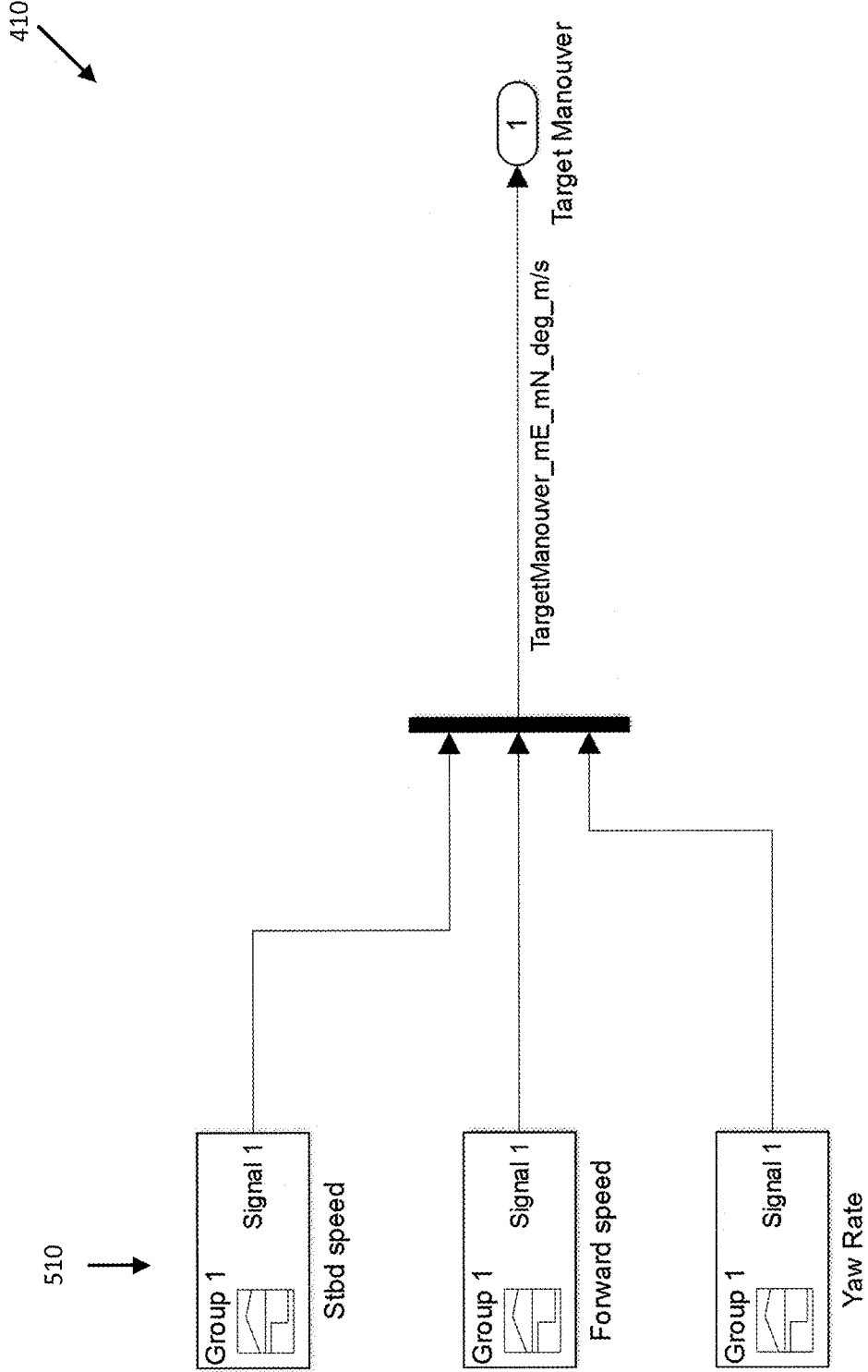

As shown in FIG. 5, in some embodiments, target maneuver block 410 may include input blocks 510 configured to receive a time series of user input from user interface 120 and convert the time series of user input into target linear and angular velocities for mobile structure 101, for example, or to receive a time series of target linear and/or angular velocities corresponding to a target docking track and/or docking position and/or orientation, and forward the time series of target linear and angular velocities as output of target maneuver block 410.

Figure 6:
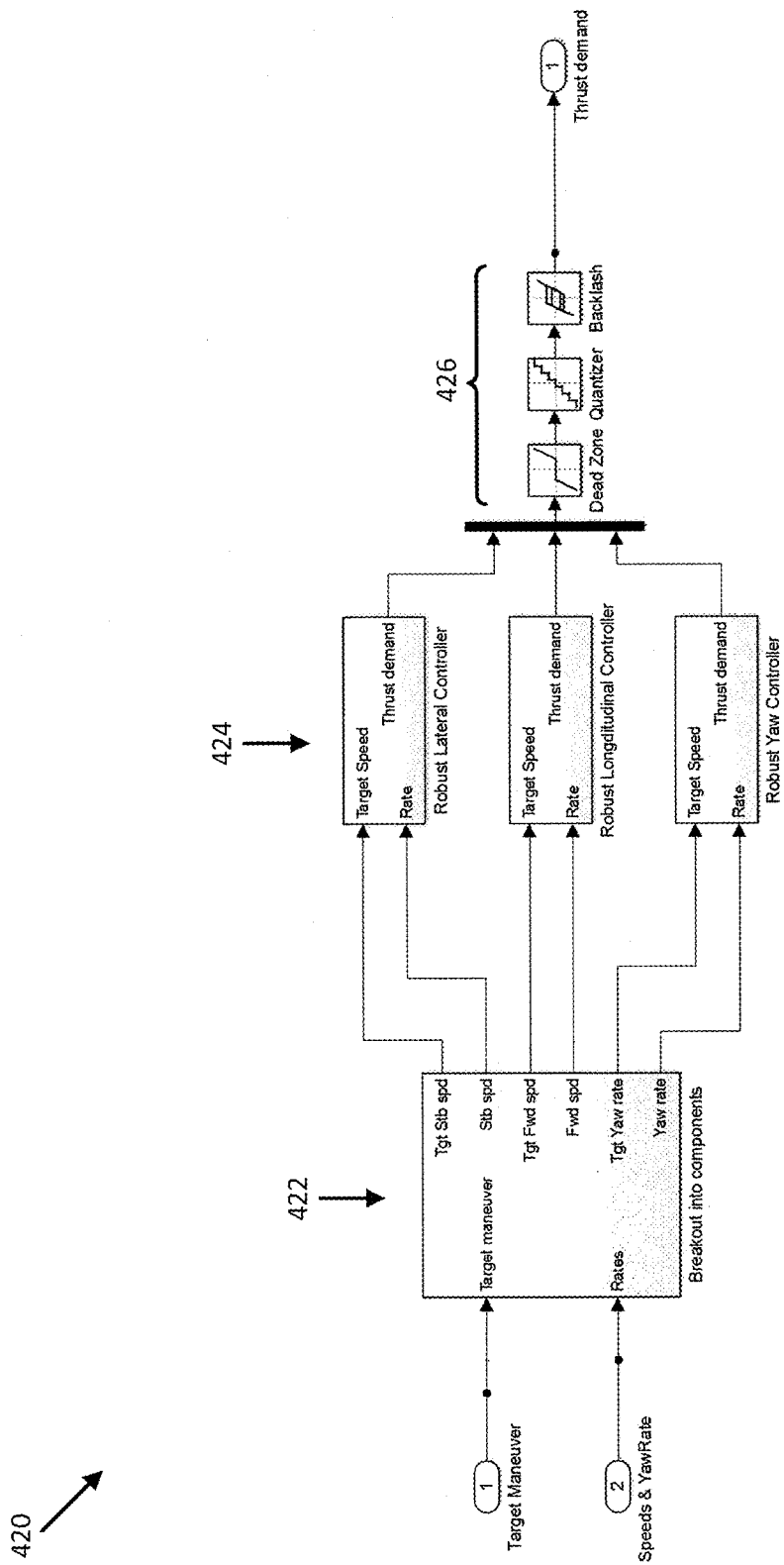
Figure 7:
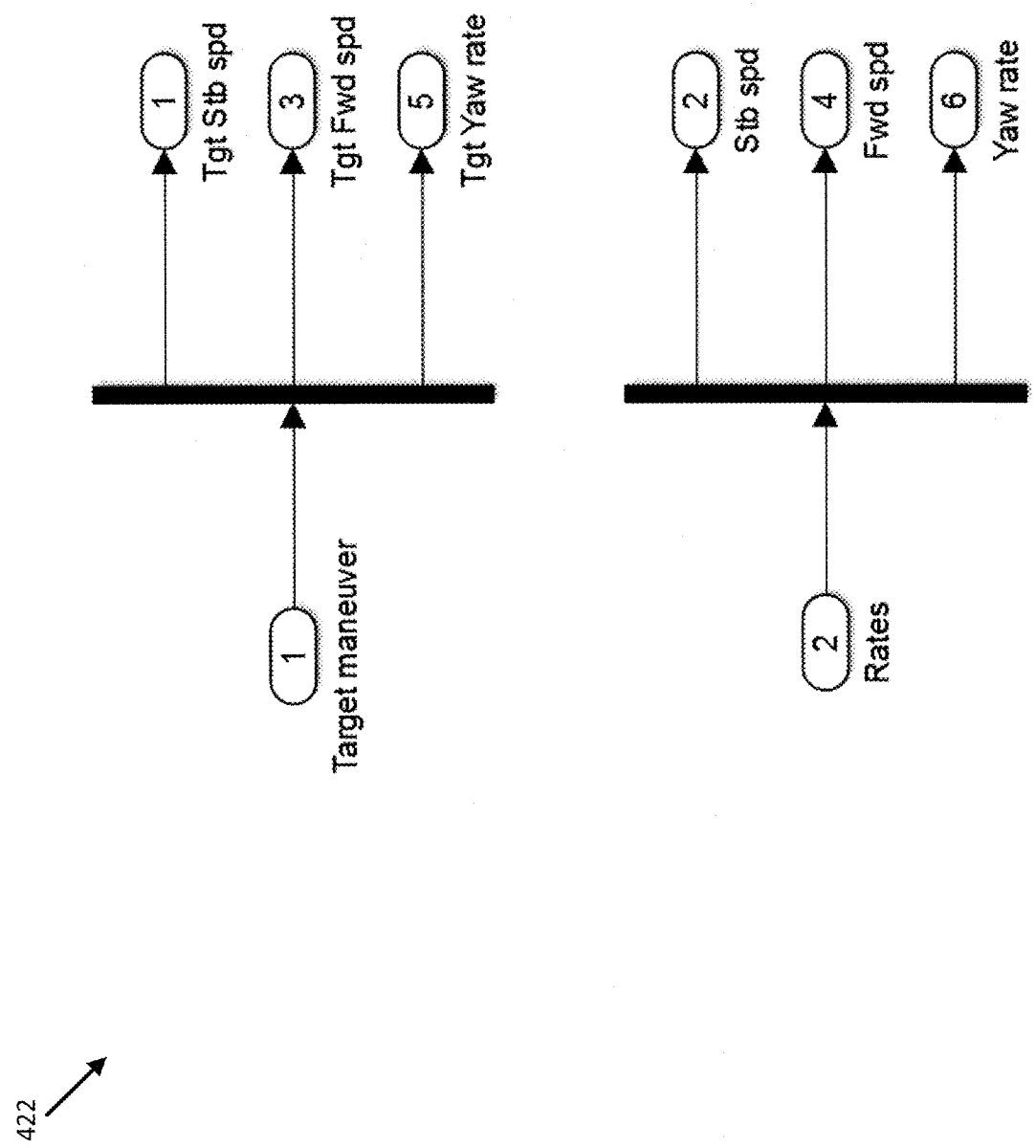
Figure 8A:
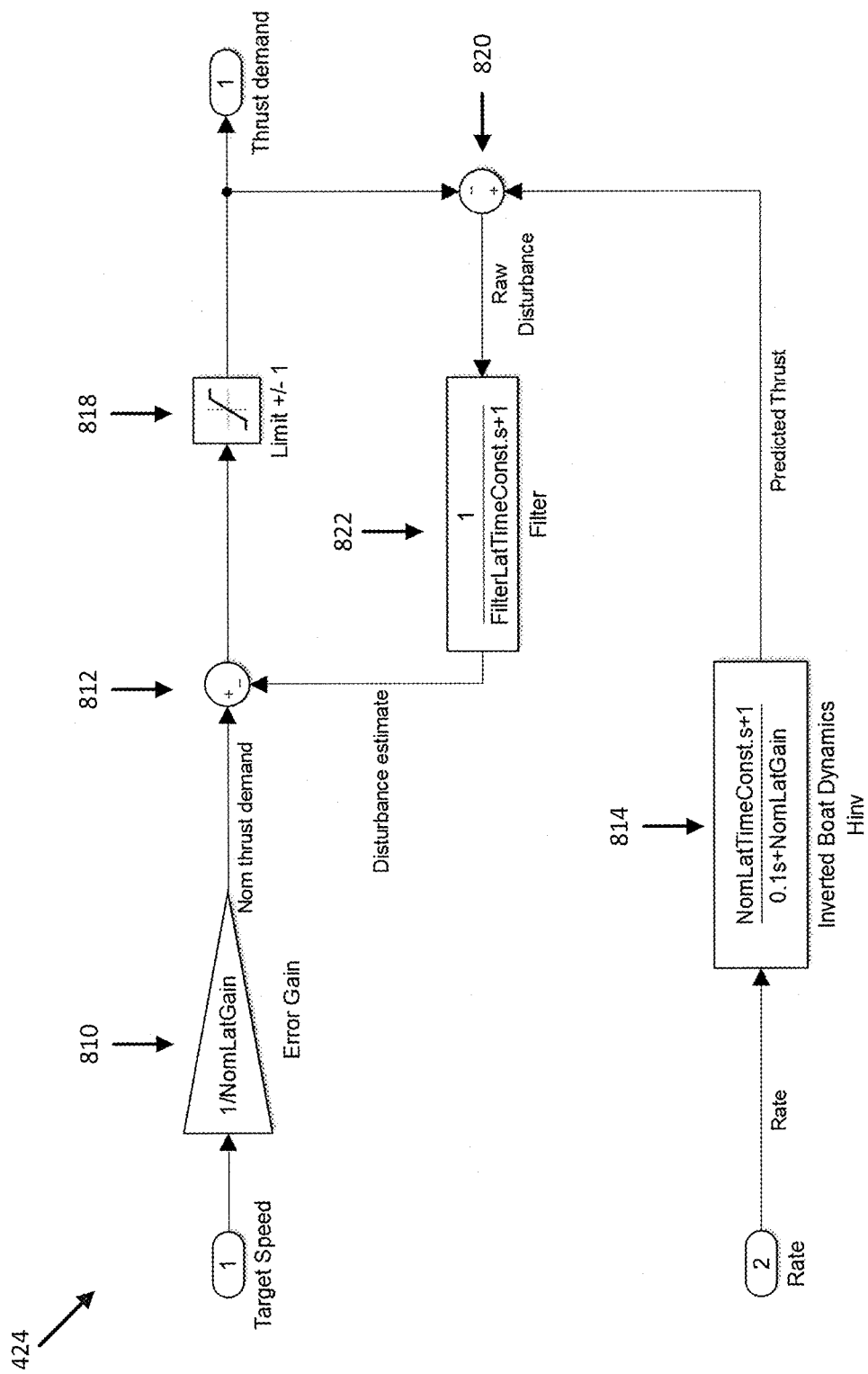

As shown in FIG. 6, in some embodiments, velocity controller 420 may include breakout block 422, thrust demand blocks 424, and thrust demand conditioner blocks 426. As shown in FIG. 7, breakout block 422 may be configured to receive target and current linear and angular velocities for mobile structure 101 and split them into components to be provided to thrust demand blocks 424. As shown in FIG. 8A, (e.g., showing only lateral velocities, though similar to longitudinal and rotational (yaw) velocities) each thrust demand block 424 may be configured to generate a linear or angular thrust demand based on corresponding target and current linear or angular velocities for mobile structure 101:

In FIG. 8A, the current velocity is converted into a predicted thrust force by block 814 (e.g., based on an inverted dynamic model for a nominal vehicle corresponding to mobile structure 101). The target velocity is converted into a nominal thrust demand by block 810, combined with the predicted thrust force at block 820, and the resulting raw disturbance is fed back into the nominal thrust demand at block 812 to produce the thrust demand as output. Blocks 818 and 822 clamp and filter the feedback loop, respectively, so that the output thrust demand is within bounds and to reduce a noise level of the raw disturbance, and therein, the output thrust demand. Thrust demand conditioner blocks 426 further condition the thrust demand before providing it as output by limiting minor numerical oscillations and large signal changes (e.g., which could otherwise overwork the navigation controller and/or cause it to fail).

Figure 8B:
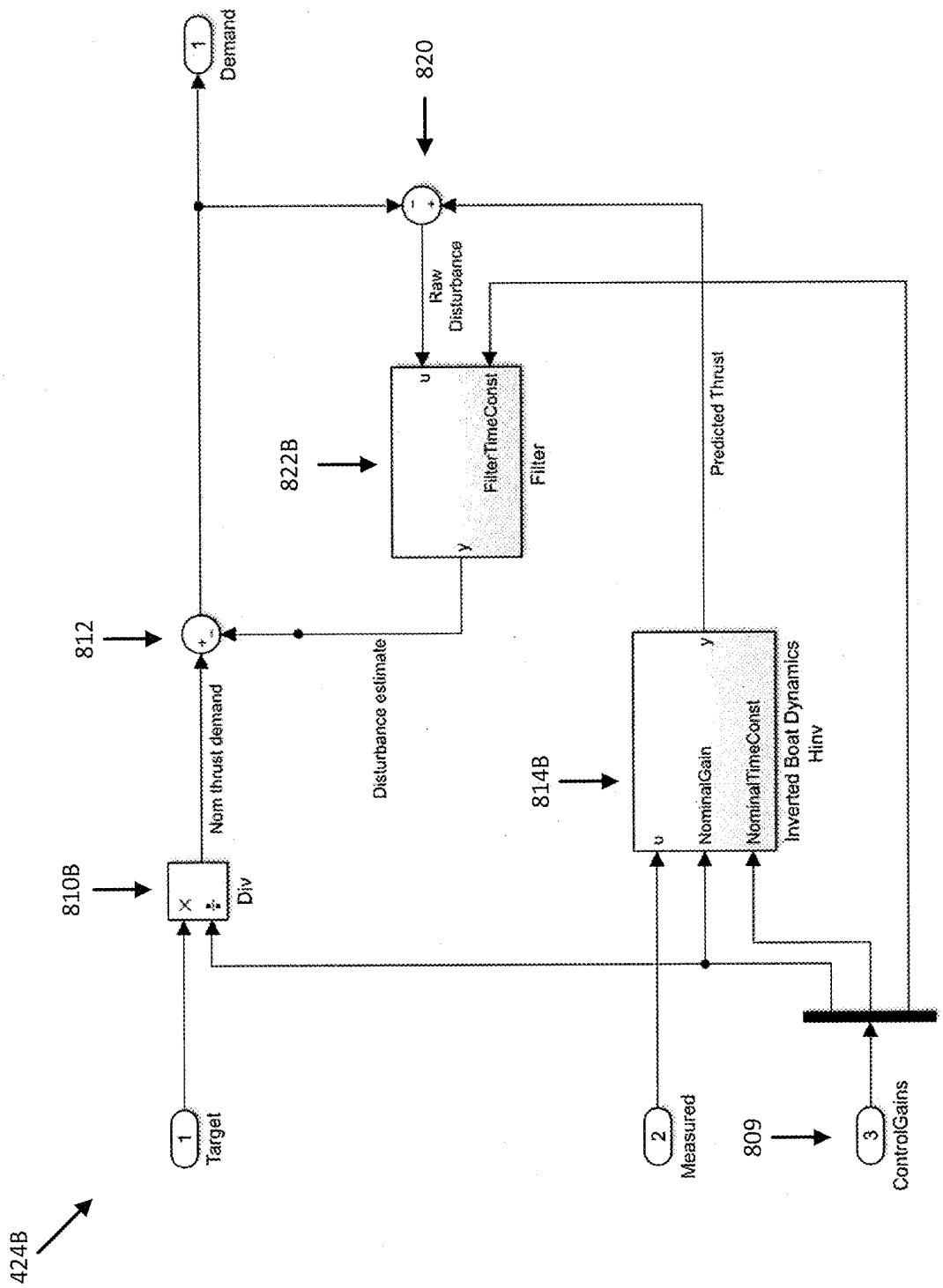

FIG. 8B shows an embodiment of thrust demand block 424 (e.g., thrust demand block 424B) including an additional control input 809 that may be used to provide control parameters to adjust the various gains, time constants, and/or other control parameters applied at blocks 810 (e.g., via block 810B), 814 (e.g., via block 814B), and 822 (e.g., via block 822B). Such control parameters may be adjusted (e.g., by user input and/or by a learning process) to increase and/or adjust an accuracy of the thrust demands generated by thrust demand block 424/424B based on the corresponding target and current linear or angular velocities for mobile structure 101, as described herein.

Figure 9A:
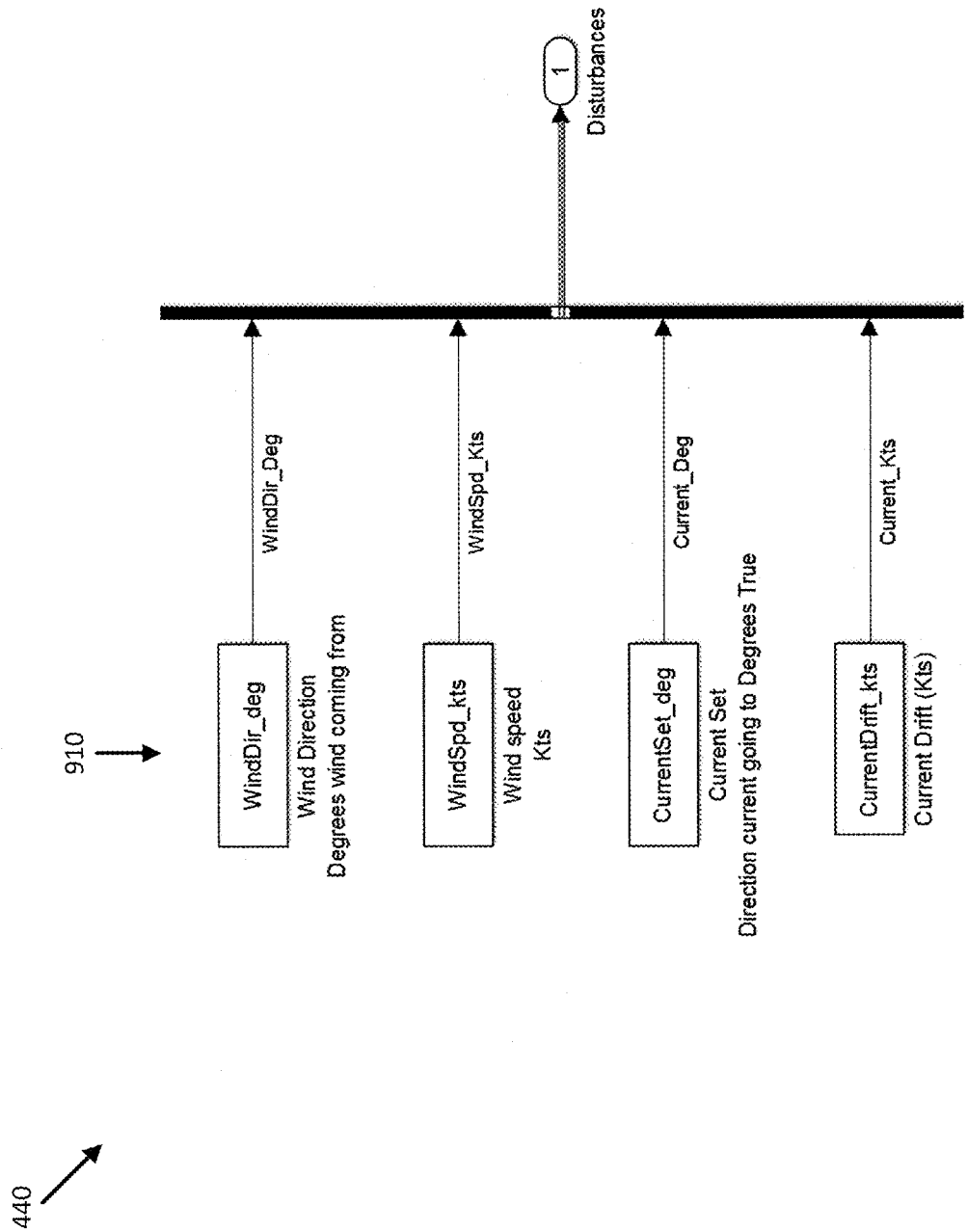

As shown in FIG. 9A, in some embodiments, disturbances block 440 may include disturbance inputs 910 receiving measurements corresponding to wind velocities and water current velocities (e.g., magnitude and direction) and be configured to provide the disturbances as a single output to vessel dynamics block 460. In other embodiments, disturbances block 440 may be configured to receive other collateral sensor data, such as GNSS data and/or wind or water speed data, for example, and to determine the wind and water current velocities based on the collateral sensor data, as described herein.

Figure 9B:
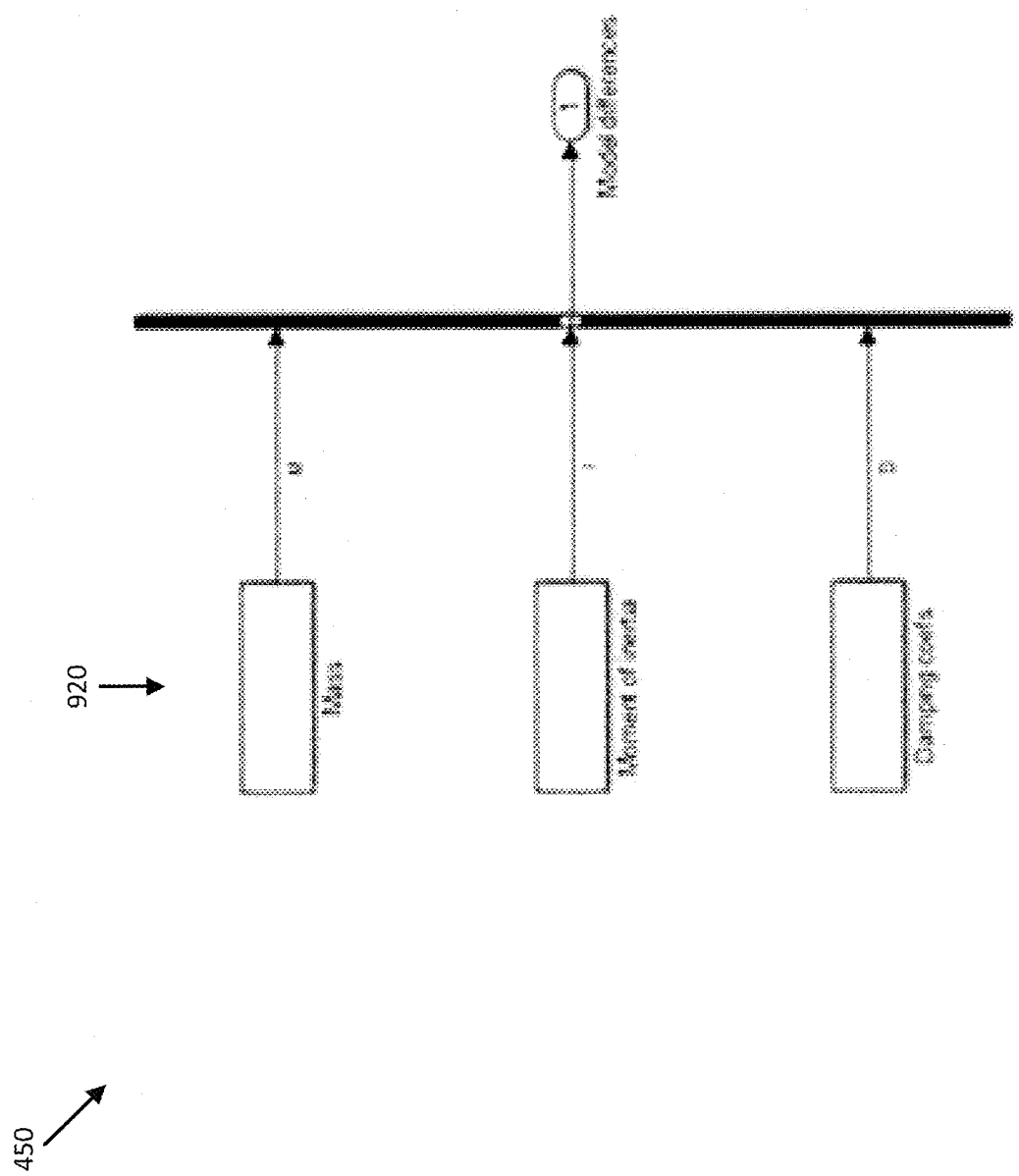

As shown in FIG. 9B, in some embodiments, model error block 450 may include model inputs 920 receiving mobile structure characteristics (e.g., mass, moment of inertia, and any motion damping coefficients, such as direction/rotation-specific and/or medium-specific damping coefficients) corresponding to mobile structure 101 and be configured to provide the mobile structure characteristics as a single output to vessel dynamics block 460. In other embodiments, model error block 450 may be configured to receive other collateral sensor data, such as GNSS data and/or wind or water speed data, for example, and to estimate the mobile structure characteristics based on the collateral sensor data, as described herein.

Figure 10:
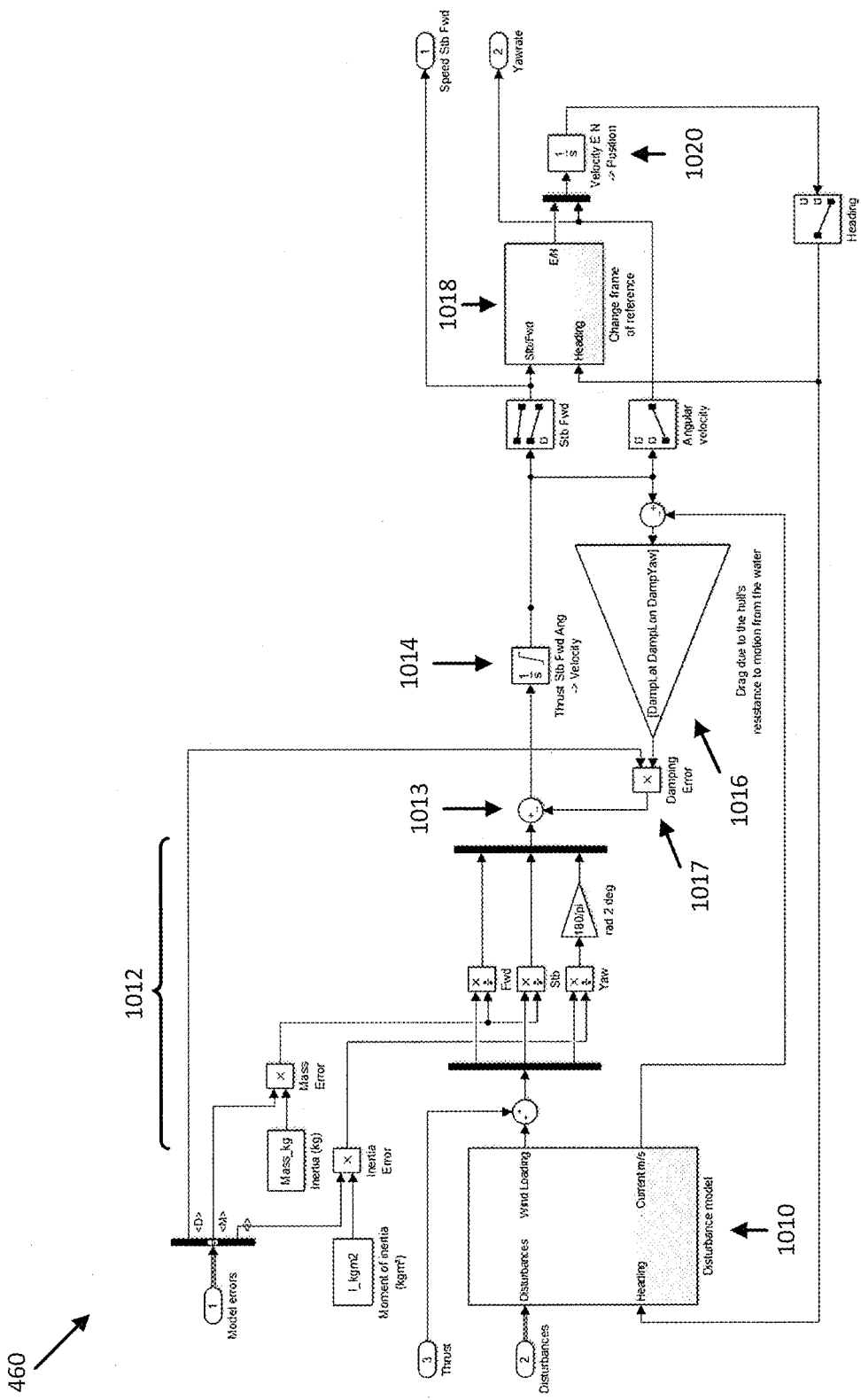

As shown in FIG. 10, in some embodiments, vessel dynamics block 460 may include disturbance model block 1010, which may be configured to receive disturbance velocities and an estimated heading for mobile structure 101 and provide a wind force (e.g., dependent on an orientation of mobile structure 101 relative to the wind direction) and a water current velocity. In some embodiments, disturbance model block 1010 may be implemented similarly to disturbance model block 1710 illustrated in detail in FIG. 18. The wind force is combined with the thrust force (e.g., provided by thrust controller 430 in FIG. 4A and/or velocity controller 421 in FIG. 4B) and provided to combinatorial blocks 1012.

Combinatorial blocks 1012 convert the model errors corresponding to linear and rotational inertia into mass and inertia errors and divide the already combined wind and thrust forces by the mass and inertia errors to produce a model and disturbance corrected thrust acceleration. The corrected thrust acceleration is integrated by block 1014 to provide an expected linear and angular velocity for mobile structure 101, which is then output by block 460. The water current velocity is combined with the expected linear and angular velocity for mobile structure 101 provided by block 1014 and the resulting relative water velocity is provided to motion damping block 1016. Motion damping block 1016 determines the drag acceleration (e.g., related to drag force) on mobile structure 101 caused by its relative motion within a body of water and provides it to block 1017. Block 1017 applies a drag error to the drag acceleration to generate a corrected drag acceleration, which is combined with the corrected thrust acceleration provided by combinatorial blocks 1012, as part of a feedback loop, at block 1013.

In some embodiments, vessel dynamics block 460 may also include reference frame conversion block 1018 configured to convert the expected linear velocity of mobile structure 101 provided by block 1014 (e.g., which may be in a lateral/longitudinal local reference frame for mobile structure 101) into an expected linear velocity as represented in an absolute reference frame (e.g., east and north), which may be combined with the expected angular velocity of mobile structure 101 provided by block 1014 and provided to integrator block 1020 to provide a heading of mobile structure 101 (e.g., which may be fed back to blocks 1010 and 1018, as shown). In some embodiments, reference frame conversion block 1018 may be implemented similarly to reference frame conversion block 1718 illustrated in detail in FIG. 19.

Figure 11:
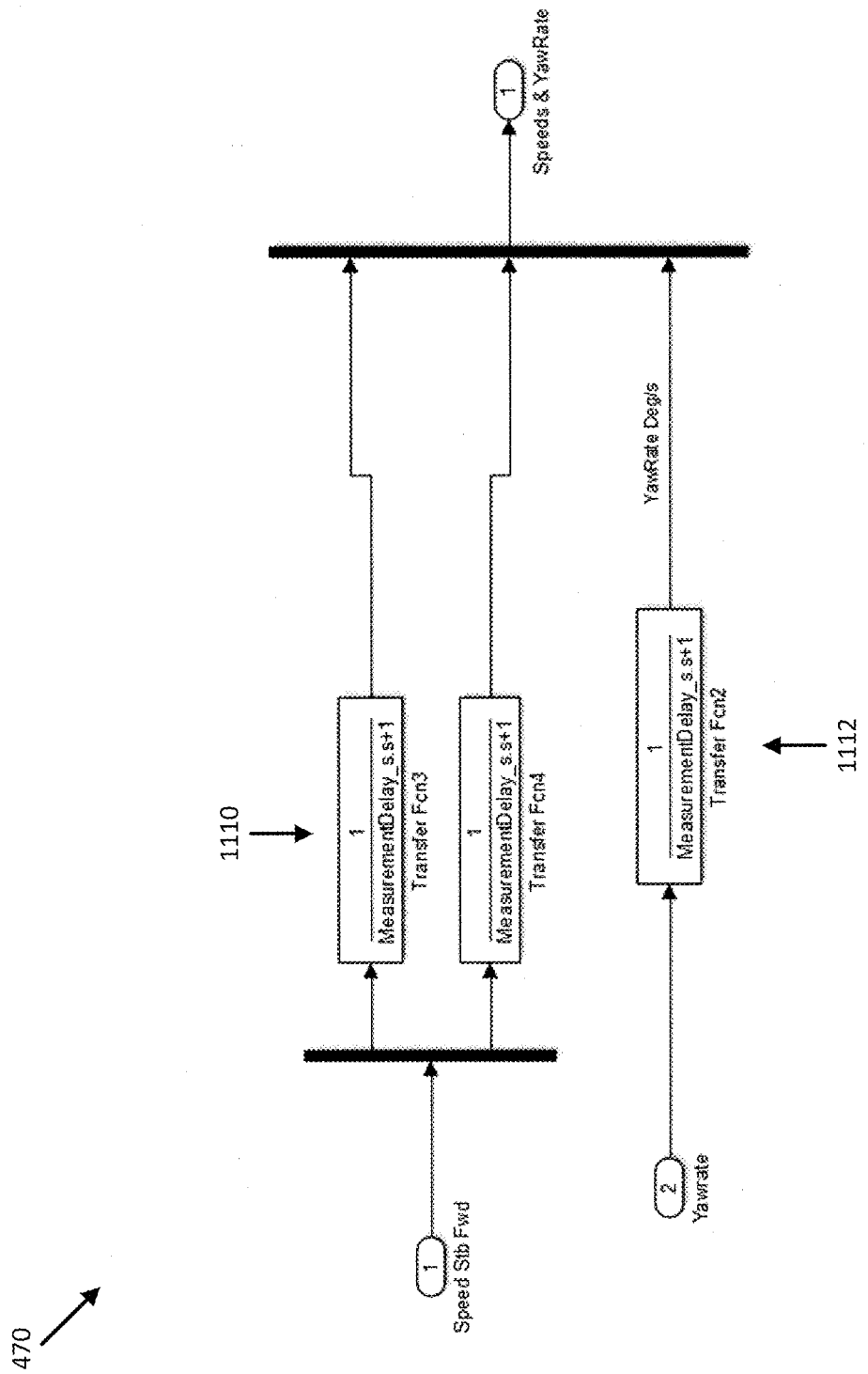

As shown in FIG. 11, in embodiments where control loop 400 is used to model maneuvering of mobile structure 101, measurement block 470 may include linear velocity transfer function blocks 1110 and rotational velocity transfer function block 1112 each configured to model a measurement delay and provide such measurement delayed linear and rotational velocities as output, which are then provided to velocity controller 420 to update the model. In some embodiments, the transfer function blocks may be implemented as first order filters. In embodiments where control loop 400 is used to control maneuvering of mobile structure 101, measurement block 470 may instead include blocks configured to receive measured linear and angular velocities for mobile structure 101 (e.g., from sensors 140-148), which may be provided as output to velocity controller 420 to proceed through another iteration of control loop 400. In various embodiments, measurement block 470 may include blocks configured to receive measured linear and angular velocities for mobile structure 101 for mobile structure 101 from perimeter ranging system 148.

Figure 12:
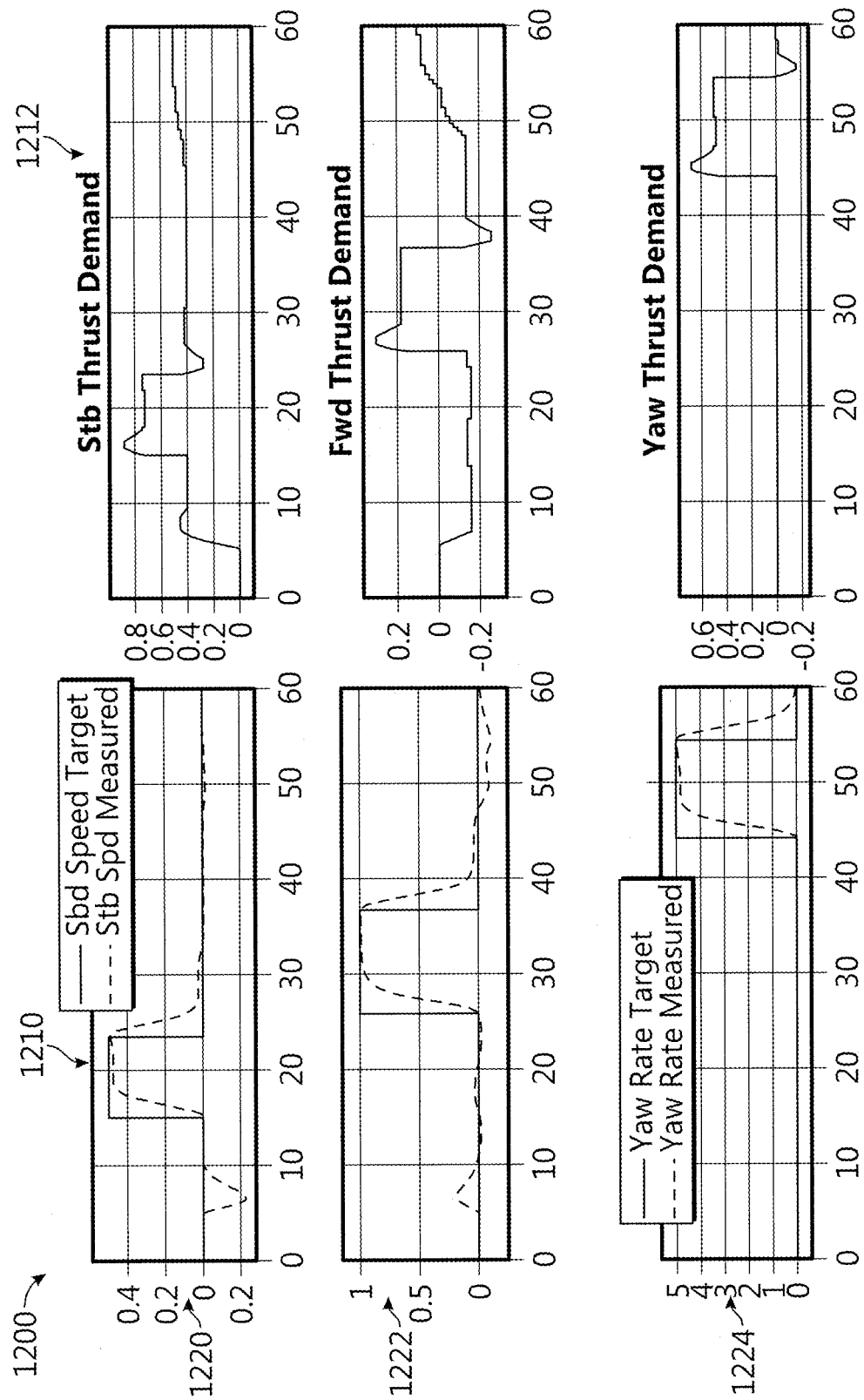
FIG. 12 illustrates plots of various control signals for a docking assist system, in accordance with embodiments of the disclosure.

FIG. 12 illustrates plots of various control signals generated by docking assist system 100, in accordance with embodiments of the disclosure. For example, plots 1210 show target velocities plotted with measured velocities (e.g., lateral velocities along row 1220, longitudinal velocities along row 1222, and angular velocities along row 1224) and plots 1212 show corresponding thrust demands (e.g., lateral thrust demands along row 1220, longitudinal thrust demands along row 1222, and angular thrust demands along row 1224). In the embodiment shown in FIG. 12, at time 5 s, external disturbances are imposed (significant wind and water currents suddenly hit), and the thrust demand can be seen to react, correcting the velocity buildup, and initially hovering mobile structure 101. As mobile structure 101 is moved according to the target velocities, the linear thrusts change, adapting to the "rotating" disturbance vector.

FIGS. 13-21 illustrate flow diagrams of control loops to provide docking assist (e.g., assisted and/or fully automated docking) in accordance with embodiments of the disclosure. In particular, by contrast to control loop 400 of FIG. 4A and/or control loop 401 of FIG. 4B, FIGS. 13-21 illustrate control loops configured to accept user input corresponding to a series of positions and/or headings for mobile structure 101, such as those implementing a target docking track, as described herein.

In some embodiments, the operations of FIGS. 13-21 may be performed by controller 130 processing and/or operating on signals received from one or more of sensors 140-148, navigation control system 190, user interface 120, and/or other modules 180. For example, in various embodiments, control loop 1300 (and/or other control loops of FIGS. 14-21) may be implemented and/or operated according to any one or combination of the systems and methods described in International Patent Application No. PCT/US2014/13441 filed Jan. 28, 2014 and entitled "STABILIZED DIRECTIONAL CONTROL SYSTEMS AND METHODS," and/or U.S. Patent application Ser. No. 14/321,646 filed Jul. 1, 2014 and entitled "STABILIZED DIRECTIONAL CONTROL SYSTEMS AND METHODS," each of which are hereby incorporated by reference in their entirety.

In accordance with an embodiment, each block may be implemented entirely as instructions executed by controller 130, for example, or may be implemented in a combination of executable instructions and hardware, such as one or more inductors, capacitors, resistors, digital signal processors, and other analog and/or digital electronic devices. It should be appreciated that any step, sub-step, sub-process, or block of in the control loops may be performed in an order or arrangement different from the embodiment illustrated by FIGS. 13-21. For example, although control loop 400 includes block 440, in other embodiments, block 450 may not be present, for example.

Figure 13:
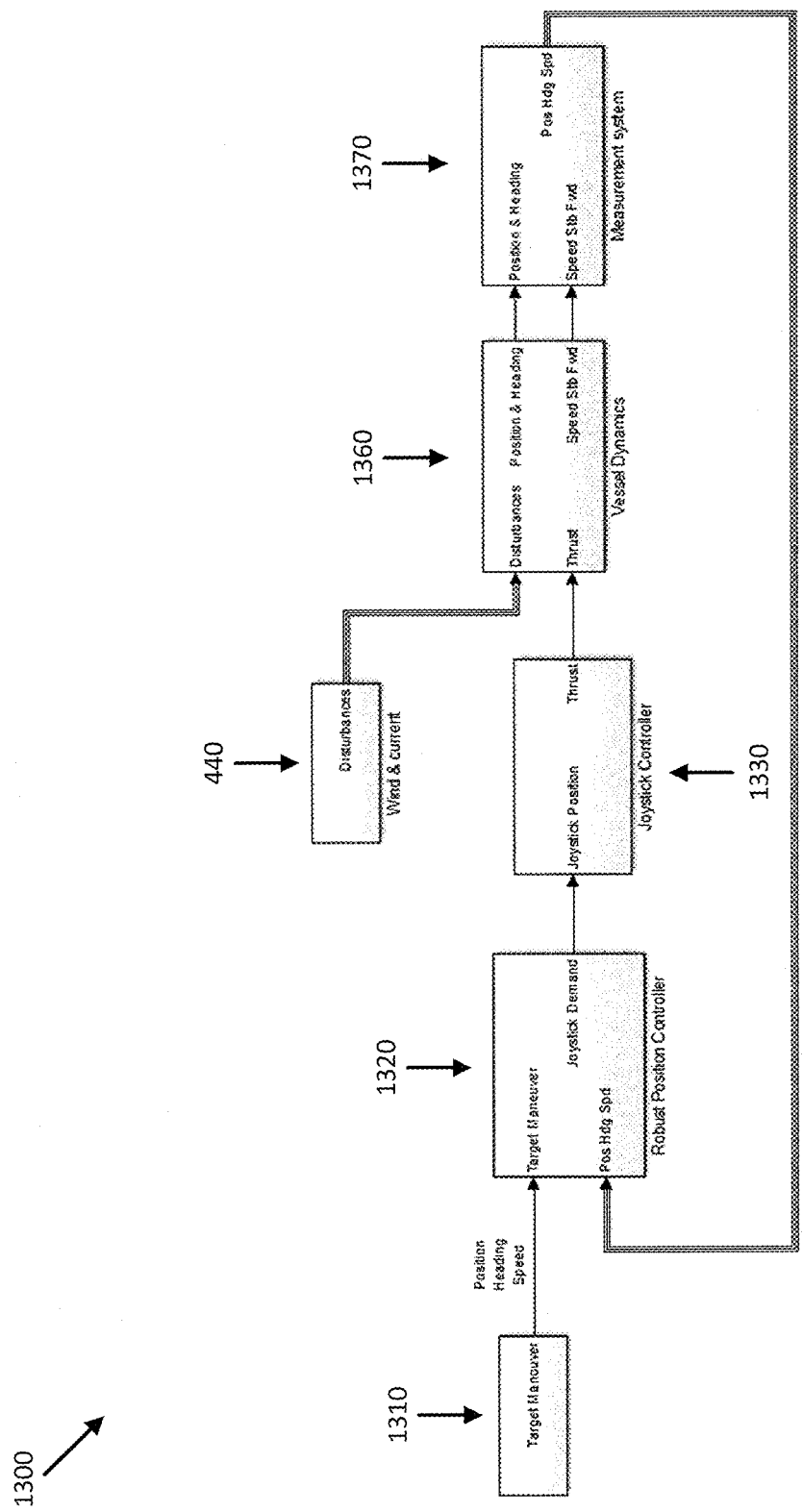
FIGS. 13-21 illustrate flow diagrams of control loops to provide docking assist in accordance with embodiments of the disclosure.

As shown in FIG. 13, control loop 1300 includes target maneuver block 1310 providing a target maneuver to position controller block 1320. In some embodiments, the target maneuver may include a target docking track and/or a corresponding target docking track speed (e.g., the desired and/or maximum speed along a target docking path from a current position of mobile structure 101 to a target docking position and/or orientation). In other embodiments, the target maneuver many include a target docking position and/or orientation, a target docking heading (e.g., the desired general heading from which to initiate a target docking track), and/or a corresponding target docking track speed. As described herein, a target docking track may include (e.g., as an end point) a target docking position and/or orientation.

In some embodiments, target maneuver block 1310 may be configured to receive user input from user interface 120, for example, and generate a target docking track, target docking position and/or orientation, a target docking heading, and/or target docking track speed corresponding to the received user input. In other embodiments, any such target maneuver may be provided by a memory device, an autopilot, and/or other element of system 100 of FIG. 1A and/or process executed by one or more elements of system 100 of FIG. 1A. Target maneuver block 1310 may also be configured to receive a series of such target maneuvers, as described herein, which may be adjusted and/or include adjustments to evade one or more navigation hazards, and forward them on to position controller block 1320.

Position controller block 1320 receives the target maneuver from target maneuver block 1310 and a current measured position, orientation, and/or velocity of mobile structure 101 from measurement block 1370 and generates a controller demand (e.g., a user interface or joystick demand) based on the received target maneuver and current measured state of mobile structure 101 and provides it to thrust controller block 1330. When control loop 1300 is used to model maneuvering of mobile structure 101, thrust controller 1330 simply converts the controller demand into a corresponding thrust force (e.g., a linear and/or angular thrust force) and provides the thrust force to vessel dynamics block 1360. When control loop 1300 is used to control maneuvering of mobile structure 101, thrust controller 1330 may be configured to provide docking assist control signals corresponding to the controller demand received from position controller 1320 to navigation control system 190 (e.g., to one or more of steering sensor/actuator 150, propulsion system 170, and/or thrust maneuver system 172) in order to control maneuvering of mobile structure 101. In alternative embodiments, position controller block 1320 and thrust controller 1330 may be modified to provide/receive a thrust demand and generate a corresponding thrust force and provide the thrust force to vessel dynamics block 1360, similar to blocks 420 and 430 of control loop 400 of FIG. 4A and/or block 421 of FIG. 4B.

When control loop 1300 is used to model maneuvering of mobile structure 101, vessel dynamics block 1360 aggregates the thrust force provided by thrust controller 1330, external disturbance velocities provided by disturbances block 440, and/or model errors (e.g., provided by an optional model error block 450, as shown in FIG. 4A) and converts them into expected positions, orientations, and velocities (e.g., expected maneuvers) for mobile structure 101, which are then provided to measurement block 1370, as shown. While control loop 1300 is used to model maneuvering of mobile structure 101, measurement block 1370 may be configured to receive the expected maneuvers for mobile structure 101 from vessel dynamics block 1360 and generate simulated measurements of the expected maneuvers for mobile structure 101 (e.g., by adding in a measurement delay, for example), which are then provided to position controller 1320 to update the model.

When control loop 1300 is instead used to control maneuvering of mobile structure 101, measurement block 1370 may be configured to receive measured positions, orientations, and velocities for mobile structure 101 (e.g., from sensors 140-148) and provide them to position controller 1320 to proceed through another iteration of control loop 1300. In some embodiments, measurement block 1370 may be configured to receive or request such measurements upon receiving expected linear and angular velocities for mobile structure 101 from vessel dynamics block 1360, so as to provide timing linking for control loop 1300, for example. Other timing linking for control loop 1300 may be accomplished by receiving or requesting such measurements upon navigation control system 190 receiving docking assist control signals from thrust controller 1330. In alternative embodiments, measurement block 1370 may be configured to operate asynchronously with respect to one or more other blocks of control loop 1300.

In general, the origin from which to model or implement various aspects of a target maneuver may be set to be any point, such as a target docking position, for example. By setting the origin to such end position of a target maneuver, renderings of maneuvering of mobile structure 101 according to the target maneuver (e.g., shown on a display of user interface 120) would adjust more naturally as the maneuver evolved; small changes in image geometry as a camera position shifts through a docking maneuver, in images provided by perimeter ranging system 148, would allow the destination origin to naturally adjust. However, for modeling purposes, it can be easy to initialize the model by setting the origin to the current or starting position, orientation, and/or velocity of mobile structure 101. In various embodiments, the term "speed" may refer to the longitudinal component of the velocity of mobile structure 101 and/or the component of its velocity along a corresponding target maneuver (e.g., a target docking track), or a track speed. This definition makes a target maneuver a 'human' definition; humans naturally think about the path a mobile structure will take, how fast it will go, and which way it will point. Humans often do not plan exactly how long a maneuver will take or at what time a mobile structure should be at a certain position. Such definition allows a maneuver to be defined with low granularity; as few as 4 or 5 waypoints are enough to define it. In some embodiments, system 100 may be configured to generate a target docking track (e.g., from user input designating a series of waypoint) with rounded corners, such as corners with 30 degree chamfers, for example, or adjustable chamfers, such as between approximately 10 degree to 45 degree chamfers.

In general, target maneuver block 1310 may be implemented similarly to target maneuver block 410 of FIG. 5 and include input blocks similar to input blocks 510 of FIG. 5 configured to receive user input from user interface 120 and convert the user input into target maneuvers for mobile structure 101, for example, or to receive a series of target maneuvers corresponding to a target docking track, and forward the series of target maneuvers as output of target maneuver block 1310.

Figure 14:
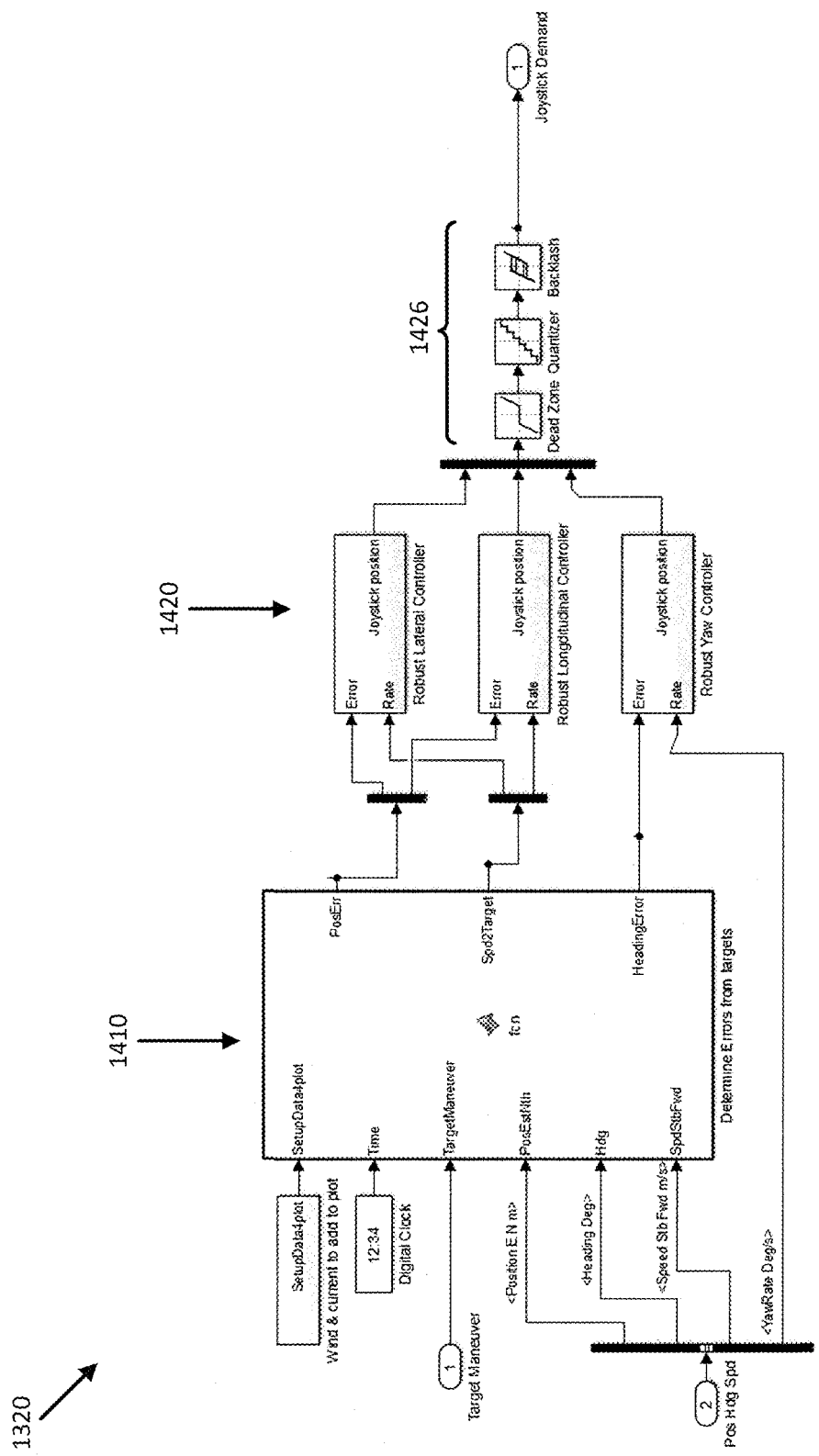
Figure 15:
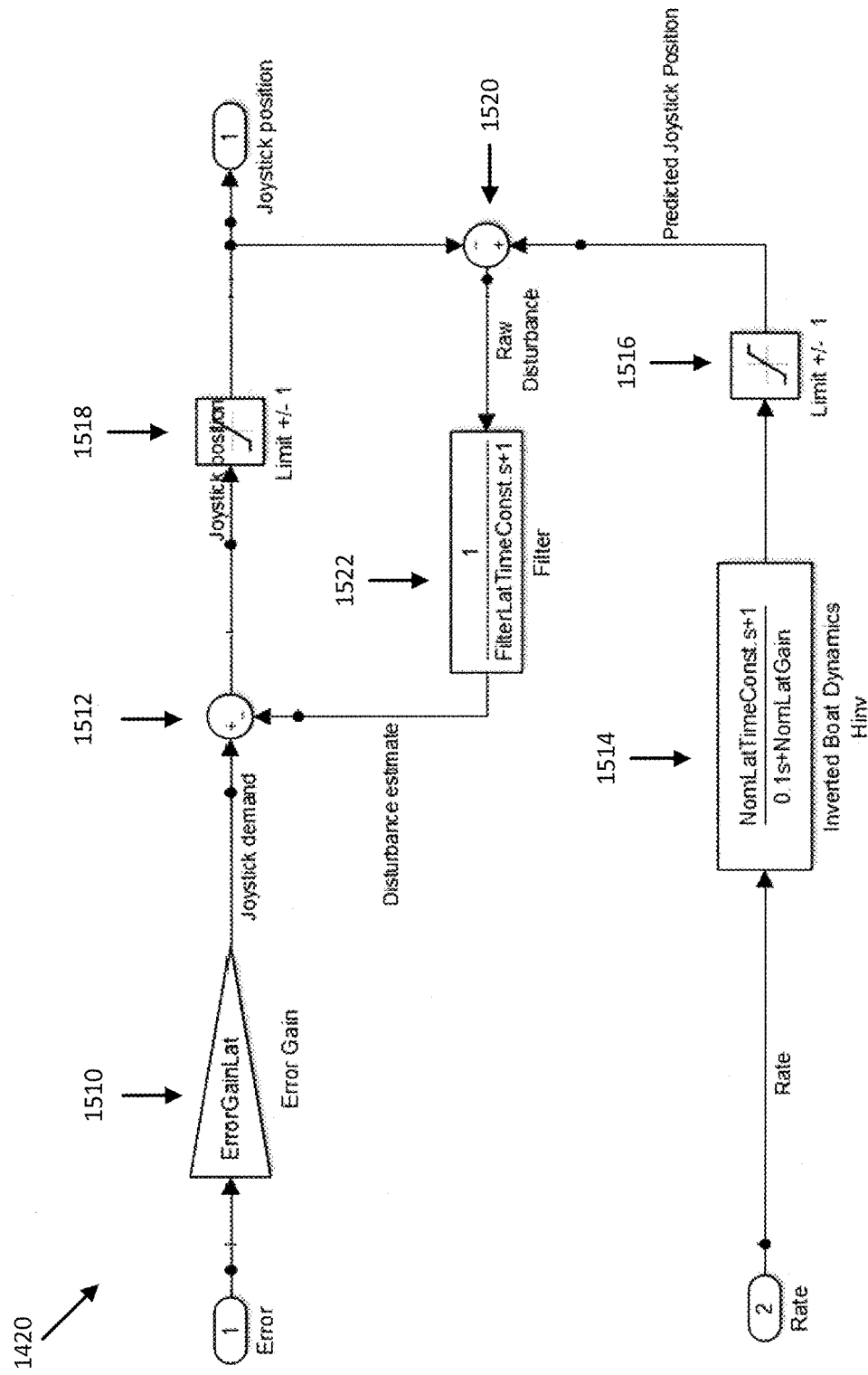

As shown in FIG. 14, in some embodiments, position controller 1320 may include error block 1410, controller demand blocks 1420, and controller demand conditioner blocks 1426. As shown in FIGS. 14 and 22, error block 1410 may be configured to receive target maneuvers and a current state for mobile structure 101 and generate corresponding target maneuver errors, which are then provided to controller demand blocks 1420. As shown in FIG. 15, (e.g., showing only lateral demands, though similar to longitudinal and rotational (yaw) demands) each controller demand block 1320 may be configured to generate a linear or angular controller demand based on corresponding target maneuver errors for mobile structure 101.

In FIG. 15, the current velocity is converted into a predicted controller demand by block 1514 (e.g., based on an inverted dynamic model for a nominal vehicle corresponding to mobile structure 101) and clamped by block 1516. The target maneuver error is converted into a nominal controller demand by block 1510, combined with the predicted controller demand at block 1520, and the resulting raw disturbance is fed back into the nominal controller demand at block 1512 to produce the controller demand as output. Blocks 1518 and 1522 clamp and filter the feedback loop, respectively, so that the output controller demand is within bounds and to reduce a noise level of the raw disturbance, and therein, the output controller demand. Controller demand conditioner blocks 1426 of FIG. 14 further condition the controller demand before providing it as output by limiting minor numerical oscillations and large signal changes (e.g., which could otherwise overwork the navigation controller and/or cause it to fail). In alternative embodiments, controller demand blocks 1420, as shown in FIGS. 14-15, may be modified to provide a thrust demand as output, similar to blocks 424 of velocity controller 420 of control loop 400 as shown in FIGS. 4, 6, and 8.

Figure 16:
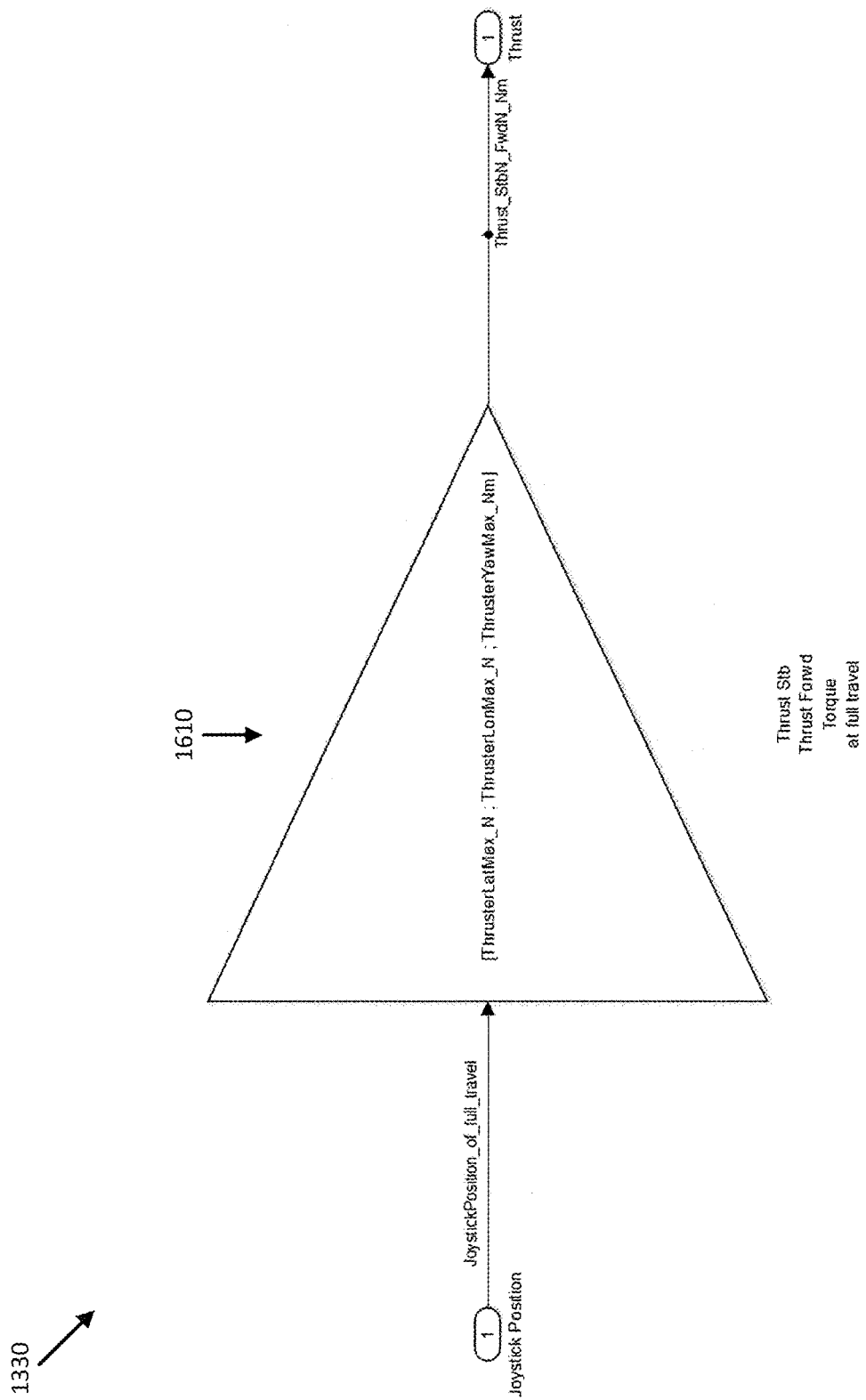

As noted herein, when control loop 1300 is used to control maneuvering of mobile structure 101, thrust controller 1330 may be configured to provide docking assist control signals corresponding to the controller demand received from position controller 1320 to navigation control system 190 in order to control maneuvering of mobile structure 101. When control loop 1300 is instead used to model maneuvering of mobile structure 101, thrust controller 1330 may include conversion block 1610, as shown in FIG. 16, which may be configured to convert controller demands received from position controller 1320 into corresponding thrust forces (e.g., a linear and/or angular thrust forces) and provide the thrust forces to vessel dynamics block 1360. In alternative embodiments, conversion block 1610 and thrust controller 1330 may be modified to receive a thrust demand and generate a corresponding thrust force and provide the thrust force to vessel dynamics block 1360, similar to block 430 of control loop 400 of FIG. 4A and/or block 421 of FIG. 4B.

Figure 17:
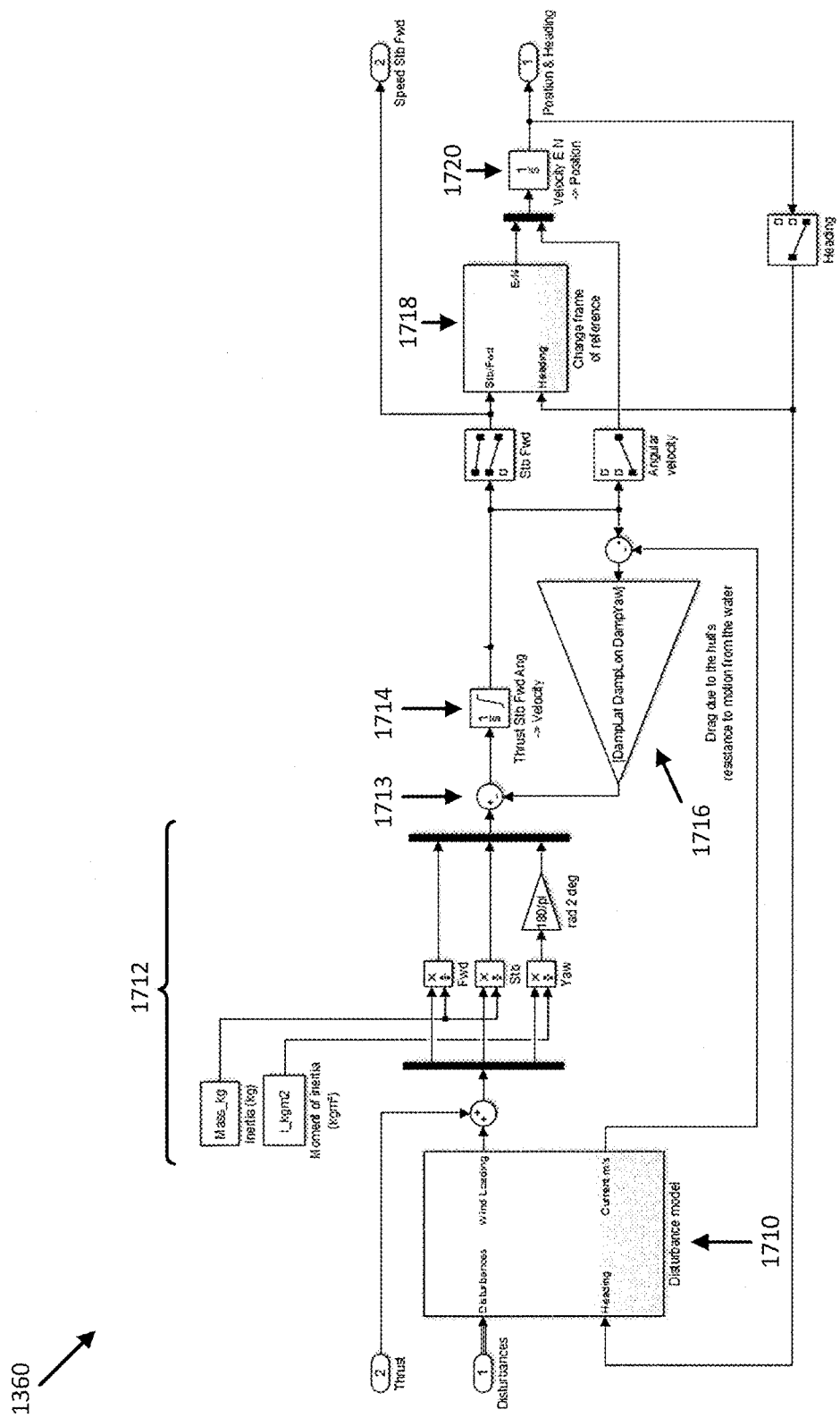
Figure 18:
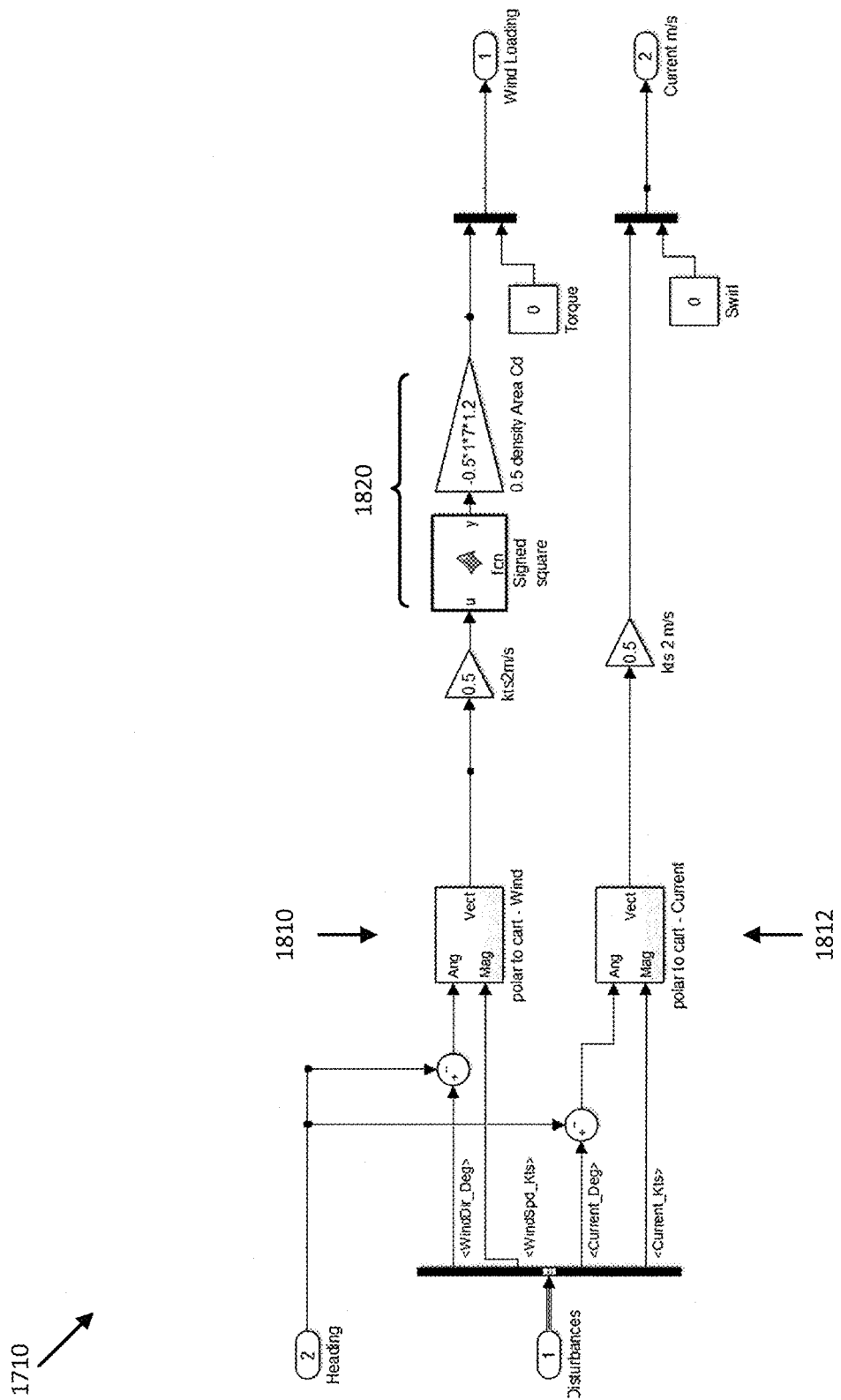

As shown in FIG. 17, in some embodiments, vessel dynamics block 1360 may include disturbance model block 1710, which may be configured to receive disturbance velocities and an estimated heading for mobile structure 101 and provide a wind force (e.g., dependent on an orientation of mobile structure 101 relative to the wind direction) and a water current velocity. The wind force is combined with the thrust force (e.g., provided by thrust controller 1330 in FIG. 16) and provided to combinatorial blocks 1712. As shown in FIG. 18, in some embodiments, disturbance model block 1710 may include coordinate system conversion blocks 1810 and 1812, which may be configured to convert typical coordinates for wind and current directions (e.g., polar coordinates) into Cartesian coordinates for further processing and/or output by disturbance model block 1710. Disturbance model block 1710 may also include wind force blocks 1820 configured to convert a wind disturbance velocity (e.g., which may be a relative wind disturbance velocity) and convert it into a wind force acting on mobile structure 101, for output by disturbance model block 1710, as shown.

Combinatorial blocks 1712 of disturbance model block 1710 convert model errors (e.g., shown in FIG. 17 as no error, or a multiplicative error coefficient of 1) corresponding to linear and rotational inertia into mass and inertia errors and divide the already combined wind and thrust forces by the mass and inertia errors to produce a model and disturbance corrected thrust acceleration. The corrected thrust acceleration is integrated by block 1714 to provide an expected linear and angular velocity for mobile structure 101. The linear velocity is output by block 1360. The water current velocity is combined with the expected linear and angular velocity for mobile structure 101 provided by block 1714 and the resulting relative water velocity is provided to motion damping block 1716. Motion damping block 1716 determines the drag acceleration on mobile structure 101 caused by its relative motion within a body of water. The drag acceleration is combined with the corrected thrust acceleration provided by combinatorial blocks 1712, as part of a feedback loop, at block 1713.

Figure 19:
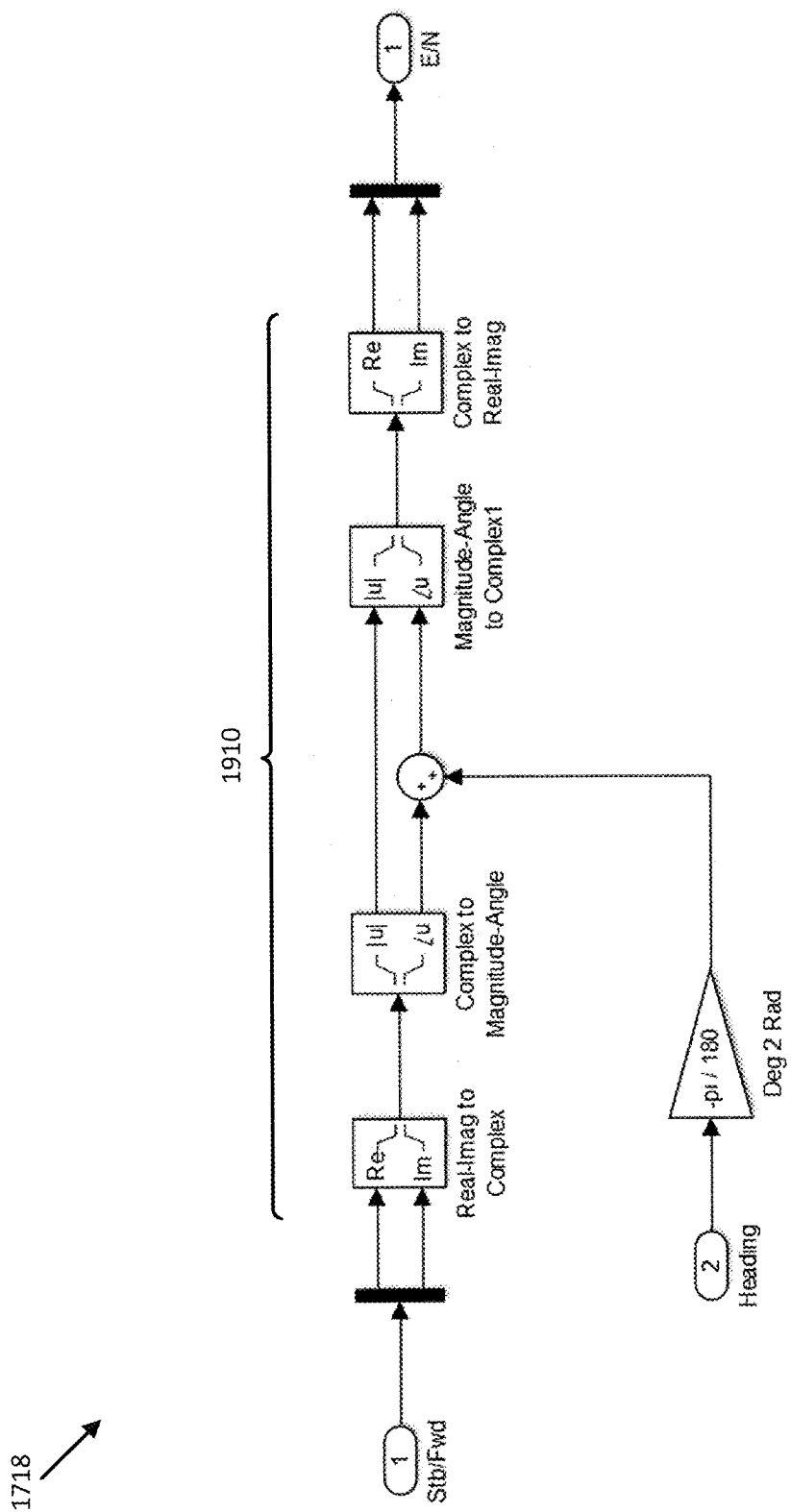

In some embodiments, vessel dynamics block 1360 may also include reference frame conversion block 1718 configured to convert the expected linear velocity of mobile structure 101 provided by block 1714 (e.g., which may be in a lateral/longitudinal local reference frame for mobile structure 101) into an expected linear velocity as represented in an absolute reference frame (e.g., east and north), which may be combined with the expected angular velocity of mobile structure 101 provided by block 1714 and provided to integrator block 1720 to provide a position and/or heading/orientation of mobile structure 101. The position and/or heading/orientation of mobile structure 101 is output by block 1360 and may be fed back to blocks 1710 and 1718, as shown. As shown in FIG. 19, in some embodiments, reference frame conversion block 1718 may include various coordinate frame conversion blocks 1910, which may be configured to convert linear velocities (e.g., in a relative coordinate frame) into linear velocities in an absolute coordinate frame, based on a heading for mobile structure 101, for further processing and/or output by frame conversion block 1718, as shown. In various embodiments, such conversion may be implemented as a simple rotation, as shown in FIG. 19.

Figure 20:
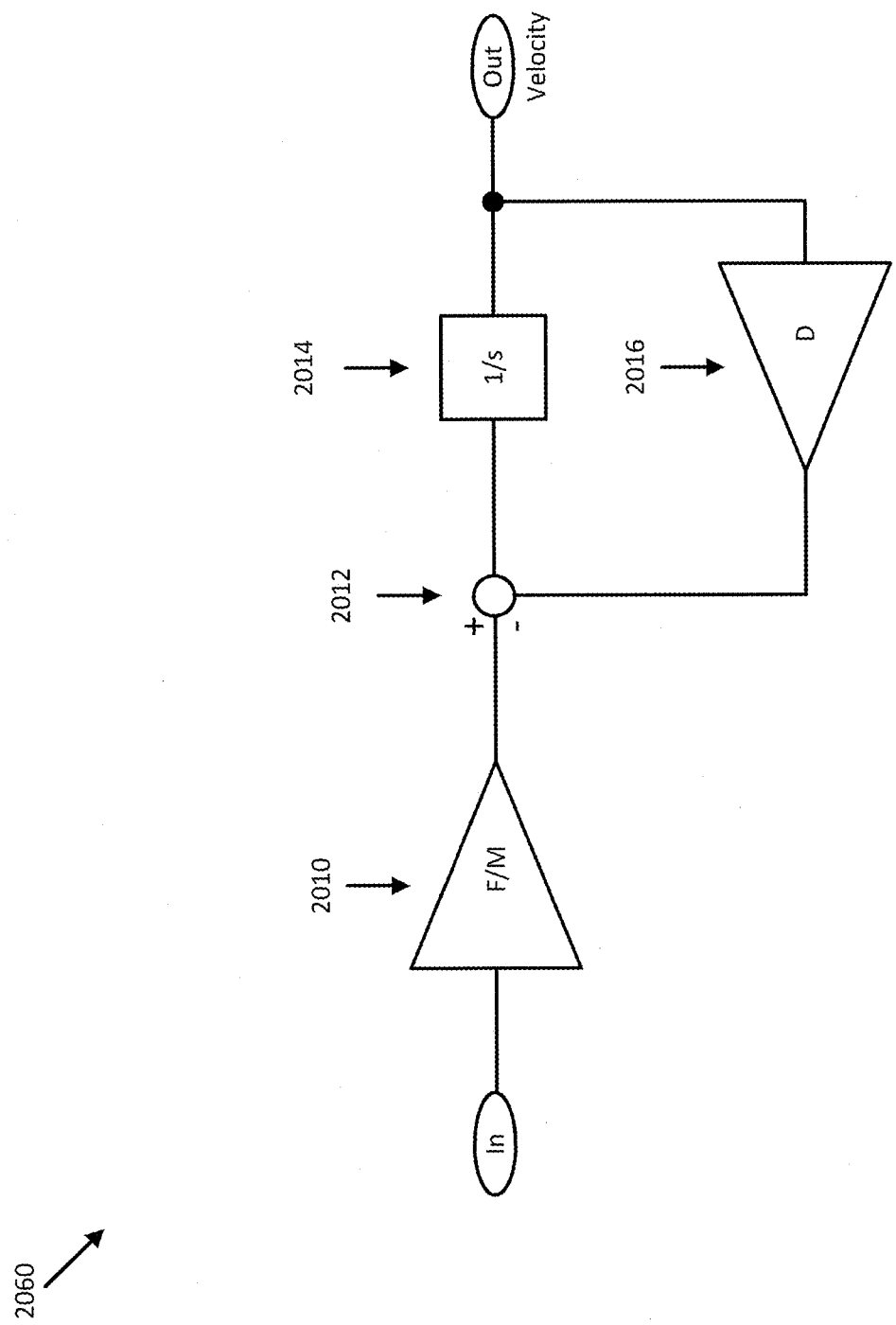

More generally, thrust controller 1330 and vessel dynamics block 1360 (e.g., and/or vessel dynamics block 460) may in some embodiments be simplified (e.g., to omit disturbances and/or model errors) into a combined thrust dynamics block 2060 according to the representation illustrated by FIG. 20, for example, when control loop 1300 is used to model maneuvering of mobile structure 101. For example, in some embodiments, thrust dynamics block 2060 may include conversion block 2010 configured to receive a controller or thrust demand (e.g., provided by position controller 1320 in FIG. 13) and provide a corresponding thrust acceleration. The thrust acceleration may be integrated by block 2014 to provide an expected linear and angular velocity for mobile structure 101, which is then output by thrust dynamics block 2060. The expected linear and angular velocity for mobile structure 101 may be provided to motion damping block 2016, which may be configured to determine a drag acceleration (e.g., related to drag force) on mobile structure 101 caused by its relative motion within a body of water. The drag acceleration is combined with the thrust acceleration provided by block 2010, as part of a feedback loop, at block 2012. In various embodiments, the expected linear and angular velocity output by thrust dynamics block 2060 may be converted into a position and/or orientation of mobile structure 101 using techniques and blocks similar to blocks 1718, 1720, and/or 1360 of FIGS. 17 and 19, for example, which may be used to provide appropriate outputs to measurement block 1370, as shown in FIG. 13.

Figure 21:
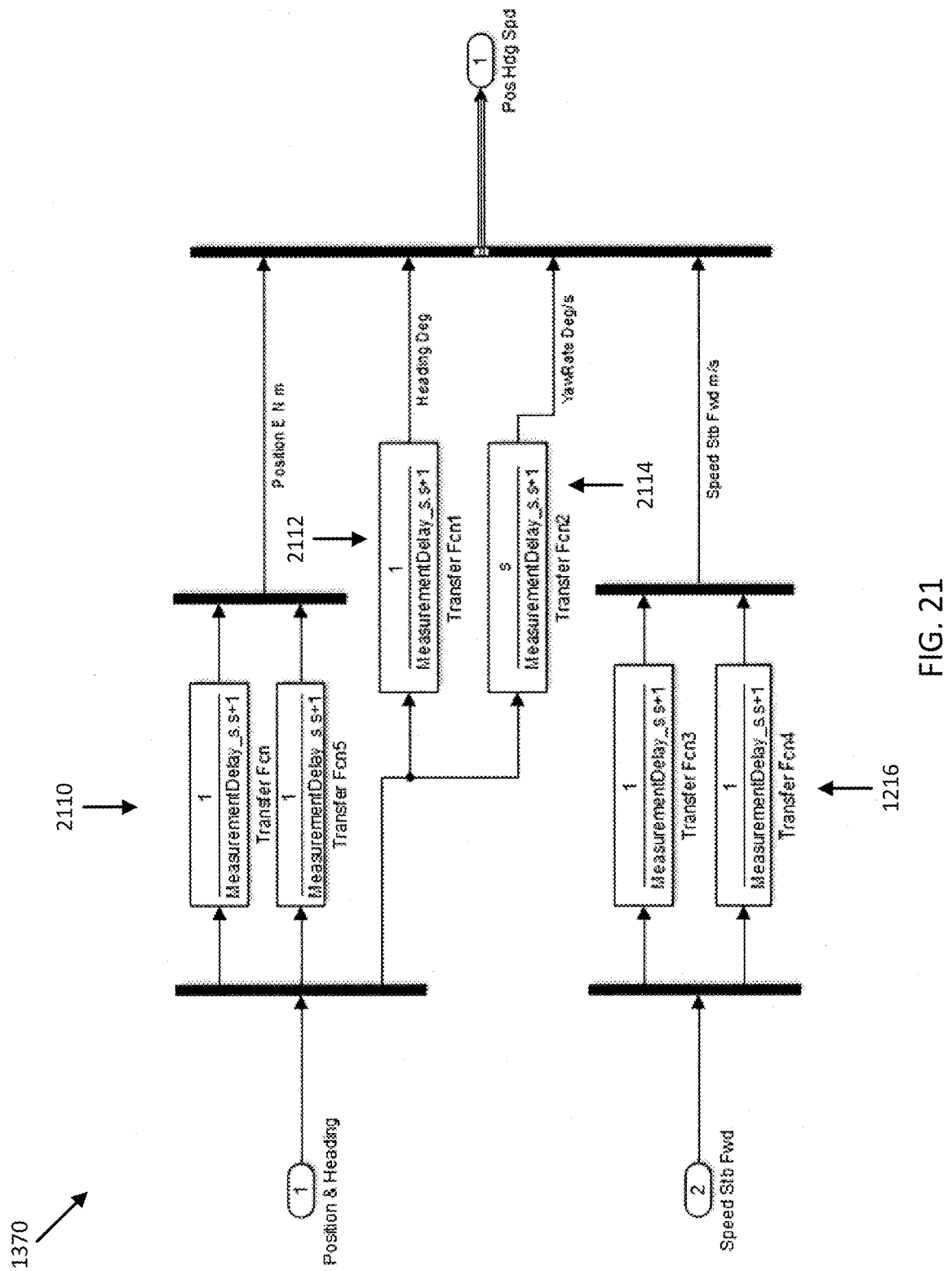

As shown in FIG. 21, in embodiments where control loop 1300 is used to model maneuvering of mobile structure 101, measurement block 1370 may include position transfer function blocks 2110, orientation transfer function block 2112, angular velocity transfer function block 2114, and linear velocity transfer function blocks 2116 each configured to model a measurement delay and provide such measurement delayed positions, orientations, and/or velocities as output, which are then provided to position controller 1320 to update the model. In some embodiments, the transfer function blocks may be implemented as first order filters. In embodiments where control loop 1300 is used to control maneuvering of mobile structure 101, measurement block 1370 may instead include blocks configured to receive measured positions, orientations, and/or velocities for mobile structure 101 (e.g., from sensors 140-148), which may be provided as output to position controller 1320 to proceed through another iteration of control loop 1300. In various embodiments, measurement block 1370 may include blocks configured to receive measured positions, orientations, and/or velocities for mobile structure 101 from perimeter ranging system 148.

As shown in FIGS. 14 and 22, error block 1410 may be implemented as executable script and/or program code configured to receive target maneuvers and a current state for mobile structure 101, along with various other system parameters, and generate corresponding target maneuver errors, which may then be provided to controller demand blocks 1420. For example, as shown in FIG. 22, error block 1410 may be configured to determine a target maneuver error by comparing a current position and/or orientation of mobile structure 101 to a position and/or orientation of the target maneuver (e.g., a target docking track) at a point of closest approach to the target maneuver (e.g., which may be used to generate a position and/or orientation error), and then comparing the current velocity of mobile structure 101 to a target velocity corresponding to the same point of closest approach. As shown in FIG. 23, in embodiments where the modeled maneuvering of mobile structure 101 is to be plotted for display to a user, error block 1410 may include initialization block 2300 (e.g., implemented in FIG. 23 as executable script and/or program code) configured to convert a target maneuver (e.g., a target docking track) represented by relatively few waypoints (e.g., 4, as would be typical for user input) into a target maneuver represented by larger number of waypoints (e.g., 1000) in order to provide sufficient resolution for fine control/modeling of maneuvering of mobile structure 101.

FIGS. 24A and 24B include plots 2400 of various simulation parameters and control signals for docking assist system 100, in accordance with embodiments of the disclosure. For example, plot 2410 shows a target maneuver for mobile structure 101 including a target docking track 2428 defined according to a starting position/orientation 2420, a target docking position/orientation 2426 at dock 222, and two waypoints 2422 2424 disposed therebetween. Also shown along target docking track 2430 are controller demand indicators 2430 indicating a controller demand (e.g., corresponding to a linear thrust for thrust controller 190) to maneuver mobile structure 101 along target docking track 2428. Plots 2412 shows plots of controller demands implementing target docking track 2428, and plots 2412 show plots of, from top to bottom, position, velocity, and heading error along target docking track 2428 while mobile structure 101 is piloted according to the controller demands shown in plots 2412, along the same time base.

In accordance with various embodiments of the present disclosure, various control loop parameters, user inputs, sensor signals, controller signals, and other data, parameters, and/or signals described in connection with system 100 and/or control loops depicted in FIGS. 4A-11 and 13-21 may be stored at various points in the control loops, including within and/or during execution of any one of the blocks of a particular control loop.

As described herein, embodiments of the disclosed robust control automatically compensate for drift from tide and wind, giving fast disturbance rejection without destabilizing the control loop. However, such compensation can only be effective within the capability of the navigation control system; for example, a sailboat without bow thrusters cannot always compensate for cross wind. As such, it may not be possible to hold mobile structure 101 at a target position and/or orientation. In some embodiments, a docking process may be flagged as complete when mobile structure 101 is within predefined success tolerance range of a target position and/or orientation (e.g., 20 cm, 0.5 degrees) and unable to maneuver closer to the target position and/or orientation.

Fast feedback robust control can require high bandwidth measurements, and gyroscope/accelerometer 144 may be configured to provide such high bandwidth measurements to complement perimeter ranging system 148. Resulting ranging to navigation hazards and/or relative velocities of navigational hazards may then be the result of fusion of perimeter ranging system measurements and, for example, lateral acceleration measurements. Such fusion may be accomplished using various signal processing techniques, including fusion techniques employing Kalman filters, for example.

Figure 25:
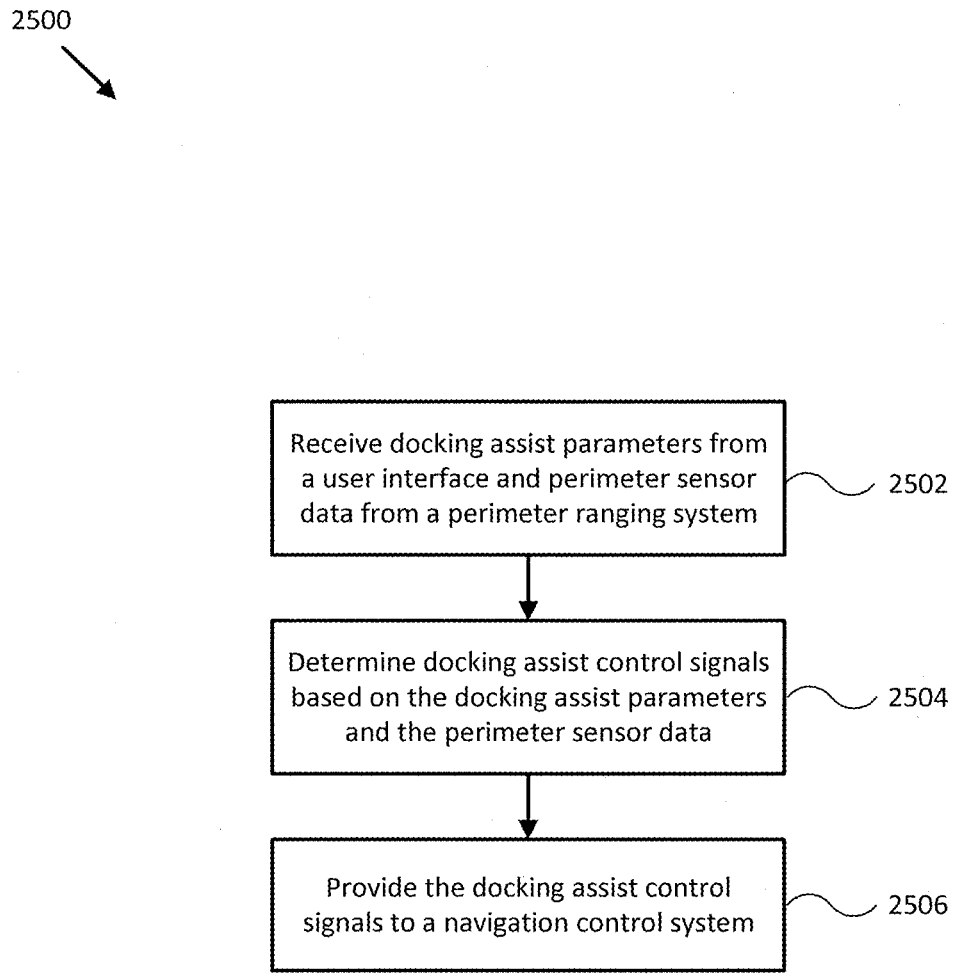
FIG. 25 illustrates a flow diagram of a process to provide docking assist for a mobile structure in accordance with an embodiment of the disclosure.

FIG. 25 illustrates a flow diagram of a process 2500 to provide docking assist for mobile structure 101 in accordance with an embodiment of the disclosure. More generally, process 2500 may be used to provide general navigational control for mobile structure 101. It should be appreciated that any step, sub-step, sub-process, or block of process 2500 may be performed in an order or arrangement different from the embodiments illustrated by FIG. 25. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 2500 is described with reference to systems, processes, control loops, and images described in reference to FIGS. 1A-24B, process 2500 may be performed by other systems different from those systems, processes, control loops, and images and including a different selection of electronic devices, sensors, assemblies, mobile structures, and/or mobile structure attributes, for example.

In block 2502, docking assist parameters are received from a user interface and perimeter sensor data is received from a perimeter ranging system. For example, controller 130 may be configured to receive docking assist parameters from user interface 120 and perimeter sensor data from perimeter ranging system 142.

In some embodiments, the docking assist parameters may include user pilot control signals, such as user input provided to user interface 120 for direct navigational control of mobile structure 101. Such user input may include linear and/or rotational joystick user input, a dead stick user input, and/or other direct user input to user interface 120. In other embodiments, the docking assist parameters may include a target docking position and/or orientation for mobile structure 101. For example, controller 130 may be configured to generate a view of a docking area for mobile structure 101 on a display of user interface 120 and receive user input from user interface 120 indicating a target docking track and/or a target docking position and/or orientation within the generated view of the docking area.

In block 2504, docking assist control signals are determined based on docking assist parameters and perimeter sensor data. For example, controller 130 may be configured to determine one or more docking assist and/or navigation control signals based, at least in part, on the docking assist parameters and the perimeter sensor data received in block 2502.

In some embodiments, where the docking assist parameters received in block 2502 include user pilot control signals, controller 130 may be configured to determine a target linear and/or angular velocity for mobile structure 101 based, at least in part, on the user pilot control signals and a maximum maneuvering thrust of the navigation control system. Controller 130 may be configured to then determine the one or more docking assist control signals based, at least in part, on the determined target linear and/or angular velocity, where the one or more docking assist control signals are configured to cause navigation control system 190 to maneuver mobile structure 101 according to the determined target linear and/or angular velocity. In related embodiments, the user pilot control signals may correspond to a dead stick user input, as described herein, and the target linear and/or angular velocity for mobile structure 101 may be set to zero.

In other embodiments, where the docking assist parameters received in block 2502 include a target docking position and/or orientation for mobile structure 101, controller 130 may be configured to determine a target docking track for the mobile structure based, at least in part, on the target docking position and/or orientation and one or more docking safety parameters corresponding to the target docking track. In further embodiments, the docking assist parameters received in block 2502 may themselves include a target docking track. In either embodiments, controller 130 may be configured to then determine the one or more docking assist control signals based, at least in part, on the determined or received target docking track, where the one or more docking assist control signals are configured to cause navigation control system 190 to maneuver mobile structure 101 according to the determined or received target docking track.

In additional embodiments, controller 130 may be configured to determine a range to a navigation hazard disposed within a monitoring perimeter of the perimeter ranging system based, at least in part, on the received perimeter sensor data, determine the range to the navigation hazard is within a safety perimeter for the mobile structure, and/or determine the one or more docking assist control signals based, at least in part, on the determined range to the navigation hazard, wherein the one or more docking assist control signals are configured to cause navigation control system 190 to maneuver mobile structure 101 to evade the navigation hazard by maintaining or increasing the range to the navigation hazard.

In further embodiments, controller 130 may be configured to determine a relative velocity of a navigation hazard disposed within a monitoring perimeter of perimeter ranging system 148 based, at least in part, on the received perimeter sensor data, to determine the relative velocity of the navigation hazard towards mobile structure 101 is greater than a hazard velocity limit, and determine the one or more docking assist control signals based, at least in part, on the determined relative velocity of the navigation hazard, wherein the one or more docking assist control signals are configured to cause navigation control system 190 to maneuver mobile structure 101 to evade the navigation hazard by decreasing the relative velocity of the navigation hazard towards mobile structure 101.

Controller 130 may also be configured to determine wind and/or water current disturbances affecting navigation of mobile structure 101 and to determine the one or more docking assist control signals based, at least in part, on the determined wind and/or water current disturbances, wherein the one or more docking assist control signals are configured to cause navigation control system 190 to compensate for the determined wind and/or water current disturbances while maneuvering mobile structure 101 according to the received docking assist parameters.

In block 2506, docking assist control signals are provided to a navigation control system. For example, controller 130 may be configured to provide the one or more docking assist and/or navigation control signals determined in block 2504 to navigation control system 190. In some embodiments, navigation control system 190 may include one or more of steering actuator 150, propulsion system 170, and thrust maneuver system 172, and providing the docking assist control signal to navigation control system 190 may include controlling steering actuator 150, propulsion system 170, and/or thrust maneuver system 172 to maneuver mobile structure 101 according to a target linear and/or angular velocity or a target docking position and/or orientation corresponding to docking assist parameters received in block 2504.

For example, controller 130 may be configured to control steering actuator 150, propulsion system 170, and/or thrust maneuver system 172 of mobile structure 101 to generate a target linear and/or angular velocity for mobile structure 101 identified in the docking assist parameters provided in block 2504. If the target linear and/or angular velocity is zero (e.g., corresponding to a dead stick user input), then the docking assist control signals may be configured to counteract any detected motion of mobile structure 101, including motion caused by various external disturbances, as described herein. In another example, controller 130 may be configured to control steering actuator 150, propulsion system 170, and/or thrust maneuver system 172 of mobile structure 101 to follow a target docking track to a target docking position and/or orientation identified in the docking assist parameters provided in block 2504.

In some embodiments, controller 130 may be configured to provide docking assist control signals configured to evade a navigation hazard detected by perimeter ranging system 190 by maintaining or increasing a range to the navigation hazard and/or by decreasing the relative velocity of the navigation hazard towards mobile structure 101. In such embodiments, the docking assist control signals may be configured to minimize deviation from the target linear and/or angular velocity, or to minimize deviation from the target docking track, while evading the navigation hazard.

Embodiments of the present disclosure can thus provide reliable and accurate docking assist for mobile structures. Such embodiments may be used to provide assisted and/or fully autonomous docking and/or navigation of a mobile structure and may assist in the operation of other systems, devices, and/or sensors coupled to or associated with the mobile structure, as described herein.

In accordance with various related embodiments, a docking assist system may be configured to provide virtual bumpers or spatial safety margins about the perimeter of mobile structure 101 as the mobile structure navigates. For example, system 100 may be configured to attenuate joystick velocity demand upon the detected approach of or to a navigation obstacle or hazard (e.g., to reduce a component of the velocity of mobile structure 101 towards the detected hazard). Such attenuation may be greater as distance to the detected hazard decreases, and, in some embodiments, the velocity demand may be set to zero once the distance to the hazard is within a preset minimum safety margin distance or virtual bumper size (e.g., 20 cm, which may correspond to a typical stepping-off distance). In further embodiments, the velocity demand may be increased in a direction opposite the closing direction to the navigation hazard in order to maintain and/or increase the minimum safety margin distance, if no other objects block such movement of mobile structure 101.

Typically, a user providing manual input to a joystick will always be allowed to joystick away from such objects (e.g., without attenuation), but will be subject to such attenuation when joysticking towards objects within a navigation safety distance (e.g., a distance relative to the perimeter of mobile structure 101, larger than the minimum safety margin distance, selected to allow time and space for mobile structure to evade collision with the navigation hazard). Such navigation safety distance may be adjusted (e.g., increased, decreased, shaped) according to the velocity of mobile structure 101, the navigation hazard, and/or the relative velocity between the two. Certain embodiments provide safer navigation without increasing risk of collision by only attenuating user velocity input; velocity demand is not created, and so system 100 cannot actively steer or propel mobile structure 101 towards a collision and instead can only work to keep a user from doing so.

In accordance with various additional related embodiments, a docking assist system may be configured to use video analytics to highlight navigation hazards (e.g., posts, dock piles) that might go unnoticed or are within a certain distance of a known route. For example, system 100 may be configured to detect navigation hazards within a preset distance of a planned docking route and/or a position and/or course of mobile structure 101, and to identify and/or highlight (e.g., increase the display brightness of corresponding pixels, render a graphic or icon and/or descriptive text adjacent to and/or over such pixels) such navigation hazards as represented on a display of user interface 120. In some embodiments, a video stream of images from cameras 212, 214, and/or 216 may be displayed on user interface 120 and portions of the video stream adjusted or graphics rendered over such video stream to include such identifications and/or highlighting.

In accordance with various additional related embodiments, a docking assist system may be configured to use similar techniques to highlight and/or identify a target docking path in such video stream. For example, system 100 may be configured to determine the docking path to a target docking position, including any docking maneuvers along the docking path and corresponding swept out surface areas needed to accomplish the docking maneuvers, and then display the area associated with docking maneuvers as a highlighted or otherwise identified portion of the water surface (e.g., a docking maneuver zone), as displayed on a display of user interface 120. For example, such docking maneuver zone may be displayed to a user as a graphical overlay rendered on video images provided by cameras mounted to mobile structure 101, similar to a video walk-through of the route/maneuvers mobile structure 101 will take and the zone through which mobile structure 101 occupies space. Such display may be provided on a collection of images, a chart, or other simulated renderings before mobile structure 101 is navigated along the extent of the docking path in order to show a user an expected evolution of the docking maneuvers before the user accepts the docking path/maneuver(s).

In accordance with various additional related embodiments, docking assist system 101 may be configured to provide more general autopiloting of mobile structure 101. For example, sensor fusion and model based virtual and augmented reality systems and methods, as described herein, may provide a database of the objects about mobile structure 101. Such database can be used to control an autopilot to change course, such as to avoid hitting an obstacle in front of mobile structure 101. Such controller (e.g., controller 130) may be configured to use generally available or user supplied rules and/or preferences of navigation and the object information in the database to generate autopilot course alterations that comply with good seamanship. In some embodiments, system 100 may be configured to sound warnings and/or adjust propulsion system 170 (e.g., to reduce or eliminate motion of mobile structure 101) if no safe steering solution is apparent to a particular situation.

In accordance with various additional related embodiments including a joystick controller/user interface and/or other dedicated controller for docking mobile structure 101, docking assist system 100 may be configured to automatically initiate assisted or autonomous docking (e.g., process 2500) upon detecting certain initialization criteria. For example, controller 130 may be configured to initiate assisted and/or autonomous docking if physical manipulation/user provided input of joystick 120 is detected, for example, or display view 209A or 209B (e.g., a docking display view) is selected for display by user interface 120. In embodiments without joystick 120, such initialization may be triggered when a throttle input (e.g., to propulsion system 170) drops below a predefined threshold, for example, or when a speed over ground of mobile structure 101 drops below a predefined threshold. As part of such initialization, system 100 may be configured to automatically execute a predefined selection of applications, for example, such as applications for displaying perimeter data and/or other sensor data on user interface 120 (e.g., along with display views 209A and/or 209B). Such selection of applications may be initialized, given priority over other running applications, and/or brought to the front perspective of user interface 120, such as whenever physical manipulation/user provided input of joystick 120 is detected.

In accordance with various additional related embodiments, docking assist system 100 may be configured to provide automated or assisted trailer loading/positioning of mobile structure 101. For example, controller 130 may be configured to detect a position, orientation, and/or depth of a loading trailer for mobile structure 101 (e.g., using any one or combination of the sensor systems described herein), including using object recognition processing to detect a presence, relative position, and/or orientation of such loading trailer, and to navigate mobile structure 101 over the loading trailer, so as to enter from the rear of the loading trailer and move along a keel direction of the loading trailer. In some embodiments, a system 100 may be configured to provide assisted trailer loading by controlling lateral motion of mobile structure 101 while a user provides longitudinal motion control (e.g., via joystick 120 and/or a traditional throttle). Such techniques may be used to position mobile structure 101 dead center over such loading trailer.

In similar embodiments, such process may be used to position mobile structure 101 within a cradle or over a hydraulic lift so as to facilitate crane hydraulic lift of mobile structure 101 (e.g., out of a body of water). In such embodiments, system 100 may be configured to detect and identify a position, depth, orientation, and/or other characteristics of such trailers, cradles, or lifts, for example, and differentiate between such structures sufficiently to safely navigate into or over such structures and/or assist in such navigation, as described herein.

Figure 26:
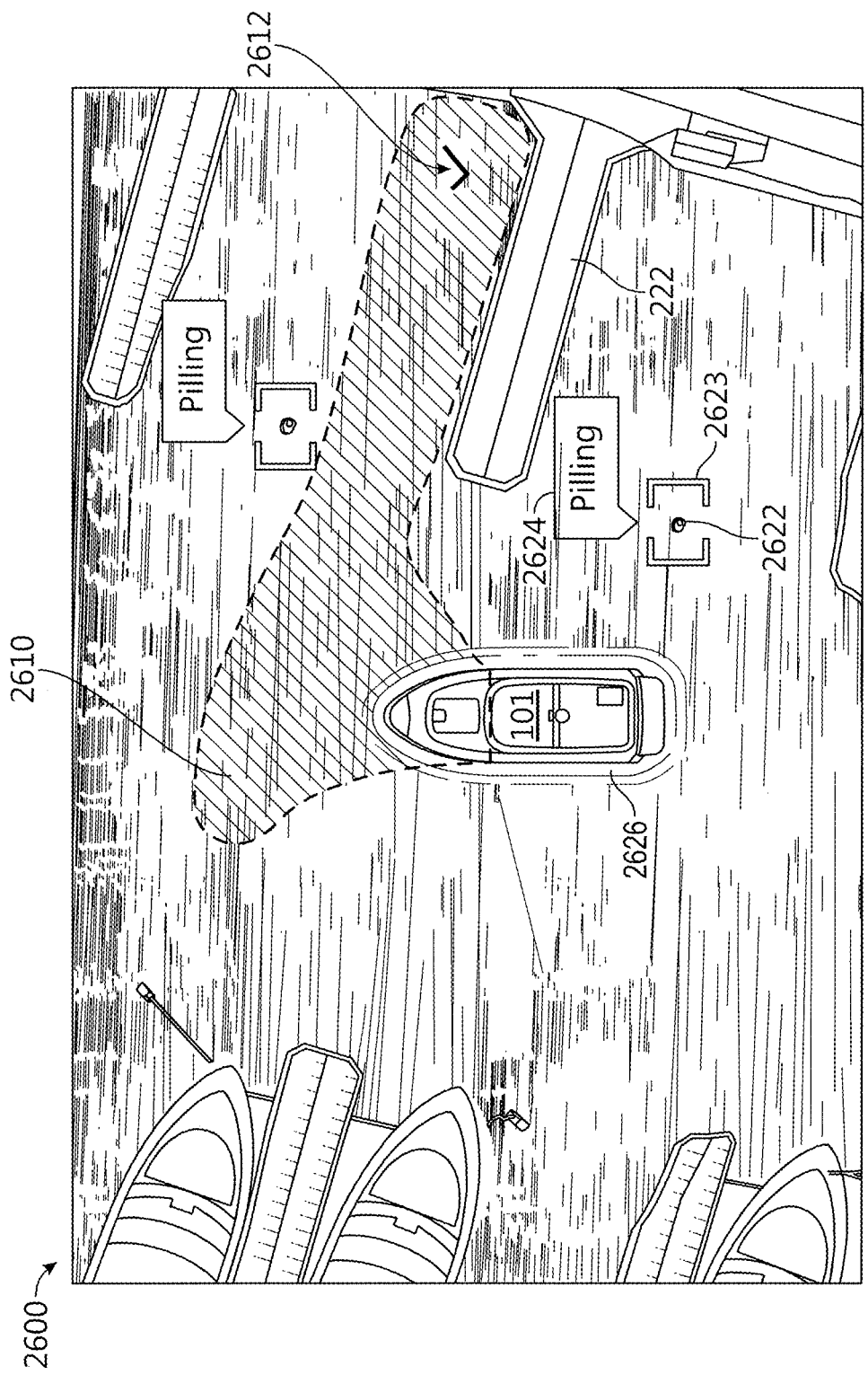
FIG. 26 shows a diagram illustrating various aspects of a perimeter ranging system for a docking assist system in accordance with an embodiment of the disclosure.

FIG. 26 shows display view 2600 illustrating perimeter sensor data from perimeter ranging system 148, in accordance with an embodiment of the disclosure. For example, display view 2600, which may be displayed to a user using a display of user interface 120, shows images captured by cameras 212, 214, and/or 216, for example, of a docking area including dock 222 and pilings 2622 after processing by image analyzer 270. As shown in display view 2600, pilings 2622 (e.g., navigation hazards) have been identified (e.g., by co-processor 270b) and/or highlighted with graphical identifiers 2623 and textual identifiers 2624 (e.g., provided as analytics metadata by video processing IC 270a) to help a user guide mobile structure 101 within the docking area to target docking position 2612.

Display view 2600 also includes docking maneuver zone 2610 indicating the docking path for mobile structure 101 to target docking position 2612, including a docking maneuver to swing the rear of mobile structure 101 around to back into target docking position 2612. Also shown in display view 2600 is highlighting 2626 of mobile structure 101, which may include increasing the brightness and/or changing the color or other characteristics of pixels corresponding to mobile structure 101, for example, to highlight or otherwise make such object stand out from other objects displayed in display view 2600. In some embodiments, target docking position 2612 may correspond to a loading trailer, a cradle for a crane lift, or a hydraulic lift, which may be identified and/or characterized as described herein.

In addition and to supplement the above, embodiments offer the following improvements. For example, controller 130 may be configured to receive relatively high resolution image of a docking environment (e.g., catways, etc.) and render a display view on a display of user interface 120 allowing a user to select a docking position and/or orientation for mobile structure 101. Perimeter ranging system 148 may be configured to provide fast and accurate (e.g., low noise and low latency) measurements of a position of mobile structure 101 relative to a target location, for example, and/or a relative velocity between mobile structure 101 and a dock or other navigation hazard or waypoint.

In general, docking assist system 100 may be configured to identify and avoid navigational hazards, while ignoring objects that do not present a navigational hazard. As such, embodiments may be implemented with artificial intelligence (AI) systems and techniques differentiate objects like sea gulls or floating debris that do not present a navigational hazard (indeed trying to avoid them would be dangerous) from, for example, the corner of a kayak, which could be of a similar size and color but should be avoided. Such intelligent systems/techniques may help determine a target pathway from a current position to a target location, avoiding obstacles, and taking into account the geometry and safety zone corresponding to mobile structure 101.

In various embodiments, docking assist system 100 may be configured to determine a difference between a target pathway and the actual position, the corresponding position and heading errors, and account for related sideslip dynamics. For example, such errors may be used to generate compensating navigation control signals. Because different boats operate according to different characteristic dynamics, embodiments provide such compensation adaptively. For example, often control signals need to be converted into the thrust axes of a particular vessel: some vessels have side thrusters, some have twin screws, and some have thrust maneuver systems.

Marine vessels can be complex places to install perimeter ranging systems. Installation is often done by end users on old boats, or by dealers. Unlike automotive applications, marine installations are often not factory fit. As such, installation and composition of elements of perimeter ranging system 148 should emphasize: low-latency; de-warping, stitching and motion stabilization of the sensors, with minimal cabling coming down to the control point; architecture that can accommodate a range of vessel sizes (e.g., 10 ft to 100 ft), and from sail to power; provide imagery into the distance with good resolution when approaching a dock (e.g., at 20 m), and to see all round as well as down for docking; provide imagery for a plan view of the environment so obstacles can be avoided and docking can be safe in all situations; minimal installation and setup, minimum number of sensors/installation points; small form factor and lightweight for ease of installation high up (>3 m height); self-aligning, or with integral levelling (bubble level).

In some embodiments, docking assist system 100 may be configure to generate an audible warning to alert a user as the vessel's virtual bumper zone approaches an obstacle. The tone or volume can be modulated to indicate proximity. Furthermore, the region of proximity can be highlighted on a synthetic elevated view overlay, for example the lineation line between water and dock/boat can be overlaid on top of the synthetic elevated view and the proximity 'hot spots' can be pulsing in intensity.

For assisted docking, this visible warning can be useful in explaining to the user why the system is attenuating demand. For example, if the system has picked up a floating fender which the user would typically ignore but the system counts as an obstruction, then the pulsating outline around the floating fender would explain to the user why the joystick demand for velocity is not being delivered.

Should the virtual bumpers prevent entry into a tight berth, docking assist system 100 may notify the user and provide options. One is to reduce the size of the virtual bumper region, but this can be onerous and take time to do safely. Another is to allow the user to override the virtual bumpers via an override button, a user joystick action such as applying full joystick (like a kick-down switch on cruise control in a car), or other user interface techniques.

Blind spots can present a safety problem, over the sides, and aft, but particularly over the bow of a vessel. As the vessel moves forwards and approaches a dock, the dock can become obscured. To combat this, docking assist system 100 may in some embodiments include a camera or a pair of cameras looking over the bow and mounted on the toe rail or guard rail. In other embodiments, docking assist system 100 may be configured to use prior imagery of the dock, when it was visible, along with translational motion measurements (which themselves can be inferred from changes in imagery over time), to infer a range to the occluded dock edge. A camera system has the advantage over a human operator that, by using visual odometry (e.g., a measure of translational motion using differences in images over time), the historical imagery can be slid into exactly the right place relative to the boundary of the vessel. The existence of such blind spots can be automatically detected and sized during a calibration phase where the vessel performs a 360° spin, such as just after the system is installed.

A risk for autonomous docking is that the system drives the boat into an obstacle, either because an obstacle has not been detected, or because of a system fault. An "attenuation principle" can be applied to operation of docking assist system 100 to eliminate the risk of system 100 driving mobile structure 101 into an obstacle. This principle is defined such that detection of an obstacle cannot lead to velocity demand, but instead leads to the attenuation of a user's joystick or other manual user interface input, for example, or an attenuation of some other source of velocity demand (e.g., a docking assist navigation control signal/demand). For example, the output of the perimeter ranging system 148 can include a signal (or set of signals, forwards sideways rotation) in the range 0 to 1, where 1 implies leave the users velocity demand intact, and 0 means apply zero velocity demand (brakes) regardless of the user's demand. Such an attenuation signal cannot cause a vessel crash, but it can frustrate the user by preventing velocity demand, and it can fail to prevent a user induced crash. In various embodiments, the attenuation signal/gain adjustment is only allowed to fall below 1 where the user demands velocity towards an obstacle. Velocity demand away from an obstacle will never cause attenuation. Sliding along an obstacle is therefore possible, for example if a vessel is sliding into a dock, and the virtual bumper is close to touching down one side, then sideways velocity demand may be attenuated to 0 whereas forwards velocity demand would not be restricted until the bow approaches the front virtual bumper, so the vessel may continue following the path of least resistance along the direction of the dock.

In some embodiments, docking assist system 100 may be configured to generate a synthetic elevated view derived from a fixed camera installation, as described herein, or from an unmanned aerial vehicle (UAV) (e.g., other modules 180) which can be automatically deployed and controlled by docking assist system 100. In some embodiments, as a user modifies the center or angle of a synthetic elevated view on the touch screen, docking assist system 100 may communicate with the UAV to cause it to move accordingly.

For boats with conventional propulsion systems (e.g., rudder and motor), it is not always possible to stop the boat (the wind will take the boat as the rudder loses control). In this case, the maneuver can be described as dynamic, which means it must be done in one go, keeping boat speed up. The stronger the wind and current, the higher the minimum boat speed. For these maneuvers, assisted docking may not be possible, and autonomous docking may be required. Once the user has specified the target location, docking assist system 100 determines a pathway which is appropriate for the vessel type. For example, a sailboat can come to a dock at 45°, then turn at the last minute and go into reverse to slow down. An outboard steered power boat cannot be docked using this strategy; rather, the engines should be turned to opposite lock and reverse thrust applied at the last minute, slowing the vessel and tucking in the stern. Vessels with bow thrusters have docking patterns which are different again. The boat type may be selected as part of calibration of docking assist system 100, and the appropriate set of docking patterns is then made available for selection by the user. For a docking scenario, docking assist system 100 may pick from the list of possible patterns and fit the chosen patterns to the specific scenario. A user may then be offered a set of choices (overlaid on a display of user interface 120), and can select their desired choice.

For velocity control, it is important to have a good measurement of velocity over the ground. GNSS may sometimes not be good enough due to random walk (unless differential GPS or similar is used, but this requires a base station mounted to the dock, with a radio link to the rover onboard), and noise in Doppler can be a limiting factor. So another technique is needed and a generic velocity measurement system should be capable of deployment anywhere worldwide. Docking assist system 100 may be configured to use visual odometry derived from imagery provided by visible or thermal, mono or stereo cameras. For single camera odometry, scaling is required, and one scaling solution is to scale from GNSS at high speeds (>2 kts) where GNSS suffers less from random walk.

In some embodiments, docking assist system 100 may be configured to compensate for wind and current effects by explicitly estimating the effects of wind and current through modelling. The wind can be measured through a wind vane and the current estimated from the difference between water speed measurements (e.g., a two-axis electromagnetic log, for example, which can measure water velocity as a vector) and ground speed, which can be measured using visual odometry employing embodiments of perimeter ranging system 148. Once current and wind are known, models can be applied to determine the effect on the vessel (e.g., wind tends to blow the bow downwind, due to the asymmetry where wind pressure acts at 0.25 of the chord of a body, which is ahead of the center of mass and ahead of the center of lateral resistance of the hull in the water). The expected disturbance can be used to determine a counteracting thrust demand set, as a feedforward term in the controller, reducing the demand on the feedback terms and improving overall control.

Boats vary in mass, thrust, and control dynamics (e.g., delays in gear changing, pod rotation and throttle changes, and dead zones which may surround the neutral joystick position). One way to handle these variations is a robust control system, as described herein. Furthermore, the dynamics may be measured through observation during vessel use (either manual by the user, or automatic).

In various embodiments, docking assist system 100 may be configured to use video analytics to highlight navigational hazards such as objects (like posts) which might otherwise go unnoticed or are within a certain distance of a known route. Once docking assist system 100 has established the pathway and yaw angles of a docking route, this may displayed to the user as a zone through which the vessel occupies space, such as a an animated walkthrough of the route/yaw the vessel will take, or other methods to show a user the expected route context before the user accepts the docking maneuver.

In the automotive space there are hybrid control systems, such as where a user controls brakes, throttle, and clutch, but the steering angle is automated or assisted. The same can be applied to the marine space, where the rudders, throttles, and gear positions, for example, can be controlled by the skipper or docking assist system 100. However, unlike automotive where speed and steering are independent variables, watercraft have considerable cross coupling. One form of hybrid control technique which is more suitable to boating systems is for the maneuver to be controlled automatically, but the pace of the maneuver to be controlled or adjusted by the user. For example, once a maneuver is selected, a joystick's right/left/rear/twist directions could be ignored, and the forward/neutral joystick dimension could be used to indicate to the system whether to run the maneuver at full speed, or to slow or halt the maneuver, depending on the forward deflection of the joystick.

In embodiments where system 100 includes a joystick or other manual interface device, docking assist system 100 may be configured to automatically activate assisted docking whenever the joystick/manual user interface is in use (whether or not synthetic elevated view camera is being viewed), to automatically open pre-defined applications on one or more user interfaces whenever the joystick/manual user interface is in use; to automatically enable assisted docking whenever a synthetic elevated view is displayed. In embodiments where system 100 does not include a joystick or other similar manual interface device, docking assist system 100 may be configured to enable assisted docking when throttle control drops below a defined threshold; speed-over-ground drops below a defined threshold. In one embodiment, object recognition (e.g., using AI systems and techniques) may be used to identify and place mobile structure 101 dead-center over a trailer as a user drives forwards.

In accordance with various additional related embodiments, system 100 may be configured to autopilot mobile structure 101 to and/or from a remote docking facility in either a manned or unmanned configuration. This enables a user to get on/off at a location convenient to the user's car/clubhouse (e.g., minimal walking distance with heavy bags) yet have the vessel stored in a low cost area which does not have to be close to facilities. Such low cost docking area may itself be manned or unmanned, as described herein.

For example, many vessels are docked in marinas or on swinging moorings, and as such there are conflicting objectives with respect to the owner, the harbor, and the public. For the owner: the vessel should be as close as possible to a car park or club house; the docking area should be reliable, safe, and well maintained (e.g. wide wooden pontoons regularly renewed); and the vessel often needs to be parked short term in different locations (sometimes this means anchoring off, because there is no dock infrastructure). For the harbor: to meet demand and amortize fixed costs, there should be many vessels and some vessels will be further away than others; costs should be minimized—pontoons should be narrow and maintenance free; it is more economical to build long term than short term docking solutions that are only used occasionally. For the public: beauty spots should not be cluttered by boat parks, a few sailboats can be pretty, but lots of vessels are generally ugly; open walkways are preferable to private marinas with gates with locks; do not want to see empty boat docks everywhere. For small power boats, dry-stacking eliminates some of these contradictions, but dry-stacking is not suited to larger power boats or to sailing yachts. Current solutions allow for compromise between the conflicting objectives, but no party is ever completely satisfied.

Embodiments address this problem by providing automated navigation: to a remote holding-point (which can be an arbitrary location at sea) where the vessel can stay until called; to dedicated docking infrastructure where the vessel can stay indefinitely; from its current position (which might be dedicated docking infrastructure) to the user's location; to port (for example, bringing crew home safely if the skipper has been incapacitated) or an area where assistance can be received; to hold the vessel safely in its current position; through a lock gate, enabling people to leave their vessel to work its way through the lock and into port by itself. In some embodiments, controller 130 and/or system 100 may be configured to implement a control architecture that is built in layers that may be connected through networks (LAN and/or WAN, such as WiFi and/or cellular networks). Lower layers (which cannot tolerate latency) may be configured to not rely on information from the layers above for their immediate control requirements (for example, a web user interface provides a target destination and it is not critical if communication is lost once the vessel has set off). One example layered control architecture may be (top) Web User Interface>Dock Infrastructure Controller>Autonomous Vessel Controller>Motion Control System>Motors and Gearboxes.

As an example use of such architecture, in the Web User Interface layer (e.g., executed by a portable/personal electronic device, such as a smart phone or tablet, which may be implemented according to various embodiments of user interface 120 of system 100), a user can demand that the vessel be transferred to a new location either as soon as possible or for a future requested time. In the Dock Infrastructure Controller layer (which may not always be present, such as if the vessel is requested to hold station at sea for a period) free capacity (vessels will not necessarily always be allocated to same place) is managed and assigned. The Dock Infrastructure Controller layer may be configured to manage occupancy logging and customer billing, and embodiments of this layer may include various sensors (e.g., camera, radar, or other sensors mounted on the docking infrastructure) to feed data to the Autonomous Vessel Controller layer. Embodiments may be configured to determine and provide a pathway to a final docking location that takes into account other vessels under its control.

The Autonomous Vessel Controller layer (e.g., system 100) takes charge of navigating the vessel safely from its current location to the target location and uses sensors (e.g., GNSS, cameras, thermal cameras, AIS, radar, short range radar, ultrasonic sensors, etc.) to provide safe navigation. Such sensor systems may be connected to an artificial intelligence network, such as convolutional neural network, for example, to classify objects around the vessel. The Autonomous Vessel Controller layer may be configured to apply the maritime 'rules of the road' while maneuvering autonomously and to provide target vessel heading and speed the Motion Control System layer, which directly controls the bottom layer (e.g., the Motors and Gearboxes layer). The Motors and Gearboxes layer controls thrusters and gearboxes and other elements of navigation system 190 to deliver the required vessel heading and speed. Any of the autonomous and/or assisted docking techniques described herein may be used to implement one or more of such control architecture layers.

When present, a dock infrastructure can take many forms. For example, it may be implemented as a dry stack configured to receive unmanned vessels. A dock infrastructure may also be placed some distance away from a harbor in sheltered water. The dock infrastructure may be implemented similar to a conventional port and be manned so that vessels are tied up by hand. In such embodiments, vessels could stand off until a human dock assistant is ready to receive them, and the dock assistant could have an application running on a personal electronic device through which the dock assistant signals when ready to accept the next vessel. Alternatively the infrastructure could be automated, and to minimize the requirements on users and autonomous vessels there could be no fenders, warps, etc. required on the vessel.

Figure 27:
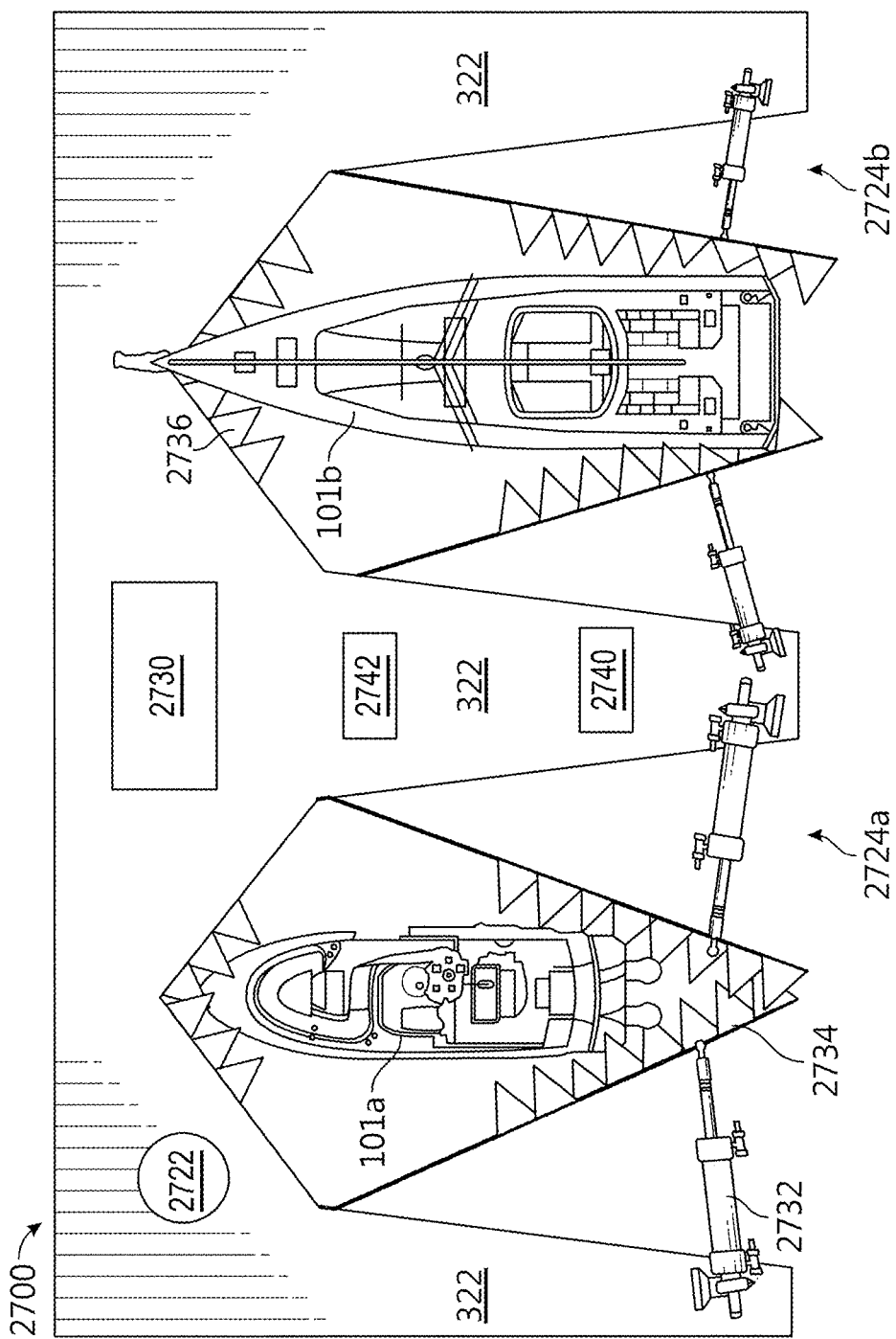
FIG. 27 illustrates a diagram of a remote vessel storage system for use with a docking assist system in accordance with an embodiment of the disclosure.

For example, FIG. 27 illustrates a diagram of a remote vessel storage system 2700 for use with a docking assist system in accordance with an embodiment of the disclosure. As shown in FIG. 27, remote vessel storage system 2700 may include multiple automated slips 2724*a* and 2724*b* between docks 322 and monitored by cameras 2740, each slip having vessel retainer actuators 2732 configured to actuate bumper arrays 2734 to capture mobile structures 101*a* and 101*b* of different configurations and sizes and hold them against stationary capture bumpers 2736, as shown. In various embodiments, a user may direct mobile structure 101*a* to navigate to and dock within an open slip of remote vessel storage system 2700. Dock infrastructure controller 2730 may receive a request to dock from the user and/or system 100 on mobile structure 101*a* and to provide a docking route and/or position associated with slip 2724*a* to mobile structure 101*a* and/or the user (who may then forward the route and/or position to mobile structure 101*a*).

Dock infrastructure controller 2730 may be configured to use cameras 2740 to monitor approach and position of mobile structure 101 and/or a positional status of vessel retainer actuators 2732 and/or bumper arrays 2734, for example, and to report such monitoring data to mobile structure 101*a*. Upon detecting mobile structure 101*a* reaching a preset proximate distance from slip 2724*a*, dock infrastructure controller 2730 may control vessel retainer actuators 2732 to open bumper arrays 2734 to allow mobile structure 101*a* to enter slip 2724*a* and/or to direct mobile structure 101*a* to enter slip 2724*a* and against capture bumpers 2736, which may be angled as shown to guide mobile structure 101*a* away from unprotected surfaces of slip 2724*a*. Upon detecting mobile structure 101*a* entering slip 2724*a* and contacting capture bumpers 2736, dock infrastructure controller 2730 may control vessel retainer actuators 2732 to close bumper arrays 2734 to secure mobile structure 101*a* within slip 2724*a*. Slip shapes and sizes may be built to cater for a range of vessel sizes, including 6 m-8 m, 8 m-10 m, 10 m-12 m, and larger as needs dictate.

Remote vessel storage system 2700 may be implemented with a variety of maintenance and/or service options, which may all be operated remotely or be automated by dock infrastructure controller 2730. For example, dock infrastructure controller 2730 may be configured to couple mobile structure 101 to shore power coupling 2742 (e.g., through inductive or wired coupling to grid power or an array of solar panels integrated with remote vessel storage system 2700) to recharge main battery 2730 of electric propulsion system 2700. Dock infrastructure controller 2730 may also be configured to refill a water tank of mobile structure 101*a* using a self-mating bow connection. In some embodiments, dock infrastructure controller 2730 may be configured to use crane 2722 to lift mobile structure 101*a* out of slip 2724*a* and place mobile structure 101*a* into a dry-stacking rack, such as for relatively long term storage and/or maintenance.

Such unmanned remote docking process may be performed in reverse upon dock infrastructure controller 2730 receiving a request for mobile structure 101*a* from a user, for example, or upon reaching a preset release and return time. Furthermore, any portion of such remote docking process may employ human staff to perform various operations of remote vessel storage system 2700, including manually opening and closing vessel retainer actuators 2732 to secure mobile structure 101 within slips 2724*a* or 2724*b*, for example, or using portable/personal electronic devices (e.g., embodiments of dock infrastructure controller 2730) to assign a particular slip and signal a waiting mobile structure to begin entering that particular slip, or manually securing such mobile structure within the particular slip. Embodiments of the present disclosure can thus provide reliable and convenient automated and unmanned remote short term docking and/or long term storage and retrieval for mobile structures.

Figure 28:
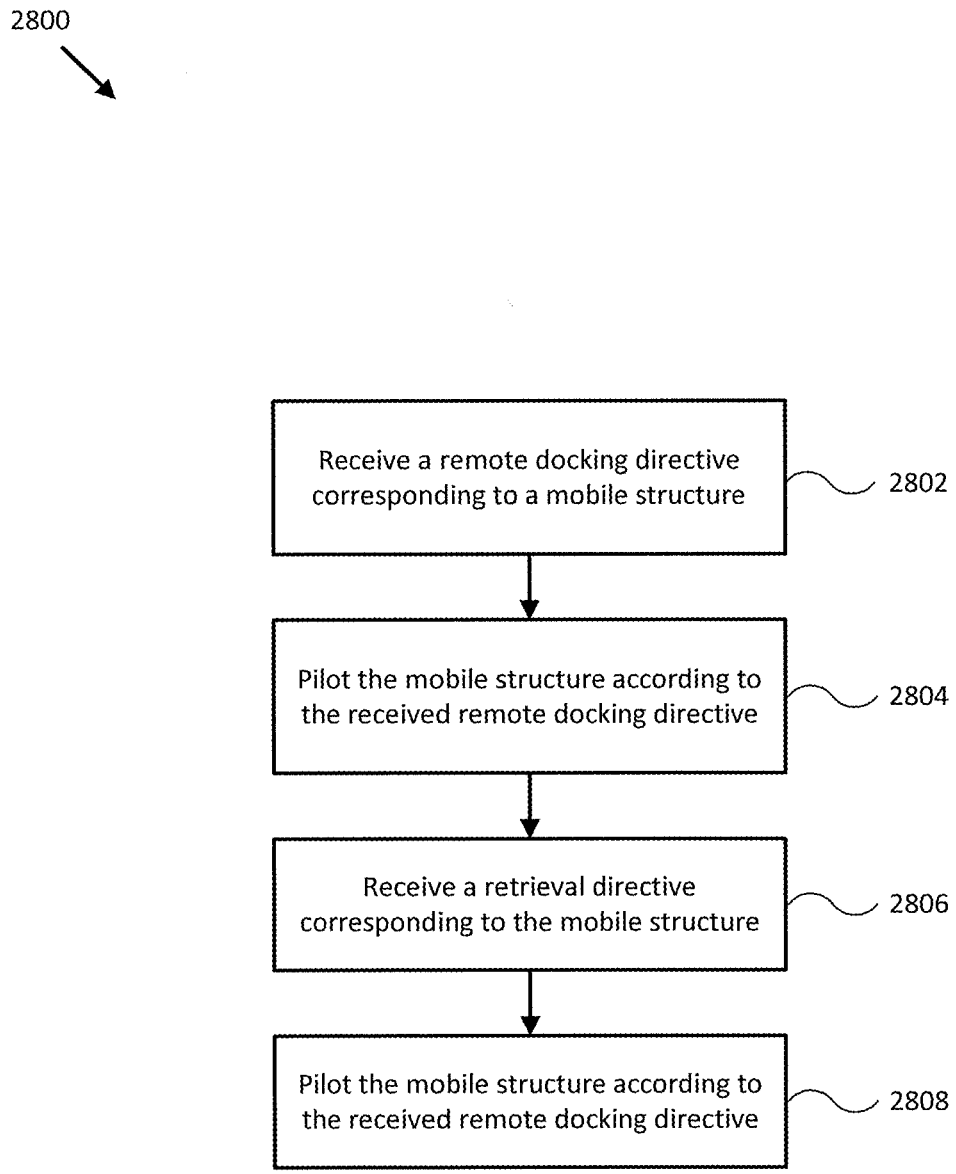
FIG. 28 illustrates a flow diagram of a process to provide remote docking for a mobile structure implemented with a docking assist system in accordance with an embodiment of the disclosure.

FIG. 28 illustrates a flow diagram of a process 2800 to provide remote docking for mobile structure 101 implemented with docking assist system 100 in accordance with an embodiment of the disclosure. More generally, process 2800 may be used to provide general unmanned navigational control for mobile structure 101. It should be appreciated that any step, sub-step, sub-process, or block of process 2800 may be performed in an order or arrangement different from the embodiments illustrated by FIG. 28. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 2800 is described with reference to systems, processes, control loops, and images described in reference to FIGS. 1A-27, process 2800 may be performed by other systems different from those systems, processes, control loops, and images and including a different selection of electronic devices, sensors, assemblies, mobile structures, and/or mobile structure attributes, for example.

In block 2802, a remote docking directive is received. For example, controller 130 may be configured to receive a remote docking directive corresponding to mobile structure 101 from a fixed mounted or portable embodiment of user interface 120. In various embodiments, docking assist parameters, as described herein, may include such remote docking directive. In some embodiments, a remote docking directive may include an absolute or relative position (e.g., relative to a current position of mobile structure 101) and/or a suggested route to an absolute or relative position, for example. Such position may correspond to an open water parking position, such as with a virtual buoy or a designated anchor area, for example, or may correspond to an entrance or waiting area adjacent a remote vessel storage system (e.g., remote vessel storage system 2700). In various embodiments, a remote docking directive may include a maximum transit time or speed, a desired arrival time, and/or other remote docking directive parameters, as described herein.

In block 2804, a mobile structure is piloted according to a received remote docking directive. For example, controller 130 may be configured to pilot mobile structure 101 according to the remote docking directive received in block 2802. In embodiments where the remote docking directive includes a position corresponding to an open water parking position, system 100 may be configured to use any of the docking assist methods described herein to safely and/or autonomously navigate mobile structure 101 to such position while avoiding navigational hazards along a corresponding route to the position. System 100 may also be configured to drop anchor or otherwise use elements of system 100 to maintain such position indefinitely.

In embodiments where the remote docking directive includes a position corresponding to an entrance or waiting area adjacent a remote vessel storage system, system 100 may be configured to use any of the docking assist methods described herein to safely and/or autonomously navigate mobile structure 101 to such entrance and/or waiting area, according to a time, transit speed, and/or orientation, for example, while avoiding navigational hazards along a corresponding route to the position. System 100 may be configured to communicate with dock infrastructure controller 2730 and/or dock staff to help maneuver into an available slip 2724*a* and secure mobile structure 101. System 100 may also be configured to use an identification or secure code within the remote docking directive to secure communications with dock infrastructure controller 2730 and/or identify a particular slip in which to dock.

In block 2806, a retrieval directive is received. For example, controller 130 may be configured to receive a retrieval directive corresponding to mobile structure 101 from a fixed mounted or portable embodiment of user interface 120. In various embodiments, docking assist parameters, as described herein, may include such retrieval directive. In some embodiments, a retrieval directive may include an absolute or relative position and/or orientation (e.g., relative to a current position and/or orientation of mobile structure 101) and/or a suggested route to an absolute or relative retrieval position and/or orientation, for example. Such retrieval position and/or orientation may correspond to the initial position and/or orientation of mobile structure 101 when system 100 received the remote docking directive in block 2802, for example, or may be a new retrieval position and/or orientation that are different from such initial position and/or orientation. In various embodiments, a retrieval directive may include a maximum transit time or speed, a desired arrival time, and/or other retrieval directive parameters, as described herein. In some embodiments the retrieval directive may be included within the remote docking directive received in block 2802.

In block 2808, a mobile structure is piloted according to a received retrieval directive. For example, controller 130 may be configured to pilot mobile structure 101 according to the retrieval directive received in block 2806. In embodiments where the retrieval directive includes a retrieval position and/or orientation corresponding to the initial position and/or orientation of mobile structure 101 when system 100 received the remote docking directive in block 2802, system 100 may be configured to use any of the docking assist methods described herein to safely and/or autonomously navigate mobile structure 101 to such retrieval position and/or orientation while avoiding navigational hazards along a corresponding route to the retrieval position. System 100 may also be configured to drop anchor or otherwise use elements of system 100 to maintain such retrieval position and/or orientation indefinitely. In embodiments where the retrieval directive includes a new retrieval position and/or orientation, system 100 may be configured to use any of the docking assist methods described herein to safely and/or autonomously navigate mobile structure 101 to such new retrieval position and/or orientation, for example, while avoiding navigational hazards along a corresponding route to the new retrieval position and/or orientation.

System 100 may be configured to communicate with dock infrastructure controller 2730 and/or dock staff to help maneuver out of an available slip 2724a and disembark mobile structure 101. System 100 may also be configured to use an identification or secure code within the retrieval directive to secure communications with dock infrastructure controller 2730 and/or unlock a particular slip in which mobile structure 101 is docked.

Embodiments of the present disclosure can thus provide reliable and convenient automated and unmanned remote short term docking and/or long term storage and retrieval for mobile structures.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to communicate with a user interface and a perimeter ranging system mounted to a marine vessel and to provide docking assist for the marine vessel, wherein the logic device is configured to:
receive docking assist parameters from the user interface and perimeter sensor data from the perimeter ranging system;
determine one or more docking assist control signals based, at least in part, on the received docking assist parameters and the received perimeter sensor data, wherein the determining the one or more docking assist control signals comprises:
interpreting the docking assist parameters as providing a user-demanded velocity of the marine vessel which is a user demand for velocity of the marine vessel;
determining, based at least in part on the perimeter sensor data, that a navigation hazard is present within a safety perimeter of the marine vessel, and determining whether the user-demanded velocity provided by the docking assist parameters comprises moving towards the navigation hazard;
attenuating the user-demanded velocity towards the navigation hazard, the attenuating being based at least in part on determining the navigation hazard presence within the safety perimeter and on determining that the user-demanded velocity comprises moving towards the navigation hazard, the attenuating comprising determining an attenuated target linear and/or angular velocity for the marine vessel; and
determining the one or more docking assist control signals based, at least in part, on the determined attenuated target linear and/or angular velocity; and
provide the one or more docking assist control signals to a navigation control system for the marine vessel, wherein the one or more docking assist control signals are configured to cause the navigation control system to maneuver the marine vessel according to the determined attenuated target linear and/or angular velocity, the navigation control system comprising one or more of a steering actuator, a propulsion system, and/or a thrust maneuver system one or more of which are used to maneuver the marine vessel according to the determined attenuated target linear and/or angular velocity.

2. The system of claim 1, wherein:
the user specifies the user-demanded velocity via the user interface;
the attenuating is performed on the user-demanded velocity specified by the user via the user interface; and
the navigation control system comprises the propulsion system, and the attenuating is performed on the user-demanded velocity towards the navigation hazard only.

3. The system of claim 1, wherein the logic device is switchable between the following options (A) and (B):
(B) interpreting the docking assist parameters as providing the user demand for velocity of the marine vessel; and
(A) interpreting the docking assist parameters as providing a thrust demand, the logic device then determining one or more control signals for the navigation control system based at least in part on the thrust demand.

4. The system of claim 3, comprising a manual switch configured to switch the logic device between (A) and (B).

5. The system of claim 3, wherein the logic device comprises:
first logic configured to generate thrust demand from the user demand for velocity in (B); and
second logic configured to receive the thrust demand from the first logic in (B), and from the docking assist parameters in (A), and determine the one or more control signals based at least in part on the received thrust demand.

6. The system of claim 3, wherein the user interface comprises a joystick with a joystick controller switching between being a thrust controller and being a velocity controller by the logic device switching between (A) and (B) respectively.

7. The system of claim 3, wherein the logic device is further configured to:
switch the logic device between (A) and (B); and
provide the one or more control signals to the navigation control system in (A) and in (B).

8. The system of claim 1, wherein the docking assist parameters comprise a target docking position and/or orientation for the marine vessel, and wherein the determining the one or more docking assist control signals comprises:
determining wind and/or water current disturbances affecting navigation of the marine vessel;
determining a target docking track for the marine vessel based, at least in part, on the determined wind and/or water current disturbances and the target docking position and/or orientation; and
determining the one or more docking assist control signals based, at least in part, on the determined target docking track, wherein the one or more docking assist control signals are configured to cause the navigation control system to maneuver the marine vessel according to the determined target docking track.

9. The system of claim 1, wherein:
the determining the one or more docking assist control signals comprises:
determining wind and/or water current disturbances affecting navigation of the marine vessel; and
determining the one or more docking assist control signals based, at least in part, on the determined wind and/or water current disturbances, wherein the one or more docking assist control signals are configured to cause the navigation control system to compensate for the determined wind and/or water current disturbances while maneuvering the marine vessel according to the received docking assist parameters;
wherein the determining wind and/or water current disturbances comprises:
placing the system in a hover mode where the target linear and/or angular velocities are zero; and
using a thrust provided by the system in hover mode as an indication of the wind and/or water current disturbances.

10. The system of claim 1, further comprising the user interface, wherein the receiving the docking assist parameters comprises:
generating a view of a docking area for the marine vessel on a display of the user interface; and
receiving user input from the user interface indicating a target docking track and/or a target docking position and/or orientation within the generated view of the docking area.

11. The system of claim 3, wherein:
in (B), the logic device is configured to determine from the user interface demand signals that the user interface has received a user input specifying that the marine vessel is to hover with the target linear and angular velocities being substantially zero, and the logic device is configured to respond to such user input by providing, to the navigation control system, control signals configured to cause the marine vessel to hover while counteracting detected motion of the marine vessel.

12. The system of claim 1, wherein:
the docking assist parameters comprise a remote docking directive; and
the remote docking directive includes a position for the marine vessel corresponding to an open water parking position or an entrance or waiting area associated with a remote vessel storage system;
wherein the user interface comprises a joystick controller configured to provide docking assist parameters corresponding to the target linear and angular velocities of substantially zero in response to a joystick being let go.

13. A method comprising:
receiving docking assist parameters from a user interface for a marine vessel and perimeter sensor data from a perimeter ranging system mounted to the marine vessel;
determining one or more docking assist control signals based, at least in part, on the received docking assist parameters and the received perimeter sensor data, wherein the determining the one or more docking assist control signals comprises:
interpreting the docking assist parameters as providing a user-demanded velocity of the marine vessel which is a user demand for velocity of the marine vessel;
determining, based at least in part on the perimeter sensor data, that a navigation hazard is present within a safety perimeter of the marine vessel, and determining whether the user-demanded velocity provided by the docking assist parameters comprises moving towards the navigation hazard;
attenuating the user-demanded velocity towards the navigation hazard, the attenuating being based at least in part on determining the navigation hazard presence within the safety perimeter and on determining that the user-demanded velocity comprises moving towards the navigation hazard, the attenuating comprising determining an attenuated target linear and/or angular velocity for the marine vessel; and
determining the one or more docking assist control signals based, at least in part, on the determined attenuated target linear and/or angular velocity; and
providing the one or more docking assist control signals to a navigation control system for the marine vessel, wherein the one or more docking assist control signals are configured to cause the navigation control system to maneuver the marine vessel according to the determined attenuated target linear and/or angular velocity.

14. The method of claim 13, wherein no attenuating is performed on the user's velocity demand away from the navigation hazard, the marine vessel sliding along the navigation hazard as the user's sideways velocity demand is attenuated to zero while the user's forward velocity demand is not attenuated.

15. The method of claim 13, further comprising determining, based at least in part on the perimeter sensor data, one or more velocity limits on a linear and/or angular velocity of the marine vessel in a direction of approaching the navigation hazard, wherein the attenuating is based, at least in part, on the one or more velocity limits.

16. The method of claim 15, wherein the determining the one or more docking assist control signals comprises:
determining a range to the navigation hazard disposed within a monitoring perimeter of the perimeter ranging system based, at least in part, on the received perimeter sensor data;
determining the range to the navigation hazard is within a safety perimeter for the marine vessel; and determining the one or more docking assist control signals based, at least in part, on the determined range to the navigation hazard, wherein the one or more docking assist control signals are configured to cause the navigation control system to maneuver the marine vessel to evade the navigation hazard by maintaining or increasing the range to the navigation hazard.

17. The method of claim 13, wherein:
the user interface comprises a joystick, and the user specifies the user-demanded velocity via the joystick;
the attenuating is performed on the user-demanded velocity specified by the user via the joystick; and
the attenuating is performed on the user-demanded velocity towards the navigation hazard only.

18. The method of claim 15, wherein the docking assist parameters comprise a target docking position and/or orientation for the marine vessel, and wherein the determining the one or more docking assist control signals comprises:
determining wind and/or water current disturbances affecting navigation of the marine vessel;
determining a target docking track for the marine vessel based, at least in part, on the determined wind and/or water disturbances, the target docking position and/or orientation and one or more docking safety parameters corresponding to the target docking track; and
determining the one or more docking assist control signals based, at least in part, on the determined target docking track, wherein the one or more docking assist control signals are configured to cause the navigation control system to maneuver the marine vessel according to the determined target docking track.

19. The method of claim 13, wherein the determining the one or more docking assist control signals comprises:
determining wind and/or water current disturbances affecting navigation of the marine vessel; and
determining the one or more docking assist control signals based, at least in part, on the determined wind and/or water current disturbances, wherein the one or more docking assist control signals are configured to cause the navigation control system to compensate for the determined wind and/or water current disturbances while maneuvering the marine vessel according to the received docking assist parameters;
wherein the determining wind and/or water current disturbances comprises:
placing the system in a hover mode where the target linear and/or angular velocities are zero; and
using a thrust provided by the system in hover mode as an indication of the wind and/or water current disturbances.

* * * * *

UNITED STATES PATENT AND TRADEMARK OFFICE
CERTIFICATE OF CORRECTION

PATENT NO. : 11,899,465 B2
APPLICATION NO. : 16/533572
DATED : February 13, 2024
INVENTOR(S) : Mark Johnson et al.

It is certified that error appears in the above-identified patent and that said Letters Patent is hereby corrected as shown below:

In the Specification

In the CROSS-REFERENCE TO RELATED APPLICATIONS:

Column 1, Lines 30-31, change "U.S. patent application Ser. No." to --U.S. Patent Application No.--.

Column 1, Lines 53-54, change "U.S. patent application Ser. No." to --U.S. Patent Application No.--.

Column 1, Lines 56-57, change "U.S. patent application Ser. No." to --U.S. Patent Application No.--.

Column 2, Lines 3-4, change "U.S. patent application Ser. No." to --U.S. Patent Application No.--.

Column 2, Lines 6-7, change "U.S. patent application Ser. No." to --U.S. Patent Application No.--.

Column 2, Lines 20-21, change "U.S. patent application Ser. No." to --U.S. Patent Application No.--.

Column 2, Lines 23-24, change "U.S. patent application Ser. No." to --U.S. Patent Application No.--.

Column 2, Lines 36-37, change "U.S. patent application Ser. No." to --U.S. Patent Application No.--.

Column 2, Lines 48-49, change "U.S. patent application Ser. No." to --U.S. Patent Application No.--.

Column 2, Lines 51-52, change "U.S. patent application Ser. No." to --U.S. Patent Application No.--.

Column 2, Lines 64-65, change "U.S. patent application Ser. No." to --U.S. Patent Application No.--.

Signed and Sealed this
Ninth Day of April, 2024

Katherine Kelly Vidal
*Director of the United States Patent and Trademark Office*

CERTIFICATE OF CORRECTION (continued)
U.S. Pat. No. 11,899,465 B2

In the DETAILED DESCRIPTION:

Column 31, Line 28, change "U.S. patent application Ser. No." to --U.S. Patent Application No.--.

Column 38, Line 15, change "U.S. patent application Ser. No." to --U.S. Patent Application No.--.